(12) United States Patent
Selgas et al.

(10) Patent No.: US 9,021,070 B2
(45) Date of Patent: *Apr. 28, 2015

(54) DYNAMICALLY MODIFYING A TOOLBAR

(71) Applicant: MyMail, Ltd., San Angelo, TX (US)

(72) Inventors: Thomas Drennan Selgas, Athens, TX (US); Michael Brian Massing, San Jose, CA (US); John Everett Gmuender, San Jose, CA (US)

(73) Assignee: MyMail, Ltd., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/923,115

(22) Filed: Jun. 20, 2013

(65) Prior Publication Data

US 2013/0346895 A1 Dec. 26, 2013

Related U.S. Application Data

(60) Continuation of application No. 13/573,311, filed on Sep. 10, 2012, which is a continuation of application No. 10/417,853, filed on Apr. 16, 2003, now Pat. No. 8,275,863, which is a division of application No. 09/100,619, filed on Jun. 19, 1998, now Pat. No. 6,571,290.

(60) Provisional application No. 60/050,186, filed on Jun. 19, 1997.

(51) Int. Cl.
| | |
|---|---|
| *G06F 15/177* | (2006.01) |
| *G06F 9/44* | (2006.01) |
| *G06F 3/0482* | (2013.01) |
| *H04L 29/06* | (2006.01) |
| *H04L 29/12* | (2006.01) |

(52) U.S. Cl.
CPC ............. *G06F 3/0482* (2013.01); *H04L 63/08* (2013.01); *H04L 29/06* (2013.01); *H04L 63/083* (2013.01); *H04L 63/0464* (2013.01); *H04L 29/12009* (2013.01); *H04L 63/04* (2013.01); *H04L 61/00* (2013.01)

(58) Field of Classification Search
USPC .......... 709/203, 217–219, 221, 246; 717/170, 717/171, 172, 173; 715/744, 745, 747
See application file for complete search history.

(56) References Cited

U.S. PATENT DOCUMENTS

| | | | |
|---|---|---|---|
| 3,885,104 | A | 5/1975 | Smith et al. |
| 4,430,702 | A | 2/1984 | Schiebe et al. |

(Continued)

FOREIGN PATENT DOCUMENTS

| | | | |
|---|---|---|---|
| EP | 0233682 | A2 | 8/1987 |
| EP | 0270882 | A2 | 6/1988 |

(Continued)

OTHER PUBLICATIONS

U.S. Appl. No. 10/417,862; Office Action; Jul. 12, 2004.

(Continued)

*Primary Examiner* — Patrice Winder
(74) *Attorney, Agent, or Firm* — Gardere Wynne Sewell LLP

(57) ABSTRACT

The present invention comprises a method of and apparatus for simplifying the process of access to a network for a roaming computer user, divides the responsibility of servicing a given user wanting to access the network between multiple parties and minimizes the possibility of improper dissemination of email header data as well as improper use of network resources (including server systems) by non-clients.

29 Claims, 17 Drawing Sheets

(56) References Cited

U.S. PATENT DOCUMENTS

| | | |
|---|---|---|
| 4,470,417 A | 9/1984 | Gruber |
| 4,529,870 A | 7/1985 | Chaum |
| 4,757,267 A | 7/1988 | Riskin |
| 4,825,354 A | 4/1989 | Agrawal et al. |
| 5,019,963 A | 5/1991 | Alderson et al. |
| 5,021,949 A | 6/1991 | Morten et al. |
| 5,115,501 A | 5/1992 | Kerr |
| 5,150,464 A | 9/1992 | Sidhu et al. |
| 5,155,847 A | 10/1992 | Kirouac et al. |
| 5,198,806 A | 3/1993 | Lord |
| 5,241,594 A | 8/1993 | Kung |
| 5,247,683 A | 9/1993 | Holmes et al. |
| 5,263,165 A | 11/1993 | Janis |
| 5,287,461 A | 2/1994 | Moore |
| 5,319,562 A | 6/1994 | Whitehouse |
| 5,347,632 A | 9/1994 | Filepp et al. |
| 5,367,635 A | 11/1994 | Bauer et al. |
| 5,410,543 A | 4/1995 | Seitz et al. |
| 5,426,427 A | 6/1995 | Chinnock et al. |
| 5,436,637 A | 7/1995 | Gayraud et al. |
| 5,455,863 A | 10/1995 | Brown et al. |
| 5,475,819 A | 12/1995 | Miller et al. |
| 5,483,596 A | 1/1996 | Rosenow et al. |
| 5,499,289 A | 3/1996 | Bruno et al. |
| 5,524,195 A | 6/1996 | Clanton, III et al. |
| 5,558,339 A | 9/1996 | Perlman |
| 5,572,643 A | 11/1996 | Judson |
| 5,579,472 A | 11/1996 | Keyworth, II et al. |
| 5,580,177 A | 12/1996 | Gase et al. |
| 5,586,257 A | 12/1996 | Perlman |
| 5,586,304 A | 12/1996 | Stupek, Jr. et al. |
| 5,604,542 A | 2/1997 | Dedrick |
| 5,617,526 A | 4/1997 | Oran et al. |
| 5,635,940 A | 6/1997 | Hickman et al. |
| 5,636,209 A | 6/1997 | Perlman |
| 5,638,433 A | 6/1997 | Bubien, Jr. et al. |
| 5,638,494 A | 6/1997 | Pinard et al. |
| 5,638,513 A | 6/1997 | Ananda |
| 5,642,419 A | 6/1997 | Rosen |
| 5,644,737 A | 7/1997 | Tuniman et al. |
| 5,644,739 A | 7/1997 | Moursund |
| 5,655,077 A | 8/1997 | Jones et al. |
| 5,657,246 A | 8/1997 | Hogan et al. |
| 5,675,507 A | 10/1997 | Bobo, II |
| 5,680,549 A | 10/1997 | Raynak et al. |
| 5,682,325 A | 10/1997 | Lightfoot et al. |
| 5,684,950 A | 11/1997 | Dare et al. |
| 5,689,563 A | 11/1997 | Brown et al. |
| 5,689,638 A | 11/1997 | Sadovsky |
| 5,694,546 A | 12/1997 | Reisman |
| 5,694,549 A | 12/1997 | Carlin et al. |
| 5,696,965 A | 12/1997 | Dedrick |
| 5,704,050 A | 12/1997 | Redpath |
| 5,706,502 A | 1/1998 | Foley et al. |
| 5,708,780 A | 1/1998 | Levergood et al. |
| 5,710,884 A | 1/1998 | Dedrick |
| 5,717,923 A | 2/1998 | Dedrick |
| 5,721,780 A | 2/1998 | Ensor et al. |
| 5,724,521 A | 3/1998 | Dedrick |
| 5,732,219 A | 3/1998 | Blumer et al. |
| 5,737,414 A | 4/1998 | Walker et al. |
| 5,740,549 A | 4/1998 | Reilly et al. |
| 5,745,555 A | 4/1998 | Mark |
| 5,748,927 A | 5/1998 | Stein et al. |
| 5,749,075 A | 5/1998 | Toader et al. |
| 5,751,812 A | 5/1998 | Anderson |
| 5,752,238 A | 5/1998 | Dedrick |
| 5,752,244 A | 5/1998 | Rose et al. |
| 5,754,787 A | 5/1998 | Dedrick |
| 5,758,084 A | 5/1998 | Silverstein et al. |
| 5,761,683 A | 6/1998 | Logan et al. |
| 5,764,639 A | 6/1998 | Staples et al. |
| 5,764,902 A | 6/1998 | Rothrock |
| 5,768,508 A | 6/1998 | Eikeland |
| 5,768,521 A | 6/1998 | Dedrick |
| 5,774,670 A | 6/1998 | Montulli |
| 5,774,869 A | 6/1998 | Toader |
| 5,781,724 A | 7/1998 | Nevarez et al. |
| 5,790,548 A | 8/1998 | Sistanizadeh et al. |
| 5,790,800 A | 8/1998 | Gauvin et al. |
| 5,793,854 A | 8/1998 | Kashepava |
| 5,796,393 A | 8/1998 | MacNaughton et al. |
| 5,799,071 A | 8/1998 | Azar et al. |
| 5,801,702 A | 9/1998 | Dolan et al. |
| 5,802,304 A | 9/1998 | Stone |
| 5,802,502 A | 9/1998 | Gell et al. |
| 5,802,530 A | 9/1998 | Van Hoff |
| 5,806,043 A | 9/1998 | Toader |
| 5,809,242 A | 9/1998 | Shaw et al. |
| 5,809,251 A | 9/1998 | May et al. |
| 5,812,819 A | 9/1998 | Rodwin et al. |
| 5,815,665 A | 9/1998 | Teper et al. |
| 5,818,447 A | 10/1998 | Wolf et al. |
| 5,821,927 A | 10/1998 | Gong |
| 5,822,539 A | 10/1998 | van Hoff |
| 5,825,357 A | 10/1998 | Malamud et al. |
| 5,825,890 A | 10/1998 | Elgamal et al. |
| 5,826,000 A | 10/1998 | Hamilton |
| 5,826,025 A | 10/1998 | Gramlich |
| 5,828,837 A | 10/1998 | Eikeland |
| 5,828,843 A | 10/1998 | Grimm et al. |
| 5,835,583 A | 11/1998 | Hetz et al. |
| 5,835,712 A | 11/1998 | DuFresne |
| 5,835,725 A | 11/1998 | Chiang et al. |
| 5,835,914 A | 11/1998 | Brim |
| 5,838,906 A | 11/1998 | Doyle et al. |
| 5,845,070 A | 12/1998 | Ikudome |
| 5,845,073 A | 12/1998 | Carlin et al. |
| 5,845,075 A | 12/1998 | Uhler et al. |
| 5,845,077 A | 12/1998 | Fawcett |
| 5,852,722 A | 12/1998 | Hamilton |
| 5,854,901 A | 12/1998 | Cole et al. |
| 5,862,203 A | 1/1999 | Wulkan et al. |
| 5,862,220 A | 1/1999 | Perlman |
| 5,862,339 A | 1/1999 | Bonnaure et al. |
| 5,867,161 A | 2/1999 | Walsh |
| 5,881,234 A | 3/1999 | Schwob |
| 5,884,024 A | 3/1999 | Lim et al. |
| 5,889,958 A | 3/1999 | Willens |
| 5,890,158 A | 3/1999 | House et al. |
| 5,890,171 A | 3/1999 | Blumer et al. |
| 5,890,172 A | 3/1999 | Borman et al. |
| 5,893,091 A | 4/1999 | Hunt et al. |
| 5,894,556 A | 4/1999 | Grimm et al. |
| 5,896,444 A | 4/1999 | Perlman et al. |
| 5,898,780 A | 4/1999 | Liu et al. |
| 5,898,839 A | 4/1999 | Berteau |
| 5,905,492 A | 5/1999 | Straub et al. |
| 5,905,736 A | 5/1999 | Ronen et al. |
| 5,908,469 A | 6/1999 | Botz et al. |
| 5,913,040 A | 6/1999 | Rakavy et al. |
| 5,914,714 A | 6/1999 | Brown |
| 5,915,214 A | 6/1999 | Reece et al. |
| 5,918,013 A | 6/1999 | Mighdoll et al. |
| 5,918,016 A | 6/1999 | Brewer et al. |
| 5,918,019 A | 6/1999 | Valencia |
| 5,919,247 A | 7/1999 | Van Hoff et al. |
| 5,928,333 A | 7/1999 | Landfield et al. |
| 5,930,258 A | 7/1999 | Dato Solis et al. |
| 5,933,490 A | 8/1999 | White et al. |
| 5,935,207 A | 8/1999 | Logue et al. |
| 5,940,074 A | 8/1999 | Britt, Jr. et al. |
| 5,944,824 A | 8/1999 | He |
| 5,950,010 A | 9/1999 | Hesse et al. |
| 5,953,504 A | 9/1999 | Sokal et al. |
| 5,956,391 A | 9/1999 | Melen et al. |
| 5,960,411 A | 9/1999 | Hartman et al. |
| 5,963,964 A | 10/1999 | Nielsen |
| 5,974,461 A | 10/1999 | Goldman et al. |
| 5,978,381 A | 11/1999 | Perlman et al. |
| 5,983,244 A | 11/1999 | Nation |
| 5,983,273 A | 11/1999 | White et al. |
| 5,987,498 A | 11/1999 | Athing et al. |
| 5,987,611 A | 11/1999 | Freund |

(56) References Cited

U.S. PATENT DOCUMENTS

| | | |
|---|---|---|
| 5,991,807 A | 11/1999 | Schmidt et al. |
| 6,005,938 A | 12/1999 | Banker et al. |
| 6,006,034 A | 12/1999 | Heath et al. |
| 6,006,333 A | 12/1999 | Nielsen |
| 6,009,474 A | 12/1999 | Lu et al. |
| 6,011,794 A | 1/2000 | Mordowitz et al. |
| 6,012,088 A | 1/2000 | Li et al. |
| 6,016,509 A | 1/2000 | Dedrick |
| 6,023,268 A | 2/2000 | Britt, Jr. et al. |
| 6,023,585 A | 2/2000 | Perlman et al. |
| 6,023,698 A | 2/2000 | Lavey, Jr. et al. |
| 6,023,729 A | 2/2000 | Samuel et al. |
| 6,026,079 A | 2/2000 | Perlman |
| 6,026,151 A | 2/2000 | Bauer et al. |
| 6,034,689 A | 3/2000 | White et al. |
| 6,035,330 A | 3/2000 | Astiz et al. |
| 6,038,599 A | 3/2000 | Black et al. |
| 6,052,458 A | 4/2000 | Amir-Ebrahimi |
| 6,057,836 A | 5/2000 | Kavalam et al. |
| 6,058,250 A | 5/2000 | Harwood et al. |
| 6,061,060 A | 5/2000 | Berry et al. |
| 6,061,798 A | 5/2000 | Coley et al. |
| 6,067,568 A | 5/2000 | Li et al. |
| 6,070,192 A | 5/2000 | Holt et al. |
| 6,070,243 A | 5/2000 | See et al. |
| 6,073,168 A | 6/2000 | Mighdoll et al. |
| 6,088,451 A | 7/2000 | He et al. |
| 6,101,328 A | 8/2000 | Bakshi et al. |
| 6,101,510 A | 8/2000 | Stone et al. |
| 6,119,152 A | 9/2000 | Carlin et al. |
| 6,119,161 A | 9/2000 | Lita et al. |
| 6,128,660 A | 10/2000 | Grimm et al. |
| 6,128,663 A | 10/2000 | Thomas |
| 6,130,933 A | 10/2000 | Miloslavsky |
| 6,134,590 A | 10/2000 | Perlman |
| 6,138,142 A | 10/2000 | Linsk |
| 6,141,694 A | 10/2000 | Gardner |
| 6,145,002 A | 11/2000 | Srinivasan |
| 6,151,600 A | 11/2000 | Dedrick |
| 6,178,505 B1 | 1/2001 | Schneider et al. |
| 6,182,229 B1 | 1/2001 | Nielsen |
| 6,185,625 B1 | 2/2001 | Tso et al. |
| 6,188,756 B1 | 2/2001 | Mashinsky |
| 6,192,045 B1 | 2/2001 | Williams et al. |
| 6,195,691 B1 | 2/2001 | Brown |
| 6,199,065 B1 | 3/2001 | Kenyon |
| 6,199,110 B1 | 3/2001 | Rizvi et al. |
| 6,205,126 B1 | 3/2001 | Moon |
| 6,208,656 B1 | 3/2001 | Hrastar et al. |
| 6,208,857 B1 | 3/2001 | Agre et al. |
| 6,212,535 B1 | 4/2001 | Weikart et al. |
| 6,226,655 B1 | 5/2001 | Borman et al. |
| 6,247,054 B1 | 6/2001 | Malkin |
| 6,259,442 B1 | 7/2001 | Britt, Jr. et al. |
| 6,266,681 B1 | 7/2001 | Guthrie |
| 6,282,548 B1 | 8/2001 | Burner et al. |
| 6,286,058 B1 | 9/2001 | Hrastar et al. |
| 6,304,902 B1 | 10/2001 | Black et al. |
| 6,308,212 B1 | 10/2001 | Besaw et al. |
| 6,311,197 B2 | 10/2001 | Mighdoll et al. |
| 6,311,207 B1 | 10/2001 | Mighdoll et al. |
| 6,314,516 B1 | 11/2001 | Cagle et al. |
| 6,332,157 B1 | 12/2001 | Mighdoll et al. |
| 6,339,830 B1 | 1/2002 | See et al. |
| 6,345,297 B1 | 2/2002 | Grimm et al. |
| 6,356,541 B1 | 3/2002 | Muller et al. |
| 6,360,366 B1 | 3/2002 | Heath et al. |
| 6,370,141 B1 | 4/2002 | Giordano, III et al. |
| 6,377,570 B1 | 4/2002 | Vaziri et al. |
| 6,405,253 B1 | 6/2002 | Schutte et al. |
| 6,408,336 B1 | 6/2002 | Schneider et al. |
| 6,421,694 B1 | 7/2002 | Nawaz et al. |
| 6,424,992 B2 | 7/2002 | Devarakonda et al. |
| 6,473,099 B1 | 10/2002 | Goldman et al. |
| 6,505,232 B1 | 1/2003 | Mighdoll et al. |
| 6,519,224 B2 | 2/2003 | Hrastar et al. |
| 6,529,517 B2 | 3/2003 | Hrastar et al. |
| 6,557,054 B2 | 4/2003 | Reisman |
| 6,560,704 B2 | 5/2003 | Dieterman et al. |
| 6,571,290 B2 | 5/2003 | Selgas et al. |
| 6,578,075 B1 | 6/2003 | Nieminen et al. |
| 6,606,654 B1 | 8/2003 | Borman et al. |
| 6,609,198 B1 | 8/2003 | Wood et al. |
| 6,614,786 B1 | 9/2003 | Byers |
| 6,618,353 B2 | 9/2003 | Merrill et al. |
| 6,671,272 B2 | 12/2003 | Vaziri et al. |
| 6,766,454 B1 | 7/2004 | Riggins |
| 6,795,415 B1 | 9/2004 | Suonvieri |
| 6,795,852 B1 | 9/2004 | Kleinrock et al. |
| 6,901,386 B1 | 5/2005 | Dedrick et al. |
| 6,937,566 B1 | 8/2005 | Forslow |
| 7,047,560 B2 | 5/2006 | Fishman et al. |
| 7,082,532 B1 | 7/2006 | Vick et al. |
| 7,363,245 B1 | 4/2008 | Dedrick et al. |
| 7,599,985 B2 | 10/2009 | Doyle et al. |
| 7,870,109 B2 | 1/2011 | Shilo et al. |
| 7,975,056 B2 | 7/2011 | Gmuender et al. |
| 8,234,575 B2 | 7/2012 | Hartin et al. |
| 8,275,863 B2 | 9/2012 | Selgas et al. |
| 8,516,132 B2 | 8/2013 | Selgas et al. |
| 2002/0029275 A1 | 3/2002 | Selgas et al. |
| 2002/0129064 A1 | 9/2002 | Guthrie |
| 2003/0195967 A1 | 10/2003 | Selgas et al. |
| 2003/0195968 A1 | 10/2003 | Selgas et al. |
| 2003/0204606 A1 | 10/2003 | Selgas et al. |
| 2004/0015592 A1 | 1/2004 | Selgas et al. |
| 2004/0030752 A1 | 2/2004 | Selgas et al. |
| 2011/0185411 A1 | 7/2011 | Selgas et al. |
| 2013/0139083 A1 | 5/2013 | Selgas et al. |
| 2013/0247157 A1 | 9/2013 | Selgas et al. |

FOREIGN PATENT DOCUMENTS

| | | |
|---|---|---|
| EP | 0336079 A2 | 10/1989 |
| EP | 03968341 A1 | 11/1990 |
| EP | 0479660 B1 | 4/1992 |
| EP | 0601254 A1 | 6/1994 |
| EP | 0667579 A1 | 8/1995 |
| EP | 0745924 A2 | 12/1996 |
| EP | 0762297 A2 | 3/1997 |
| EP | 0779751 A2 | 6/1997 |
| EP | 0779752 A2 | 6/1997 |
| EP | 0779753 A2 | 6/1997 |
| EP | 0779754 A2 | 6/1997 |
| EP | 0793170 A1 | 9/1997 |
| EP | 0814589 B1 | 12/1997 |
| EP | 0700625 A1 | 1/2002 |
| GB | 2289598 B | 11/1995 |
| JP | 08-340331 A | 12/1996 |
| WO | WO-9302419 A1 | 2/1993 |
| WO | WO-93/24890 A1 | 12/1993 |
| WO | WO-94/28683 A1 | 12/1994 |
| WO | WO-95/24011 A1 | 9/1995 |
| WO | WO-9619771 A1 | 6/1996 |
| WO | WO-96/39668 A1 | 12/1996 |
| WO | WO-97/05549 A1 | 2/1997 |
| WO | WO-97/09682 A1 | 3/1997 |
| WO | WO-9707656 A3 | 3/1997 |
| WO | WO-97/18662 A1 | 5/1997 |
| WO | WO-99/66692 A1 | 12/1999 |

OTHER PUBLICATIONS

U.S. Appl. No. 10/417,862; Response, Rule 131 Affidavit and Petition; Jan. 12, 2005.
U.S. Appl. No. 10/417,862; Office Action Jul. 26, 2005.
U.S. Appl. No. 10/417,862; Response; Sep. 12, 2005.
U.S. Appl. No. 10/417,862; Office Action; Nov. 29, 2005.
U.S. Appl. No. 10/417,862; Response; May 30, 2006.
U.S. Appl. No. 10/417,862; Supplemental Amendment; Jul. 31, 2006.
U.S. Appl. No. 10/417,862; Office Action; Aug. 23, 2006.
U.S. Appl. No. 10/417,862; Response with Petition; Jun. 25, 2007.

(56) References Cited

OTHER PUBLICATIONS

U.S. Appl. No. 10/417,862; Notice of Abandonment; Oct. 31, 2007.
U.S. Appl. No. 10/417,862; Decision on Petition; Dec. 27, 2007.
U.S. Appl. No. 10/417,862; Office Action; Aug. 11, 2008.
U.S. Appl. No. 10/417,862; Examiner's Interview Summary; Sep. 9, 2008.
U.S. Appl. No. 10/417,862; Response; Sep. 10, 2008.
U.S. Appl. No. 10/417,862; Office Action; Dec. 11, 2008.
U.S. Appl. No. 10/417,862; Response; Jun. 11, 2009.
U.S. Appl. No. 10/417,862; Final Office Action; Oct. 5, 2009.
U.S. Appl. No. 10/417,862; Response; Nov. 13, 2009.
U.S. Appl. No. 10/417,862; Office Action; Feb. 3, 2010.
U.S. Appl. No. 10/417,862; Response; Feb. 26, 2010.
U.S. Appl. No. 10/417,862; Applicant's Interview Summary; Mar. 15, 2010.
U.S. Appl. No. 10/417,862; Examiner's Interview Summary; Apr. 23, 2010.
U.S. Appl. No. 10/417,862; Applicant's Interview Summary; May 5, 2010.
U.S. Appl. No. 10/417,862; Applicant's Interview Summary; May 21, 2010.
U.S. Appl. No. 10/417,862; Applicant's Interview Summary; May 24, 2010.
U.S. Appl. No. 10/417,862; Supplemental Response; Jun. 11, 2010.
U.S. Appl. No. 10/417,862; Notice of Allowance; Aug. 17, 2010.
U.S. Appl. No. 10/417,862; Petition for Patent Term Adjustment; Sep. 17, 2010.
U.S. Appl. No. 10/417,862; Decision on Petition; Feb. 1, 2011.
U.S. Appl. No. 10/417,853; Office Action; Jul. 8, 2004.
U.S. Appl. No. 10/417,853; Examiner's Interview Summary; Oct. 13, 2004.
U.S. Appl. No. 10/417,853; Response with Petition; Jan. 10, 2005.
U.S. Appl. No. 10/417,853; Decision on Petition; May 4, 2005.
U.S. Appl. No. 10/417,853; Office Action (RR); Aug. 31, 2005.
U.S. Appl. No. 10/417,853; Response to Restriction Requirement; Sep. 12, 2005.
U.S. Appl. No. 10/417,853; Office Action (final); Feb. 10, 2006.
U.S. Appl. No. 10/417,853; Response; Jul. 31, 2006.
U.S. Appl. No. 10/417,853; Advisory Action; Aug. 9, 2006.
U.S. Appl. No. 10/417,853; Examiner's Interview Summary; Sep. 29, 2006.
U.S. Appl. No. 10/417,853; Office Action; Nov. 2, 2006.
U.S. Appl. No. 10/417,853; Examiner's Interview Summary; Dec. 6, 2006.
U.S. Appl. No. 10/417,853; Response; May 2, 2007.
U.S. Appl. No. 10/417,853; Notice of Non-Responsive Amendment; Aug. 3, 2007.
U.S. Appl. No. 10/417,853; Response; Sep. 4, 2007.
U.S. Appl. No. 10/417,853; Office Action (RR); Nov. 16, 2007.
U.S. Appl. No. 10/417,853; Response to Restriction Requirement; Dec. 17, 2007.
U.S. Appl. No. 10/417,853; Office Action (final); Mar. 26, 2008.
U.S. Appl. No. 10/417,853; Examiner's Interview Summary; May 28, 2008.
U.S. Appl. No. 10/417,853; Response; Jul. 3, 2008.
U.S. Appl. No. 10/417,853; Examiner's Interview Summary; Sep. 9, 2008.
U.S. Appl. No. 10/417,853; Office Action; Sep. 25, 2008.
U.S. Appl. No. 10/417,853; Examiner's Interview Summary; Feb. 2, 2009.
U.S. Appl. No. 10/417,853; Response with Petition, Affidavits/Exhibits; Mar. 19, 2009.
U.S. Appl. No. 10/417,853; Decision on Petition; Jun. 8, 2009.
U.S. Appl. No. 10/417,853; Examiner's Interview Summary; Sep. 29, 2009.
U.S. Appl. No. 10/417,853; Examiner's Interview Summary; Oct. 19, 2009.
U.S. Appl. No. 10/417,853; Applicant's Interview Summaries; Oct. 26, 2009.
U.S. Appl. No. 10/417,853; Applicant's Interview Summaries; Nov. 16, 2009.
U.S. Appl. No. 10/417,853; Examiner's Interview Summary; Nov. 23, 2009.
U.S. Appl. No. 10/417,853; Applicant's Interview Summary; Mar. 15, 2010.
U.S. Appl. No. 10/417,853; Office Action; Mar. 16, 2010.
U.S. Appl. No. 10/417,853; Examiner's Interview Summary; Apr. 23, 2010.
U.S. Appl. No. 10/417,853; Applicant's Interview Summary; May 5, 2010.
U.S. Appl. No. 10/417,853; Applicant's Interview Summary; May 21, 2010.
U.S. Appl. No. 10/417,853; Applicant's Interview Summary; May 24, 2010.
U.S. Appl. No. 10/417,853; Response; Jul. 2, 2010.
U.S. Appl. No. 10/417,871; Office Action; Feb. 6, 2007.
U.S. Appl. No. 10/417,871; Response; Aug. 6, 2007.
U.S. Appl. No. 10/417,871; Office Action; Oct. 15, 2007.
U.S. Appl. No. 10/417,871; Response; Jan. 15, 2008.
U.S. Appl. No. 10/417,871; Advisory Action; Jan. 25, 2008.
U.S. Appl. No. 10/417,871; Response; Apr. 15, 2008.
U.S. Appl. No. 10/417,871; Office Action; Oct. 15, 2008.
U.S. Appl. No. 10/417,871; Notice of Abandonment; Jun. 23, 2009.
U.S. Appl. No. 10/417,821; Office Action; Jul. 13, 2004.
U.S. Appl. No. 10/417,821; Response with Petition; Jan. 13, 2005.
U.S. Appl. No. 10/417,821; Decision on Petition; Mar. 2, 2005.
U.S. Appl. No. 10/417,821; Request Reconsideration of Petition; May 2, 2005.
U.S. Appl. No. 10/417,821; Office Action; May 11, 2005.
U.S. Appl. No. 10/417,821; Response; Jul. 11, 2005.
U.S. Appl. No. 10/417,821; Office Action; Aug. 1, 2005.
U.S. Appl. No. 10/417,821; Response; Sep. 12, 2005.
U.S. Appl. No. 10/417,821; Decision on Petition; Sep. 14, 2005.
U.S. Appl. No. 10/417,821; Office Action; Feb. 7, 2006.
U.S. Appl. No. 10/417,821; Response; Jul. 31, 2006.
U.S. Appl. No. 10/417,821; Office Action; Oct. 23, 2006.
U.S. Appl. No. 10/417,821; Examiner's Interview Summary; Dec. 6, 2006.
U.S. Appl. No. 10/417,821; Response; Apr. 23, 2007.
U.S. Appl. No. 10/417,821; Office Action; Jul. 13, 2007.
U.S. Appl. No. 10/417,821; Examiner's Interview Summary; Nov. 21, 2007.
U.S. Appl. No. 10/417,821; Response; Dec. 12, 2007.
U.S. Appl. No. 10/417,821; Office Action; Jun. 13, 2008.
U.S. Appl. No. 10/417,821; Response; Dec. 15, 2008.
U.S. Appl. No. 10/417,821; Office Action; Mar. 18, 2009.
U.S. Appl. No. 10/417,821; Response; Mar. 27, 2009.
U.S. Appl. No. 10/417,821; Office Action; Jun. 23, 2009.
U.S. Appl. No. 10/417,821; Response; Aug. 14, 2009.
U.S. Appl. No. 10/417,821; Office Action; Sep. 4, 2009.
U.S. Appl. No. 10/417,821; Examiner's Interview Summary; Oct. 7, 2009.
U.S. Appl. No. 10/417,821; Response; Mar. 4, 2010.
U.S. Appl. No. 10/417,821; Applicant's Interview Summary; Mar. 15, 2010.
U.S. Appl. No. 10/417,821; Examiner's Interview Summary; Apr. 23, 2010.
U.S. Appl. No. 10/417,821; Appeal Brief; May 4, 2010.
U.S. Appl. No. 10/417,821; Applicant's Interview Summary; May 5, 2010.
U.S. Appl. No. 10/417,821; Applicant's Interview Summary; May 21, 2010.
U.S. Appl. No. 10/417,821; Decision on Petition; Jun. 14, 2010.
U.S. Appl. No. 10/417,821; Advisory Action; Aug. 20, 2010.
U.S. Appl. No. 10/417,821; Examiner's Answer to Appeal Brief; Sep. 2, 2010.
U.S. Appl. No. 10/417,821; Reply Brief-Request for Oral Hearing Nov. 2, 2010.
U.S. Appl. No. 10/417,756; Office Action; Jun. 19, 2006.
U.S. Appl. No. 10/417,756; Response; Dec. 19, 2006.
U.S. Appl. No. 10/417,756; Office Action; Jan. 26, 2007.
U.S. Appl. No. 10/417,756; Response; Jul. 26, 2007.

(56) References Cited

OTHER PUBLICATIONS

U.S. Appl. No. 10/417,756; Office Action; Sep. 12, 2007.
U.S. Appl. No. 10/417,756; Response; Mar. 12, 2008.
U.S. Appl. No. 10/417,756; Office Action; Apr. 24, 2008.
U.S. Appl. No. 10/417,756; Response; Oct. 24, 2008.
U.S. Appl. No. 10/417,756; Examiner's Interview Summary; Nov. 28, 2008.
U.S. Appl. No. 10/417,756; Office Action; Jan. 13, 2009.
U.S. Appl. No. 10/417,756; Response; Jul. 13, 2009.
U.S. Appl. No. 10/417,756; Office Action; Oct. 21, 2009.
U.S. Appl. No. 10/417,756; Response; Apr. 20, 2010.
U.S. Appl. No. 08/827,691; Application as filed; Apr. 10, 1997; Inventor: John Guthrie.
U.S. Appl. No. 08/827,691; Office Action; Apr. 16, 1999.
U.S. Appl. No. 08/827,691; Response; Jul. 15, 1999.
U.S. Appl. No. 08/827,691; Final Office Action; Sep. 22, 1999.
U.S. Appl. No. 08/827,691; Examiner's Interview Summary; Jan. 10, 2000.
U.S. Appl. No. 08/827,691; Preliminary Amendment and RCE; Jan. 24, 2000.
U.S. Appl. No. 08/827,691; Final Office Action; Apr. 4, 2000.
U.S. Appl. No. 08/827,691; Appeal Brief; Nov. 30, 2000.
U.S. Appl. No. 08/827,691; Notice of Allowance, Notice of Allowability, Examiner's Amendment, Examiner's Interview Summary; Mar. 1, 2001.
U.S. Appl. No. 09/872,474; Application as filed Jun. 1, 2001; Inventor: John Guthrie.
U.S. Appl. No. 09/872,474; Office Action; May 23, 2002.
Aboba, Bernard, et al., "Dialup Roaming Requirements," ROAMOPS Working Group, Internet Draft, Dec. 30, 1996, SBCIMM 000488-000504.
Aboba, Bernard, et al., "Dialup Roaming Requirements," ROAMOPS Working Group, Internet Draft, Nov. 26, 1996, SBCIMM 000457-000472.
Aboba, Bernard, et al., "Review of Roaming Implementations," RFC 2194, Sep. 1997, SBCIMM 000383-000417.
Aboba, Bernard, et al., "The Network Access Identifier," ROAMOPS Working Group, Internet Draft, Mar. 6, 1997, SBCIMM 000511-000516.
Aboba, Bernard, et al., "The Network Access Identifier," ROAMOPS Working Group, Internet Draft, Feb. 25, 1997, SBCIMM 000505-000510.
Aboba, Bernard, et al., "The Network Access Identifier," ROAMOPS Working Group, Internet Draft, Nov. 26, 1996, SBCIMM 000473-000487.
Aboba, Bernard, et al., "The Network Access lndentifier," ROAMOPS Working Group, Internet Draft, May 22, 1997, SBCIMM 000517-000521.
Ads support 'free' e-mail services, Washington Post, Jun. 3, 1996, U 001090.
Advertising—Juno Would be delighted to handle your E-mail free, but she would like something in return, New York Times, 1996, U 001144.
Albinus, Philip, et al. "Ride the Wave with Graphical Online Services—Latest Offerings Promise Faster, Easier Suring (Hands-on Test Results)," Windows Magazine, Sep. 1, 1995 ELNKMM 005726-005735.
Allen, Mark, "The GNN Team in Ogden," Interaction, Jun. 1996, p. 13; AOL 032768.
AlterNet product literature, (Jun. 1992) MyMail 631808-631812.
America Online, version 3.0 installation materials, (1996) AOL 028466-028480.
American Heritage College Dictionary (excerpts), 3rd Ed., Houghton Mifflin Company, 1997; AOL078671-078690.
Anderson, Tim; "Visual Basic—A programming language and IDE developed by Microsoft"; Aug. 2008; http://knol.google.com/k/visual-basic.
Angus, Jeffrey Gordon, "Supra Simple offers fast 'net access with few hassles," Info World, vol. 18, No. 4, Jan. 22, 1996; ELNKMM 005704.

America Online, AOL executable files (Jun. 2, 1997) AOL 028489.
America Online, GNN 1.2 set-up files (Sep. 17, 2004), AOL 032703.
America Online, Single-User Version Internet in a Box 1 of 3, (Jan. 22, 2007), AOL 116227.
America Online, Single-User Version Internet in a Box 2 of 3, (Jan. 22, 2007), AOL 116229.
America Online, Single-User Version Internet in a Box 3 of 3, (Jan. 22, 2007), AOL 116231.
America Online, Instantly Create Personalized Multimedia (Jun. 24, 2005), AOL 116422.
America Online, CompuServe Internet in a Box, Disk 1, (Jan. 22, 2007), AOL 116423.
America Online, CompuServe Internet in a Box, Disk 2, (Jan. 22, 2007), AOL 116425.
America Online, CompuServe Internet in a Box, Disk 3, (Jan. 22, 2007), AOL 116427.
America Online, CompuServe Internet in a Box, Disk 4, (Jan. 22, 2007), AOL 116429.
America Online, Spry Mosaic Direct disk, (Jan. 22, 2007), AOL 116433.
America Online,Spry Mosaic Direct disk, (Jan. 22, 2007), AOL 116435.
America Online, Spry Mosaic Direct in a Box disk, (Jan. 22, 2007), AOL 116546.
America Online, The AOL Connection Process and the AOL Adapter, (Nov. 2, 1999), AOL 014417-014419.
Apple Computer, "Inside Macintosh Networking With Open Transport"; Apple Computer, Inc., Jan. 15, 1998; (40 pgs) http://developer.apple.com/documentation/mac/NetworkingOT/NetworkingWOT-2.html.
Ask Apache; "Alexa Toolbar Add-On for Firefox Works!"; http://www.askapache.com/tools/alexa-toolbar-firefox.html; Aug. 20, 2007.
Associated Press, "GTE with Uunet, Signs on the Internet," The New York Times, Jul. 11, 1996, GTE 16646.
AT&T Corp., AT&T Business Network launches on the Web, Database Magazine, vol. 19, Issue 4, p. 9, Aug./Sep. 1996, ATT 018247.
AT&T Corp., AT&T Combines, Information Week, Issue 589, p. 28, Jul. 22, 1996, ATT 018275.
AT&T Corp., AT&T drops Notes: Puts focus on Net, Electronic Buyer's News, Issue 997, p. 66, Mar. 11, 1996, ATT 018244.
AT&T Corp., AT&T WorldNet Service, version 1, Quick Start Guide, (Apr. 12, 1996), ATT 000005-000037.
AT&T Corp., AT&T WorldNet Service, version 2. Quick Start Guide, (1996), ATT 000247-000285 and ATT 003136-003169.
AT&T Corp., AT&T WorldNet Service, version 2.02 Quick Start Guide, (1996), ATT 000325-000363.
Automatic Local Access Number Selection, IBM Technical Disclosure Bulletin, vol. 38, No. 8, pp. 237-238, Aug. 1995, U 003121-003122.
Bailey, George, "Establishing an IP Connection," No Name Newsletter, Sep. 1996, SBCCIMM 000445-000447.
Banner, The : Second-Generation Web Services Promise Advertisers a Faster, Smarter Experience, (Jul. 1996), U 001099-001101.
Bass, Steve, et al., "Hot Picks for the Home Office," PC World, vol. 14, Issue 12, Dec. 1996, ATT 018240-018241.
Bell Atlantic, Bell Atlantic.net, version 1.0 reference and installation materials, (1996), GTE 004564-004577.
Berners-Lee, T. and Connolly, D.; "Hypertext Markup Language—2.0"; http://tools.ietf.org/html/rfc1866; Network Working Group, Nov. 1995.
Berners-Lee, T. et al; "Hypertext Transfer Protocol—HTTP/1.0"; Network Working Group, (May 1996); http://tools.ietf.org/html/rfc1945.
Bloom, Paul, et al., "A Network Solution for Improved Security for Computer Access," Computer Technologies for the 90s, Oct. 1988 ELNKMM004220-004223.
Bloomberg Business News, "Company News: Bell Atlantic to Offer Internet Access," The New York Times, Apr. 11, 1996, GTE 16647.
Bowen, Charles, "How to Get the Most Out of CompuServe," CompuServe Magazine, Dec. 1995, AOL 032743.

(56) References Cited

OTHER PUBLICATIONS

Bowen, Charles, et al. How to Get the Most Out of CompuServe, 5th Ed., New York, N.Y., Random House Electronic Publishing, 1993 SBCIMM000748-000750.
Brinkley, Joel. "Two Industries Fight for a $150 Billion Prize," The New York Times, Mar. 28, 1997, ATT 018369-018372.
Busch, David D., "The suite sell of access—Integrated application suites will let you finally take full advantage of the net," Netguide, No. 304, (1996), ELNKMM 005712-005725.
Caffrey, Brian, "Plugging into the power of the Internet," Electronic Buyer's News, Issue 995, p. 65, Feb. 26, 1996, ATT 019622-019626.
Carr, Gregory W., Letter to General Counsel USPTO via First Class Mail regarding U.S. Appl. No. 10/417,853; Feb. 2, 2010.
Carr, Gregory W., Letter to General Counsel USPTO via Hand Delivery regarding U.S. Appl. No. 10/417,853; Feb. 2, 2010.
Carr, Gregory W., Letter to General Counsel USPTO via First Class Mail regarding U.S. Appl. No. 10/417,821; Feb. 23, 2010.
Carr, Gregory W., Letter to General Counsel USPTO via Hand Delivery regarding U.S. Appl. No. 10/417,821; Feb. 24, 2010.
Carr, Gregory W., Letter to General Counsel USPTO via First Class Mail regarding U.S. Appl. No. 10/417,862; Feb. 23, 2010.
Carr, Gregory W., Letter to General Counsel USPTO via Hand Delivery regarding U.S. Appl. No. 10/417,862; Feb. 24, 2010.
Carr, Gregory W.; Letter to Director David Kappos, USPTO; Feb. 25, 2010.
Prodigy, installation disk, CD ROM, (date unknown)), SBCIMM 000786.
Access Net Direct, CD ROM, 1.0 Installation Disks (early kit later named Prodigy Internet), (date unknown), SBCIMM 000782.
Bell Atlantic, CD ROM re: Bell Atlantic 1.0 (1996), DR00001379.
GTE, CD ROM re: GTE Internet (1996), DR00001378.
Prodigy, CD ROM re: Prodigy Trial Offer Installation Disk, version 1.5, (Jan. 9, 2007), SBCIMM 000784.
Prodigy, CD ROM re: executable files, (Jan. 9, 2007), SBCIMM 000781.
Prodigy, CD ROM re: executable files, (date unknown), SBCIMM 000783.
Charski, Mindy, et al., "Free E-Mail: A Viable Option for Careful Consumers," PC World, vol. 15, Issue 7, Jul. 1997, ATT 018237-018239.
Chen, Elaine, "Data net," Electronic News (North America), vol. 42, Issue 2118, May 27, 1996, ATT 018273-018274.
Chen, Elaine, "IBM first major firm to unveil NC. (IBM's Network Station Internet access terminal)," Electronic News, vol. 42, No. 2133, Sep. 9, 1996 ELNKMM004186.
Clegg, Steven G., "Apple Eases Internet Access," LAN Times, vol. 13, No. 8, Apr. 15, 1996 ELNKMM005705.
CNET staff, "PSINet sells consumer accounts," CNET News.com—Tech News First, Jun. 29, 1996 SBCCIMM000444.
Cole, David M., "The Cole Digest, February 7, 1996," The Cole Digest, Feb. 7, 1996, SBCCIMM 000454-000456.
CompuServe Guide for New Members, Jan. 1996 AOL032706-032731.
CompuServe Guide for New Members, May 1996 AOL032749-032763.
CompuServe Magazine, Dec. 1995 AOL032732-032741.
CompuServe, Microsoft Forge Major Strategic Alliance, Microsoft PressPass, Jun. 4, 1996, ATT 018213-018215.
Compuserve, Network Access Numbers, (Aug. 1995), AOL 086221-086243.
Connect Atlanta, Access America Agreement, (Jan. 1995), ELNKMM 013101-013104 and ELNKMM 013107.
Connolly, D. and Masinter, L.; "The 'text/html' Media Type"; http://tools.ietf.org/html/rfc2854; Network Working Group, The Internet Society; Jun. 2000.
Cooney, Michael, "New software helps remote users access mainframe application," Network World, Jan. 11, 1993; ELNKMM004204.
Cutts, Matt; "Gadgets, Google, and SEO—Toolbar Beta 4"; http://www.mattcutts.com/blog/toolbar-beta-4/; Jan. 30, 2006.
Davis, Frederic E., "Windows 95: The Internet's Built in—Microsoft's Internet-savvy operation system will make online exploration a snap (Frontiers, Both Old and New)," Netguide, No. 210, (2004), ELNKMM 005706-005711.
Davis, Steve, CompuServe: Complete Handbook and Membership Kit, 2nd Edition, Prima Publishing, (1996), AOL 085208-085740.
Dawson, Keith, "TBTF for Nov. 12, 1996: Where seek is find," Tasty Bits from the Technology Front, Nov. 13, 1996, SBCIMM 000418-000425.
Dear Windows 95 Beta Tester letter from Microsoft, Mar. 1995, MYMAIL 007263.
Dear Windows 95 Beta Tester letter from Microsoft, Oct. 1994, MYMAIL 007264.
Dear Windows Developer letter from Microsoft, Mar. 15, 1995, MYMAIL 007259-007261.
Messina, Judith, Delivering On-Line, Crain's New York Business, vol. 14, Issue 13, p. 3, (Mar. 30, 1998), 0001136-001137.
Dern, Daniel P., "Better self-installing 'Internet packages' begin to arrive," Networking Computing, vol. 6, Issue 8, p. 34, Jul. 1, 1995, ATT 018325-018326.
Di Carlo, Lisa, "Banyan's ENS for NetWare improves access to VINES," PC Week, Dec. 20, 1993 ELNKMM004196.
dictionary.com; "database definition"; http://dictionary.reference.com/browse/database, Apr. 8, 2009.
GNN, Did you say HTML?, Interaction, Jun. 1996, p. 12 AOL032767.
Digital Shelf Space, Wired, Dec. 1995, U 001142-001143.
Dodd, Annabel Z., Essential Guide to Telecommunications, Second Edition., Prentice Hall PTR, 2000.
GTE Internet, executable files disk, (Nov. 17, 2004), DR 001378.
Bell Atlantic, executable files disk, version 1.0 (Nov. 17, 2004), DR 001379.
GTE, Internet Solutions executable files disk, (Nov. 17, 2004), DR 001380.
Dunlap, Charlotte, "AT&T Business Network aims for corporate clients," Computer Reseller News, Issue 651 p. 49, Oct. 2, 1995, ATT 018353-018354.
Dunlap, Charlotte, "CompuServe pits NetScape v. Lotus," Computer Reseller News, Issue 684, p. 53, May 20, 1996, ATT 018346-018347.
Dunlap, Charlotte, "Internet access hooks vendors, resellers eager for new market," Computer Reseller News, Issue 629, p. 51, May 8, 1995, ATT 018344-018345.
EarthLink Network, EarthLink Announces 'Total Access' Complete Low Cost Internet Access, M2 Presswire, May 24, 1995, ELNKMM 008053-008054.
EarthLink Network, Earthlink Goes Nationwide; Hooks up in 150 Towns, NetGuide, vol. 2, Issue 11, Nov. 11, 1995, ELNKMM 008046.
EarthLink Network, Open the Door to the Internet, (May 1, 1995), ELNKMM 006038-006040.
EarthLink Network, Total Access Internet reference and installation materials, (1996), ELNKMM 014325-014342, ELNKMM 014366-014375, and ELNKMM 015597-015634.
EarthLink Pairs with UUNet, Computer Reseller News, Issue 647, Sep. 6, 1995, ELNKMM 008045.
Edell, Richard et al., "Billing Users and Pricing for TCP," IEEE Journal on Selected Areas in Communications, Sep. 1995, vol. 13, pp. 1162-1175.
Edwards, John, "Making a Good Thing Better," CompuServe Magazine, Jan. 1996, AOL 032727-032731.
Edwards, John, "Single Sign-On Technology Streamlines Network Access," Software Magazine, Nov. 1993; ELNKMM004198-004200.
EarthLink Network, TA 2.0 (Aug. 25, 1998); TA 1.69 WIN3.1 (Mar. 21, 1997); TA 2.0.0 45576 for WIN 95, ELNKMM 014281.
EarthLink Network, EarthLink Total Access Internet Installation CD 1996, ELNKMM 014296.
EarthLink Network, EarthLink Total Access Internet Installation CD 1996 w/ Netscape Navigator, ELNKMM 014297.
EarthLink Network, EarthLink Network Virtual Vineyards Epicurious Foods Installation CD 1996, ELNKMM 014298.
EarthLink Network, Total Access Internet w/ Netscape Navigator Installation CD 1996 (Black), ELNKMM 014299.

(56) References Cited

OTHER PUBLICATIONS

EarthLink Network, EarthLink Network Total Access Internet w/ Netscape Navigator Internet Phone Installation CD 1996, ELNKMM 014300.
EarthLink Network, EarthLink Network Total Access Internet CompUSA w/ Netscape Navigator Install CD 1996, ELNKMM 014301.
EarthLink Network, EarthLink Network Total Access Internet w/ Netscape Navigator, AirWarrior and Poker Installation CD 1996, ELNKMM 014302.
EarthLink Network, Total Access Internet Lollapalooza 1996, ELNKMM 014303.
Earthink Network, Bruin ONline Gold Pilot Release, (Sep. 11, 1997), ELNKMM 014314.
EarthLink Network, Total Access Internet Windows 3.1, Disk 1, (Mar. 21, 1996), ELNKMM 014327.
EarthLink Network, Total Access Internet Windows 3.1, Disk 2, (Mar. 19, 1996), ELNKMM 014328.
EarthLink Network, Total Access Internet, Disk 1, (Mar. 18, 1996), ELNKMM 014331.
EarthLink Network, Total Access Internet, Disk 2, (Mar. 20, 1996), ELNKMM 014332.
EarthLink Network, Total Internet Access for Windows 95, Disk 1 (Oct. 10, 1995), ELNKMM 014339.
EarthLink Network, Total Internet Access for Windows 95, Disk 2, (Oct. 10, 1995), ELNKMM014340.
EarthLink Network, Total Access Internet for Windows 95, Disk 1, (Mar. 21, 1996), ELNKMM 014343.
EarthLink Network, Total Access Internet for Windows 95, Disk 2, (Sep. 4, 1996), ELNKMM 014344.
EarthLink Network, Windows 95—EarthLink Network Custom Masters v. 1.3.1, Disk 1, (Mar. 21, 1996), ELNKMM 014345.
EarthLink Network, Windows 95—EarthLink Network Custom Masters v. 1.3.1, Disk 2, (Sep. 4, 1996), ELNKMM 014346.
EarthLink Network, Windows 95—EarthLink Network Custom Masters v. 1.3.1, Disk 3, (May 3, 1996), ELNKMM 014347.
EarthLink Network, Backup with MacWeb TA 2.0.2 BOL Gold 980818, (Aug. 12, 1998), ELNKMM 014353.
Govan, Dave, E-mail for free, Waterbury Republican-American, Jul. 14, 1996, U 001103.
Busch, Melanie, E-Mailer on WorldCom Lines, Tulsa World, Jun. 4, 1996, U 001091.
Engst, Adam C., et al., "Spry Internet in a Box," Chapter 11, Internet Starter Kit for Windows, Hayden Books, 1995.
Fielding, R. et al; "Hypertext Transfer Protocol—HTTP/1.1"; Network Working Group, Jan. 1997; http://tools.ietf.org/html/rfc2068.
Fielding, R. et al; "Hypertext Transfer Protocol—HTTP/1.1"; Network Working Group, Jun. 1999; http://tools.ietf.org/html/rfc2616.
Firdman, Eric, "How to Unclog the Internet," The New York Times, Feb. 9, 1997, ATT 018373-018373-018374.
Fisher, Lawrence M., "5 Regional Phone Companies Select Netscape," The New York Times, Dec. 10, 1996, GTE 16653-16654.
Free e-mail service Juno says has 100,000 members, Reuters America, Inc., Jul. 2, 1996, U 001095-001096.
Free E-mail with Advertising, Sarah Stambler's Marketing with Technology News, Aug. 25, 2995, U 001210.
Free e-mail, but with a Catch, Business Week, Apr. 29, 1996, U 001146.
Free Mail, Part Two: Two Companies Announce Free Internet E-mail Services, Multimedia & Videodisc Monitor, Aug. 1995, U 001181-001182.
Free Online Dictionary of Computing; "Browser"; http://foldoc.org/?query=browser; May 31, 1996.
Free Online Dictionary of Computing; "Database"; http://foldoc.org/index.cgi?query=database; Nov. 17, 2005.
Free Online Dictionary of Computing; "Document"; http://foldoc.org/index.cgi?query=document; Oct. 25, 2003.
Free Online Dictionary of Computing; "MIME==> Multipurpose Internet Mail Extensions"; http://foldoc.org/?query=MIME; Apr. 4, 1995.
Free Online Dictionary of Computing; "Toolbar"; http://foldoc.org/?query=toolbar; Oct. 24, 2003.
Free Online Dictionary of Computing; "Window System"; http://foldoc.org/?query=window+system; Mar. 3, 2009.
Freed, N. et al.; "Multipurpose Internet Mail Extensions (MIME) Part One: Format of Internet Message Bodies"; Network Working Group RFC 2045; Nov. 1996; http://www.ietf.org/rfc/rfc2045.txt.
Freedman, Alan; "The Computer Glossary—The Complete Illustrated Dictionary, Eight Edition"; pp. 89-91, 428, 463; The Computer Language Company, Inc., Point Pleasant, PA / American Management Association, New York, NY; 1998.
Freemark, Juno Online Plan to Offer Free Electronic Mail Accounts for Those Prepared to Receive Ads with Mail, Aug. 15, 1995, U 001209.
Furr, Joe, "The Spirit in the Sky," NetGuide, vol. 2, Issue 5, May 1, 1995, ELNKMM 008050.
Gerwig, Kate, "Earthlink Expands Access," Interactive Age, vol. 2, Issue 21, p. 8, Aug. 14, 1995, ELNKMM 008055-008056.
Going Beyond, Media Week, Jul. 8, 1996, U 001097-001098.
Gonzalez, Fred; "Massing/Gmuender Declaration" Electronic Mail of Mar. 12, 2009.
GPT Communications Systems' new ISDN solution integrates calling line identification to safeguard corporate network from unauthorized access, Communicate, May 1996; ELNKMM004179.
Groves, Dawn with John Overbaugh, Mosaic in a Box/World Wide Web: 101—A step-by-step guide for getting connected to the Internet, 1995.
Gryphon, Robert, "Network Central eases file sharing; users can group files into projects for better access," InfoWorld, vol. 16, No. 37, Sep. 12, 1994.
GTE, Internet Installation Guide, version 3.01, (1994-1996), GTE 004512-004531.
Haight, Timothy, et al., "No free lunch, but free Internet e-mail," Network Computing, vol. 6, Issue 10, p. 23, Sep. 1, 1995, ATT 018219.
Haller, N., et al., On Internet Authentication, RFC 1704, Oct. 1994; U003145-003156.
Halliday, Caroline M., The Trail Guide to Prodigy, Reading, MA, Addison-Wesley Publishing Company, 1995, SBCIMM 000760-000762.
Hardmeier, Sandi; "The History of Internet Explorer"; http://www.microsoft.com/windows/ie/community/columns/historyofie.mspx; Microsoft Corp., Aug. 25, 2005.
Heartland, Amanda. Prodigy DOS/IBM PC Quick Reference Guide, New York, N.Y., DDC Publishing, 1993, SBCIMM 000763-000765.
Hergert, Douglas. How to Use Prodigy, Emeryville, CA, Ziff-Davis Press, 1994, SBCIMM 000766-000768.
Herve, R., "A portable component for access control and network protection," Data Processing and Information, vol. 2., 1980 ELNKMM008105-008106.
Higgs, Scott, "Windows to the Internet," Byte, Jul. 1995.
Highbeam Research; "Free utility from Infoseek adds live search box to browser"; http://www.highbeam.com/doc/1G1-18752480.html; Information Today, Oct. 1, 1996.
Highbeam Research; "Infoseek Introduces Utility to Add Search Capabilities to Netscape Navigator"; http://www.highbeam.com/DocPrint.aspx?DocId=1G1:18633135; PR Newswire, Sep. 3, 1996.
Highbeam Research; "New Version of Infoseek Quickseek Lets Users Search the Internet Directly From the Browser Address/Locator Bar"; http://www.highbeam.com/DocPrint.aspx?DocId=1G1:19146270; PR Newswire, Feb. 24, 1997.
Holonet UUCP, product literature, (Dec. 17, 1994), ELNKMM 013123-013130.
Hot Stuff!, Home PC, vol. 3, Issue 2, Feb. 1996, ATT 019619-019621.
Hsieh et al.; JAVA Bytecode to Native Code Translation: The Caffine Prototype and Preliminary Results, Proceedings of the 29th Annual IEEE/ACM Inter. Symposium on Microarchitecture, Dec. 1996, pp. 90-97.
I Own, Therefore I Am, NetGuide, vol. 2, Issue 8, Aug. 1, 1995, ELNKMM 008047-008049.
I'm Just Glad Somebody Wants My Business, PC Magazine, Jul. 1996, U 001093.

(56) References Cited

OTHER PUBLICATIONS

Intelitrak's Citadel Gatekeeper Uses Voice Verification for Secure Network Access, Jul. 1996 ELNKMM004273-004274.
Interaction—The Members Services Monthly, Aug. 1996, AOL 032766.
Interaction—The Members Services Monthly, Mar. 1996, AOL 032764-032765.
Internet Atlanta, Inc., product literature, (date unknown), ELNKMM 013118-013122.
Internet Connection, The, product literature re: The Internet Connection, Jan. 13, 1995, ELNKMM 013100 and ELNKMM 013141-013145.
Spry, Inc., Internet in a Box: Getting Started, O'Reilly & Associates, Inc., 1994.
Spry, Inc., Internet in a Box: Installation & Configuration Guide, O'Reilly & Associates, Inc., 1994.
Investment Perspective: The Digital World—America Online, Motley Fool, Jan. 30, 1996 AOL011277-011283.
Jed Savage: Juno's Point Man in Selling 'Free' Email, Marketing Computers, vol. 16, Issue 4, Apr. 1996, ATT 018218.
Johnson, Ned, Navigating the Internet with Prodigy, Indianapolis, IN, Sams.net Publishing, 1995, SBCIMM 000778-000780.
Juno Enters Free E-mail Race, Electronic Marketplace Report, Jul. 18, 1995, U 001213-001214.
Juno Hints at shape of things to come, Financial Times, Jul. 29, 1996, U 001145.
Juno Jumps on Free E-Mail Bandwagon, DM News, Jan. 15, 1996, U 001183-001184.
Juno Launches America's First Free Internet E-Mail Service Today, (press release), Apr. 22, 1996, U 001165-001168.
Juno Launches Free E-mail Service, Wall Street & Technology, Jul. 1996 U001094.
Juno Set to Brand E-mail with $10M, Brandweek, Apr. 22, 1996, U 001148.
Juno Signs up 100,000 Members in First Two Months, (press release), Jul. 2, 1996, U 001176-001177.
Kane, Pamela., Prodigy—Made Easy, Berkeley, CA, Osborne McGraw-Hill, 1991, SBCIMM 000775-000777.
Kane, Pamela., Prodigy!!!, Wilmington, DE, Panda Press, 1994, SBCIMM 000754-000756.
Kemp, Fred, "ACW Connections: Accessing the World Wide Web, or Enlightenment Regarding the Internet and Browsing from Home in a Few Easy Concepts," 1995.
Kiely, Don; "Breezing to Visual Basic 4.0"; Information Week, Apr. 1996; http://www.informationweek.com/574/74advis.htm.
Kim, James, "E-mail soon to become free-mail", USA Today, Apr. 22, 1996, U 001147.
Klein, Amit; "Meta Refresh as a Response Header"; Beyond Security; Nov. 2006; http://www.securiteam.com/securityreviews/6Z00320HFQ.html.
Kronick, S.; "Netscape Navigator Handbook"; Netscape Communications Corp., ed. Aug. 1, 1996.
Landler, Mark, "Microsoft Near Deal to Acquire Cable TV Stake," The New York Times, Jun. 9, 1997, ATT 018367-018368.
LANtastic 7.0: Netscape Navigator 2.01 and SPRYNET, 1996.
Leech, M., Username/Password Authentication for SOCKS V5, RFC 1929, Mar. 1996; U003160-003161.
Lenuzza, Mara, "CompuServe dials the reseller channel to meet big customer needs," VARBusiness, vol. 11, Issue 12, p. 48, Aug. 1995, ATT 018365-018366.
Levine, Daniel B., "First Class E-Mail: Six tools that get your Internet message across," PC World, vol. 15, Issue 8, Aug. 1997, ATT 018223-018226.
Lewis, Peter H., "TV Screen Opens Onto Internet," The New York Times, Oct. 22, 1996, ATT 018375-018377.
Lichty, Tom, Official America Online Tour Guide for Windows 2.5, The, Ventana, 1994, AOL 033105.
Lichty, Tom, Official America Online Tour Guide for Windows 3.1, The, Ventana, 1996, AOL 033106.
Lindholm, Elizabeth, "Tools for Remote LAN Access," Datamataion, Apr. 1, 1994; ELNKMM004190-004191.
Lindstrom, Annie, "BellSouth to give users direct access to AIN (Advanced Intelligent Network)," Communications Week, No. 462, Jul. 12, 1993 ELNKMM004202-004203.
Lloyd, B., PPP Authentication Protocols, RFC 1334, Oct. 1992 SAN0190-0201.
Local Internet Access from Mindspring Enterprises, Inc., 1994, ELNKMM 013146-013148.
Lowe, Doug, Microsoft Network for Dummies, IDG Books Worldwide, 1995, AOL028484.
M.A.K., et al. "AT&T dials into the net," NetGuide, vol. 2, Issue 11, p. 21, Nov. 1995, ATT 018283-018284.
Maher, R.C.; Simple But Useful Tools for Interactive WWW Development, Proceedings of the 26th Annual Conf. Frontiers in Education Conference, Nov. 1996, p. 1035-1038 vol. 3.
Markoff, John, "U.S. Classifies Web TV Technology as a Weapon," The New York Times, Nov. 8, 1996, ATT 018378-018379.
Marshall, James; "HTTP Made Really Easy, A Practical Guide to Writing Clients and Servers"; (1997); http://www.jmarshall.com/easy/http.
Masud, Sam, "AT&T to fold NetWare service into Worldnet," Computer Reseller News, Issue 692, p. 2, Jul. 15, 1996, ATT 018348-018349.
Maybe More than E-mail Should be Free, PC Week, Jun. 10, 1996, U 001092.
McCusker, Tom, "Take Control of Remote Access," Datamation, Apr. 1, 1994 ELNKMM 004192-004194.
McFall, C., "An Object Infrastructure for Internet Middleware," IEEE Internet Computing, vol. 2, No. 2, pp. 46-51, Apr. 1998.
Merriam-Webster; "Database—Definition from the Merriam-Webster Online Dictionary"; http://www.merriam-webster.com/dictionary/database, Apr. 8, 2009.
Merrriam-Webster Online, excerpts re "800 number" and "modified"; (Feb. 3, 2005).
Meyer, B. et al.; Enabling networking between heterogeneous distributed platforms, Distributed Platforms: Client/Server and Beyond: DCE, CORBA, ODP and Advanced Distributed Applications, Proceedings of the IFIP/IEEE International Conference on; p. 329-341; Feb/Mar. 1996 (abstract).
Microsoft Announces 'Normandy,' a New Platform for Commercial Internet Services: First Solution Designed Specifically for ISPs, Commercial Web Sites, Microsoft PressPass, Jun. 4, 1996, ATT 018210-018212.
Microsoft Corp., "Customizing the Standard Buttons toolbar in Internet Explorer"; http://support.microsoft.com/kb/198177; Microsoft Corp., May 10, 2007.
Microsoft Corp., "How to Customize the Quick Launch Toolbar"; http://support.microsoft.com/kb/171206; Microsoft Corp., Jun. 5, 2007.
Microsoft Corp., "How to Customize the Toolbars in Internet Explorer"; http://support.microsoft.com/kb/153593; Microsoft Corp., Jan. 19, 2007.
Microsoft Corp., "How to Re-create the View Channels Icon on Quick Launch Toolbar"; http://support.microsoft.com/kb/195737; Microsoft Corp., Feb. 27, 2007.
Microsoft Corp.; "About Dynamic Data Exchange"; http://msdn.microsoft.com/en-us/library/ms648774(printer).aspx; Microsoft Corp., 2009.
Microsoft Corp.; "Introduction to ActiveX Controls"; http://msdn.microsoft.com/en-us/library/aa751972(VS.85,printer).aspx; Microsoft Corp., 2009.
Microsoft Corp.; "Windows History—Internet Explorer History"; http://www.microsoft.com/windows/WinHistoryIE.mspx; Microsoft Corp., Jun. 30, 2003.
Microsoft Corp.; "How to Package Components for Internet Distribution"; http://msdn.microsoft.com/en-us/library/aa741200(VS.85).aspx Apr. 6, 2009.
Microsoft Corp.; "Registry (Windows)"; http://msdn.microsoft.com/en-us/library/ms724871.aspx, Apr. 2, 2009.
Microsoft Corp.; "NT 4.0 Resource Kit Utilities Corrections and Comments"; http://support.microsoft.com/kb/159564, Jan. 19, 2007.

(56) References Cited

OTHER PUBLICATIONS

Microsoft Corp.; "SysAdmin Installs Incorrectly from Normandy Beta 2 CD"; http://support.microsoft.com/kb/158988, Sep. 30, 2003.
Microsoft Corp.; "Microsoft Announces Record Fiscal 1996 Revenues and Income"; http://download.microsoft.com/download/9/6/7/9671cf43-454f-4cde-b2d6-dc49c9a4a57a/FY1996Q4_earnings.doc, Jul. 22, 1996.
Microsoft Corp.; "Microsoft Announces Internet Referral Server to Facilitate Selection of Internet Service Provider for Users of Windows, Microsoft Internet Explorer"; Jul. 30, 1996; http://www.microsoft.com/presspass/press/jul96/reflsvpr.mspx.
Microsoft Press Computer Dictionary (excerpts), 3rd Ed., Microsoft Press, 1997 AOL078691-078695; AOL078703-078705; one page not labeled.
Miller, Michael, Using Prodigy—The Fast and Easy Way to Learn, Indianapolis, IN, Que Corporation, 1995, SBCIMM 000751-000753.
Miller, Tracy Mygrant, "E-Mail Essentials," CompuServe, Feb. 1996, AOL 032744-032748.
MindSpring Enterprises, Inc., press release re: MindSpring Announces Second Quarter Results, Jul. 22, 1998, ELNKMM 013067-013070.
MindSpring Enterprises, Inc., press release re: America Gets Connected as MindSpring's World Wide Web Wagon Tours Across the Country, Sep. 23, 1998, ELNKMM 013063-013066.
MindSpring Enterprises, Inc., press release re: MindSpring Introduces Dedicated ISDN Service in Atlanta—Affordable, Full-Time Connections for Small or Home Offices, Jul. 1, 1998, ELNKMM 013075.
MindSpring Enterprises, Inc., press release re: MindSpring Introduces V.90 Service, Aug. 11, 1998, ELNKMM 013074.
MindSpring Enterprises, Inc., press release re: MindSpring Purchases SPRYNET Subscribers and Other Assets from America Online, Inc., Sep. 10, 1998, ELNKMM 013071.
MindSpring Enterprises, Inc., press release re: MindSpring to Offer Two-Way Cable Modem Service via KNOLOGY's Broadband Network, Aug. 31, 1998, ELNKMM 013072-013073.
Moltzen, Edward F., "IBM Eyes Remote NC Access: IBM is merging LDAP with its network computer platform, which will enable remote log-on and access to data," Computer Reseller News, May 12, 1997 ELNKMM004173-004174.
More Big Guns Enter Microsoft—Justice Fray, Newsbytes, Aug. 9, 1995, ELNKMM 008059-008061.
NC State College; "Parts of a Web Browser;" http://www.ncstatecollege.edu/Webpub/ccraig/images/Searching_the_Web.pdf; North Carolina State College; Jan. 31, 2006.
Nelson, Larry; "Developing and distributing audio applications with Visual Basic and ToolBook"; Australian Journal of Educational Technology 1994, 10(2), 119-127; http://www.ascilite.org.au/ajet/ajet10/nelson.html.
Netcom product literature, 1994, ELNKMM 013045-013062.
Netcom product literature, Jan. 13, 1995, ELNKMM 013131-013140.
NetSafe, Inc., NetSafe Navigation information re: Email—Where to Get It, Mar. 21, 1996, MASS 000276-000283.
NetSafe Inc., Neat! product literature, (May 26, 1997), MyMail 009677-009686.
NetSafe, Inc., Neat! Quick Start Guide, (May 1997), MyMail 009690-009701.
NetSafe, Inc., Neat! version 3.0 Beta Review, (Oct. 1996), MASS 000106-000109.
NetSafe, Inc., Netrepreneur Introduction Manual, (Nov. 1996), MyMail 003368-003391.
NetSafe, Inc., Netrepreneur Training Course, (Nov. 7, 2004); pp. 1-40.
NetSafe, Inc., product literature re: system security, 1998, MyMail 009120-009139.
Netscape; "An Exploration of Dynamic Documents"; 1999; http://web.archive.org/web/20020802170847/http://wp.netscape.com/assist/net_sites/pushpull.html.
Network Security: U.S. Robotics and Security Dynamics Team for Enhanced Remote Access Security Solution; U.S. Robotics Adds to Existing Enterprise-Wide Network Access Security with SecurID Support, Edge, Sep. 23, 1996 ELNKMM004265-004266.
Neumann, A.J., "A Basis for Standardization of User-Terminal Protocols for Computer Network Access," U.S. Department of Commerce, National Bureau of Standards Technical Note 877, Jul. 1975; ELNKMM004227-004254.
Newrock, Melody, The Trail Guide to the Microsoft Network, Addison-Wesley Publishing Company, 1996 U002975-002988.
News in Brief, Electronic Advertising & Marketplace Report, vol. 11, Issue 14, Jul. 15, 1997, ATT 018242-018243.
Newsome, M. et al., "HyperSQL: web-based query interfaces for biological databases," Proceedings of the Thirtieth Hawaii International Conference on System Science, Wailea, HI, USA, Jan. 7-10, 1997 (abstract).
O'Hara, Shelley, et al., "Official EarthLink Beginners Guide to the Internet," Chapter 3, Ventana Communications Group, 1997, ELNKMM 007952-008011.
Spry, Inc., Online Catalog: Internet in a Box, www.oreilly.com; (2005).
Online Service Banks on No-Fee Access, PROMO: The Magazine for Promotional Marketing, Jun. 1996, U 001089.
Online service connection, The, NetGuide, vol. 3, Issue 1, p. 66, Jan. 1996; ATT018303-018304.
Osier, Dan, et al.; "Sams Teach Yourself Delphi 3 in 14 days"; p. 277, SAMS Publishing, Indianapolis, Indiana; 1997.
NetSafe, Inc., Owning a Toll Booth on the Information Super Highway, (1996), MyMail 003398-003416.
Perkins, Doug, "Point-to-Point Protocol for the transmission of multi-protocol datagrams over Point-to-Point links," RFC 1171, Jul. 1990, SBCIMM 000543-000593.
Perkins, Doug, "Requirements for an Internet Standard Point-to-Point Protocol," RFC 1547, Dec. 1993, SBCIMM 000522-000542.
Perkins, Doug, et al., "Point-to-Point Protocol (PPP) Initial Configuration Options," RFC 1172, Jul. 1990, SBCIMM 000594-000633.
Pogue, David and Biersdorfer, J. D.; "The Internet: The Missing Manual"; pp. 47-50; O'Reilly Media, Inc., Sebastopol, California; 2006.
Polilli, Steve, "Vendors enhance security across enterprises; IBM readies single sign-on software to speed access, keep security tight," InfoWorld, vol. 16, No. 13, Mar. 28, 1994; ELNKMM004195.
Pollard, K. et al, "User-centered design of Web sites and the redesign of LineOne", British Telecom Labs, BT Technology Jounal (UK), vol. 17, No. 1, pp. 69-75, Nov. 1998.
PR Newswire, "First Java-Based Finger Image Technology Provides 'Total' Intranet Security—Prevents Illegal Network Access Due to Security Flaws in Web Browsing Systems or Stolen Passwords/PINs," Mar. 19, 1997; ELNKMM004261-004262.
NetSafe, Inc., press release re: NetSafe Announces First Suite of Integrated Customizable Internet Tools and Services, Oct. 23, 1996, MyMail 003434-003437.
U.S. Robotics, Press Release, Sep. 18, 1996, ELNKMM 004271-004272.
NetSafe, Inc., product literature, Oct. 23, 1996, MyMail 005144-005177.
NetSafe, Inc., product literature re: Plans, Services, and Options, (1996), MyMail 000934-000937.
MindSpring Enterprises, Inc., Product literature, including press releases, 1998, ELNKMM 013076-013096.
Prometheus Information Network Group, Inc. (PING), product literature, (Apr. 1, 1994), ELNKMM 013108-013113.
Ragget, Dave et al (Ed.); "HTML 4.0 Specification—W3C Recommendation, revised on Apr. 24, 1998"; http://www.w3.org/TR/1998/REC-html40-19980424/; W3C; Apr. 24, 1998.
Ragget, Dave et al (Ed.); "HTML 4.01 Specification—W3C Recommendation Dec. 24, 1999"; http://www.w3.org/TR/html401/; W3C; Dec. 24, 1999.
Ragget, Dave: "HyperText Markup Language Specification Version 3.0 <draft-ietf-html-specv3-00.txt>"; http://www.w3.org/MarkUp/html3/CoverPage; Internet Engineering Task Force; Sep. 28, 1995.

(56) References Cited

OTHER PUBLICATIONS

Ragget, Dave; "HTML 3.2 Reference Specification—W3C Recommendation Jan. 14, 1997"; http://www.w3.org/TR/REC-html32.html; W3C; Jan. 14, 1997.
Ranum, Marcus, "Internet Firewall Protection," Open Computing, Sep. 1994.
Reiss, Levi, et al., Open Computing Guide to MOSAIC—Your Guide to Accessing the World Wide Web, Berkeley, CA, McGraw-Hill, Inc., 1995.
Rendleman, John, "AT&T introduces Software Defined Network Virtual Office Connection service allowing remote access to corporate network from designated phone numbers," Communications Week, No. 570, Aug. 14, 1995 ELNKMM004180-004181.
Reprogramming D.E. Shaw, Investment Dealer's Digest, Sep. 4, 1995, U 001151-001156.
Riggs, Brian. "ISPs Offer Internet Globetrotting," LANTimes, Oct. 1996, SBCIMM 000426-000428.
Rigney, Carl, et al., "Remote Authentication Dial in User Service (RADIUS)", RFC 2058, Jan. 1997, SBCIMM 000634-000688.
Rogers, Amy, "Concentric Network Corp is offering a service that allows employees to dial into local Points of Presence to access their corporate LANs," Communications Week, No. 633, Oct. 14, 1996, ELNKMM 004177-004178.
Rogers, Diane, "Building Web enabled applications with Delphi 2.0," Jun. 12, 1996 CORN0280-0282.
Rohde, David, et al., "AT&T Preps low-cost SDN access; carriers new Virtual Office Connection remote access utilizing predefined ANIs," Network World, vol. 12, No. 28, Jul. 10, 1995; ELNKMM004187.
Rose, Michael, "The Windows95 TCP/IP Setup HOW-TO/FAQ v1.1," May 1, 1995, SBCIMM 000436-000444.
Rose, Michael, "The Windows95 TCP/IP Setup HOW-TO/FAQ v1.4," Nov. 19, 1995, SBCIMM 000429-000435.
Sachs, David, et al. Hands-On MOSAIC—A Tutorial for Windows Users, Englewood Cliffs, NJ, Prentice Hall PTR, 1995, SBCIMM 000772-000774.
Sagman, Stephen W., Traveling the Microsoft Network, Microsoft Press, 1995; AOL028483.
Savetz, Kevin; "Browser Toolbar Roundup"; http://www.computerpowerusercom/Editorial/article.asp?article=articles/archive/c0411/39c11.asp&guid=;CPU Computer Power User, Nov. 2004.
Schmutter, Rachel, et al., "'Free-Mail' Gravy Train Derails," NetGuide, vol. 4, Issue 4, Apr. 1997, ATT 018221-018222.
Schnoll, Scott; "The History of Internet Explorer"; http://www.nwnetworks.com/iehistory.htm; 2001.
Schroeder, Erica, "MFS-UUNet Merger Talks Bode Well for Online Users," vol. 13, Issue 18, p. 116, (May 6, 1996), ELNKMM 008051-008052.
Schuler, Cathi, "Updating AOL," CeePrompt! Computer Connection, Jun. 1, 1996, AOL 011275-011276.
Scwabach, Bob, "Companies to offer free e-mail service thanks to ads," Star Tribune, Aug. 3, 1995, U 001211-001212.
Seidman, Robert, "Seidman's Online Insider", vol. 3, No. 23, Jun. 7, 1996, AOL 011268-011274.
Selgas, Thomas; "Admission by Applicant as Prior Art Under MPEP § 2129"; Apr. 24, 2009.
Selgas, Thomas; "Admission by Applicant as Prior Art Under MPEP § 2129"; Jun. 7, 2010.
Selgas, Thomas; "Admission by Applicant as Prior Art Under MPEP § 2129"; Jul. 21, 2010.
Selling Your Privacy, PC World, vol. 15, Issue 4, Apr. 1997, ATT 018220.
Shah, Rawn, "Getting Started with Windows remote connectivity," Sun World, Mar. 1996, SBCIMM 000448-000453.
Sherman, Stephen A., et al., "Secure network Access Using Multiple Applications of AT&T's Smart Card," AT&T Technical Journal, Sep./Oct. 1994 ELNKMM004208-004219.
Sinha, Alok and Clore, Don and Phurrough, Dale; "Behind the Scenes at MSN 2.0: Architecting an Internet-Based Online Service"; http://www.microsoft.com/msj/0497/msn20/msn20.aspx; Microsoft Systems Journal, Apr. 1997.
Sirbu, M.; "A Content-Type Header Field for Internet Messages"; Network Working Group RFC 1049; Mar. 1988; http://www.ietf.org/rfc/rfc1049.txt.
Sky Dayton, Chairman and CEO of EarthLink Network, One of the Nation's Largest Internet Providers, Says UUNet-MFS Merger Validates Internet Company Business Models, Business Wire, May 1, 1996; ELNKMM008057-008058.
Snow, A.P., "Internet Implications of Telephone Access," IEEE Computer, vol. 32, No. 9, pp. 108-110, Sep. 1999.
Spangler, Todd, "The Net Grows Wider," PC Magazine, vol. 15, No. 20, Nov. 19, 1996, ELNKMM 008013-008019.
SprintLink Customer Handbook 2.1 (Sprint Document #5953-2), Oct. 1995.
St. Johns, Mike, Identification Protocol, RFC 1413, Feb. 1993; U003139-003144.
Staff of Classroom Connect, Family Internet Companion, PrenticeHall, Inc., 1997.
Stahl, Stephani, "Web crawl continues," Information Week, Issue 581, p. 36, May 27, 1996, ATT 018329-018330.
Star hedge fund trader makes big bet on internet, Investment Dealer's Digest, Jul. 17, 1995, U 001149-001150.
Strom, David, "Three strikes, you're out: network whiffs on lockouts, passwords, access," InfoWorld, vol. 16, No. 46, Nov. 14, 1994; ELNKMM004188.
Support an ad-supported free e-mail access service, Near North News, Jul. 13, 1996, U 001102.
Sykes, Rebecca, "Commercial ISPs Form Provider Group," PC World, May 21, 1997, GTE 16645.
Tatters, Wes, Navigating the Internet with CompuServe, Sams.Net Publishing, 1995; AOL085741-086220.
Tech Bytes: MasterCard in Deal with Net Access Provider; Announces agreement with Concentric Network to furnish Internet access kits with pre-installed security software, American Banker, Mar. 27, 1997; ELNKMM004259-004260.
Telstra has announced that it will invest $300 million over five years to upgrade the ISDN access network (Industry Wakes Up to Potential of ISDN), Exchange Telecommunications Newsletter, vol. 7, No. 5, Feb. 17, 1995; ELNKMM004182-004183.
Thorbjornsen, Thorbjorn; "Make Profit Reading Internet Ads"; CORDIS Archive; May 22, 1997; http://cordis.europa.eu/infowin/acts/ienm/newsclips/arch1997/970597no.htm.
EarthLink Network, Inc., Total Access Internet installation materials, (2004), ELNKMM 008112-008117 and ELNKMM 008125-008147.
Travel on the Information Highway, Byte.com, Apr. 1994; AOL117828-117829.
U.S. Robotics and Security Dynamics Team for Enhanced Remote Access Security Solution; U.S. Robotics Adds to Existing Enterprise-Wide Network Access Security with SecurID Support, Business Wire, Sep. 18, 1996; ELNKMM004269-004270.
Van Hefner, William, "GTE to Offer Internet Access," Discount Long Distance Digest, Issue No. 69, Vantek Communications, Jun. 7, 1996, GTE 16648-16652.
Venditto, Gus, Prodigy for Dummies, Foster City, CA, IDG Books Worldwise, Inc., 1995, SBCIMM 000769-000771.
Viescas, John L., The Official Guide to Prodigy Service, Redmond, WA, Microsoft Press, 1991, SBCIMM 000745-000747.
Vollmart, Sarah, "How to Implement a PC Security System," The Office, Feb. 1992; ELNKMM004206-004207.
Wall Street's King Quant, Fortune, Feb. 5, 1996, U 001157-001161.
Web Basics Tutorial; "Parts of a Web Browser: Overview"; http://www.lib.unc.edu/instruct/community_tutorials/web/browsers/overview.html; University of North Carolina Library, Jan. 31, 2006.
Webopedia; "Browser"; http://www.webopedia.com/TERM/B/browser.html; WebMediaBrands Inc., May 5, 2008.
Webster's New World Dictionary of Computer Terms (excerpts), 6th Ed., Simon & Schuster, Inc., 1997; AOL078657.
Webster's New World Dictionary, Third College Edition, Warner Books, Inc., 1990.

(56) References Cited

OTHER PUBLICATIONS

WebTV Networks—Company Background, WebTV Networks Inc., Aug. 19, 1997, MyMail 001703-001706.
WebTV Technical Specifications, Aug. 19, 1997, MMail 001707-001710.
Weekly briefs: Internet reseller, Computer Reseller News, Issue 717, p. 63, Jan. 6, 1997, ATT 018355-018356.
Weingarten, Jan, et al., "The Microsoft Network Tour Guide," Ventanna Communications Group, Inc., 1995.
Wikipedia, "AppleTalk"; Jun. 3, 2009; (7 pgs) http://en.wikipedia.org/wiki/AppleTalk.
Wikipedia; "Browser Helper Object"; http://en.wikipedia.org/wiki/Browser_Helper_Object; Wikimedia Foundation, Inc., Feb. 16, 2009.
Wikipedia; "History of Internet Explorer"; http://en.wikipedia.org/wiki/History_of_Internet_Explorer; Wikimedia Foundation, Inc., Feb. 11, 2009.
Wikipedia; "Internet Explorer 3"; http://en.wikipedia.org/wiki/Internet_Explorer_3; Wikimedia Foundation, Inc., Feb. 28, 2009.
Wikipedia; "Internet Explorer"; http://en.wikipedia.org/wiki/Internet_Explorer; Wikimedia Foundation, Inc., Mar. 2, 2009.
Wikipedia; "Layout Engine"; http://en.wikipedia.org/wiki/Layout_engine; Wikimedia Foundation, Inc., Feb. 2, 2009.
Wikipedia; "List of Microsoft Windows application programming interfaces and frameworks"; http://en.wikipedia.org/wiki/List_of_Microsoft_Windows_application_programming_interfaces_and_frameworks; Wikimedia Foundation, Inc., Feb. 7, 2009.
Wikipedia; "Netscape Navigator"; http://en.wikipedia.org/wiki/Netscape_Navigator; Wikimedia Foundation, Inc., Feb. 26, 2009.
Wikipedia; "Window (computing)"; http://en.wikipedia.org/wiki/Window_(computing); Wikimedia Foundation, Inc., Apr. 4, 2009.
Wikipedia; "ActiveX"; http://en.wikipedia.org/wiki/ActiveX; Wikimedia Foundation, Inc., Apr. 2, 2009.
Wikipedia; "Browser"; http://en.wikipedia.org/wiki/Browser; Wikimedia Foundation, Inc., Mar. 15, 2009.
Wikipedia; "DDE"; http://en.wikipedia.org/wiki/DDE; Wikimedia Foundation, Inc., Jan. 14, 2009.
Wikipedia; "Dynamic Data Exchange"; http://en.wikipedia.org/wiki/Dynamic_Data_Exchange; Wikimedia Foundation, Inc., Mar. 5, 2009.
Wikipedia; "MIME"; http://en.wikipedia.org/wiki/MIME; Wikimedia Foundation, Inc., Apr. 1, 2009.
Wikipedia; "MIME Type"; http://en.wikipedia.org/wiki/MIME_type; Wikimedia Foundation, Inc., Mar. 24, 2009.
Wikipedia; "Tabbed Browsing"; http://en.wikipedia.org/wiki/Tabbed_browsing; Wikimedia Foundation, Inc., Mar. 30, 2009.
Wikipedia; "Web Browser"; http://en.wikipedia.org/wiki/Web_browser; Wikimedia Foundation, Inc., Apr. 3, 2009.
Wikipedia; "Database"; http://en.wikipedia.org/wiki/Database; Wikimedia Foundation, Inc., Mar. 30, 2009.
Wikipedia; "Mosaic (web browser)"; http://en.wikipedia.org/wiki/Mosaic_(web_browser); Wikimedia Foundation, Inc., Apr. 22, 2009.
Wikipedia; "HTTP location"; Wikimedia Foundation, Inc.; Mar. 2010; http://en.wikipedia.org/wiki/HTTP_location.
Wikipedia' "Hyptertext Transfer Protocol"; Wikimedia Foundation, Inc.; May 2010; http://en.wikipedia.org/wiki/Hypertext_Transfer_Protocol.
Wikipedia; "Meta element"; Wikimedia Foundation, Inc.; May 2010; http://en.wikipedia.org/wiki/Meta_element.
Wikipedia; "Meta refresh"; Wikimedia Foundation, Inc.; May 2010; http://en.wikipedia.org/wiki/Meta_element.
Wikipedia; "URL redirection"; Wikimedia Foundation, Inc.; May 2010; http://en.wikipedia.org/wiki/URL_redirection.
Wikipedia; "Visual Basic Extension"; Wikimedia Foundation, Inc.; Jun. 2010 http://en.wikipedia.org/wiki/Visual_Basic_Extension.
Wilder, Clinton, "Normandy Lands," Information Week, Issue 583, p. 37, Jun. 10, 1996, ATT 018278-018279.
Wilder, Clinton, et al., "Online with AT&T," Information Week, Issue 534, p. 22, Jul. 3, 1995, ATT 018281-018282.
Willis, David, et al., "Domestic Internet service providers: Adapt or perish," Network Computing, vol. 7, Issue 9, p. 100, Jun. 1, 1996, ATT 018305-018313.
Willis, David, et al., "Interexchange carriers as ISPs: Long-distance runaround," Network Computing, Issue 13, p. 104, Sep. 1, 1996, ATT 018314-018324.
WinCIM Spell-Checker Add-On!, CompuServe Magazine, Dec. 1995, AOL 032742.
Yamada, Ken, et al., "CompuServe plans major over haul of online services," Computer Reseller News, Issue 644, p. 43, Aug. 21, 1995, ATT 018350-018352.
Yamada, Ken, et al., "MSN Lacks ISDN Drivers; Support to be Added in Future OS Updates," Computer Reseller News, Issue 647, Sep. 6, 1995, ELNKMM 008042-008044.
Yoshida, Junko, "WebTV: Microsoft's Consumer Foothold," Electronic Engineering Times, May 1997, MyMail 009743-009744.
Zixit Corporation, ZixMail marketing brochure, (Mar. 2000), MyMail 001594-001597.
Zorn, Glen, "Dialup Roaming," Microsoft Corporation, Apr. 8, 1997, SBCIMM 000357-000382.
Chen, Elaine, et al., "Data net," Electronic News (North America), vol. 42, Issue 2126, Jul. 22, 1996.
Clancy, Heather, "Internet service providers: Long term survival tied to value-added offerings," Computer Reseller News, Issue 674, p. 68, Mar. 11, 1996.
Covell, Andy, "Online services and the Internet: The network manager's friend or foe?", Network Computing, vol. 7, Issue 1, Jan. 15, 1996.
Gibbel, Stuart, et al. "CivNet hookup," HomePC, vol. 3, Issue 3, p. 157, Mar. 1996.
Heim, Judy, "The great e-mail shoot-out," PC World, vol. 14, Issue 2, p. 183, Feb. 1996.
Heim, Judy, et al., "42 tips for taming cyberspace," PC World, vol. 14, Issue 8, p. 122, Aug. 1996.
Jain, R., Fundamentals of Telecommunications, Ohio State University, Department of Computer Science, Apr. 3, 1999.
Lake, Matt, et al., "New looks for CompuServe and Prodigy," PC World, vol. 15, Issue 2, p. 92, Feb. 1997.
Log on and be counted, NetGuide, vol. 3, Issue 4, p. 20, Apr. 1996.
Net help online, Information Week, Issue 563, p. 90, Jan. 22, 1996.
Network Protocols Handbook, Second Edition, 2004-2005 Javvin Technologies Inc., Javin.com.
Newton, Harry, Newton's Telecom Dictionary, Eight Edition, Flatiron Publishing, Inc., (1994).
Performance Systems International, Inc., "PSI Interramp: Personal Internet Access Users Guide," Herndon, VA, PSI Inc., Oct. 1994.
Stallings, Willliam, Data and Computer Communications, Seventh Edition, Pearson Prentice Hall, 2004.
Tanenbaum, Andrew S., Computer Networks, Third Edition, Prentice Hall, (1996).
Escrow Agreement between AT&T Corp. and MyMail, Ltd., Feb. 8, 2005.
Patent License Agreement between AT&T Corp. and MyMail, Ltd., Feb. 8, 2005.
Settlement and Release Agreement between AT&T Corp. and MyMail, Ltd., Feb. 8, 2005.
AT&T Corp.'s and MyMail, Ltd.'s Joint Stipulation and [Proposed] Order of Dismissal with Prejudice, Mar. 11, 2005.
Order granting AT&T Corp.'s and MyMail, Ltd.'s Joint Stipulation and [Proposed] Order of Dismissal with Prejudice, Mar. 15, 2005.
Excerpt from Patent License Agreement between America Online, Inc. and MyMail Ltd., Aug. 30, 2005.
America Online, Inc.'s and MyMail, Ltd.'s Agreed Motion to Dismiss with Prejudice, Aug. 31, 2005.
Order granting America Online, Inc.'s and MyMail, Ltd.'s Agreed Motion to Dismiss with Prejudice, Sep. 1, 2005.
Patent License Agreement between GTE.Net LLC and MyMail, Ltd., Jul. 6, 2005.
Settlement and Release Agreement between GTE.Net LLC and MyMail, Ltd., Jul. 6, 2005.
GTE.Net LLC's and MyMail, Ltd's Agreed Motion to Dismiss with Prejudice, Jul. 7, 2005.

(56) References Cited

OTHER PUBLICATIONS

Order granting GTE.Net LLC's and MyMail, Ltd's Agreed Motion to Dismiss with Prejudice, Jul. 13, 2005.
PACER docket sheet for litigation as of Apr. 20, 2007.
MyMail's Second Amended Complaint, Oct. 27, 2004, with attached Exhibit A.
America Online, Inc.'s Answer to Plaintiff's Second Amended Complaint, Nov. 15, 2004, including: Defendant America Online, Inc.'s Motion to Unseal its Answer to Plaintiffs Second Amended Complaint, Jan. 12, 2005, Order granting Defendant America Online, Inc.'s Motion to Unseal its Answer to Plaintiff's Second Amended Complaint, Jan. 26, 2005.
Plaintiff MyMail's Reply to Defendant AT&T Corp.'s Counterclaims, Nov. 22, 2004.
MyMail's Third Amended Complaint, Jul. 26, 2005.
Defendant Earthlink, Inc.'s Answer and Counterclaims to Plaintiff's Third Amended Complaint, Aug. 2, 2005.
Answer and Counterclaim of Defendants NetZero, Inc., Juno Online Services, Inc., and Netbrands, Inc. To MyMail's Third Amended Complaint, Aug. 2, 2005.
America Online, Inc.'s Answer to Plaintiff's Third Amended Complaint, Aug. 3, 2005.
Defendants Prodigy Communications Corporation and Southwestern Bell Internet Services, Inc.'s Answer to MyMail's Third Amended Complaint, Aug. 3, 2005.
Defendant SBC Internet Services, Inc.'s Answer to MyMail's Third Amended Complaint, Aug. 16, 2005.
Plaintiff MyMail's Reply to Counterclaims of Defendants NetZero, Inc., Juno Online Services, Inc., and Netbrands, Inc., Aug. 16, 2005.
Plaintiff MyMail's Reply to Defendant EarthLink, Inc.'s Answer and Counterclaims to Plaintiffs Third Amended Complaint, Aug. 17, 2005.
MyMail, Ltd.'s Preliminary Infringement Contentions, Aug. 2, 2004, including: MyMail, Ltd.'s Infringement Claim Chart for U.S. Patent No. 6,571,290 B2 re: America Online, Inc.; MyMail, Ltd.'s Infringement Claim Chart for U.S. Patent No. 6,571,290 B2 re: AT&T Corp.; MyMail, Ltd.'s Infringement Claim Chart for U.S. Patent No. 6,571,290 B2 re: NetZero, Inc.; MyMail, Ltd.'s Infringement Claim Chart for U.S. Patent No. 6,571,290 B2 re: Juno Online Services, Inc.; MyMail, Ltd.'s Infringement Claim Chart for U.S. Patent No. 6,571,290 B2 re: Netbrands, Inc.; MyMail, Ltd.'s Infringement Claim Chart for U.S. Patent No. 6,571,290 B2 re: Earthlink, Inc.; MyMail, Ltd.'s Infringement Claim Chart for U.S. Patent No. 6,571,290 B2 re: SBC Communications, Inc.; and MyMail, Ltd.'s Infringement Claim Chart for U.S. Patent No. 6,571,290 B2 re: Verizon Communications, Inc.
MyMail. Ltd.'s Preliminary Infringement Contentions for GTE.Net LLC, Oct. 25, 2004.
MyMail, Ltd.'s Preliminary Infringement Contentions for U.S. Patent No. 6,571,290 B2 re: Prodigy Communications Corp., Nov. 30, 2004.
MyMail, Ltd.'s Preliminary Infringement Contentions for Prodigy Communications Corp. and Southwestern Bell Internet Services, Inc., Nov. 30, 2004.
Plaintiff MyMail, Ltd.'s Final Infringement Contentions, Jul. 5, 2005.
Expert Report of Jeffrey O. Smith, Jul. 1, 2005.
MyMail 000331-000333, Facsimile re: provider architecture v. NetSafe architecture, May 21, 1996.
MyMail 000334, Email dated Apr. 23, 1997.
MyMail 000335, Email dated Dec. 31, 1997.
MyMail 000336, Email dated Mar. 16, 1998.
MyMail 000337, Email dated Mar. 18, 1998.
MyMail 000338, Email dated Mar. 26, 1998.
MyMail 000339, Email dated Apr. 8, 1998.
MyMail 000340, Email dated Oct. 27, 1997.
MyMail 000341, Email dated Dec. 12, 1997.
MyMail 000342, Email dated Jan. 28, 1998.
MyMail 000343, Email dated Jan. 28, 1998.
MyMail 000344-000345, Email dated Jan. 30, 1998.
MyMail 000346, Email dated Feb. 7, 1998.
MyMail 000347, Email dated Feb. 19, 1998.
MyMail 000359-000360, Email dated Jul. 28, 1998.
MyMail 000361, Email dated Aug. 29, 1998.
MyMail 000362, Email dated Aug. 31, 1998.
MyMail 000363, Email dated Jul. 22, 1998.
MyMail 000364, Email dated Aug. 12, 1998.
MyMail 000503-000505, Microsoft Normandy Beta overview (1996).
NetSafe, Inc., NetSafe Plans, Services and Options summary, (Nov. 1996), MyMail 000934-000937.
MyMail 001031-001033, Texas Secretary of State Service of Process Information, Aug. 31, 1999.
MyMail 001034-001040, Facsimile of Nov. 24, 1999.
MyMail 001041, Letter for Jul. 29, 1999.
Texas Secretary of State, documents re: NetSafe, Inc., with cover page (Apr. 6, 2000), MyMail 001042-001054.
MyMail 001576-001580, Email dated Nov. 16, 1999.
Network Solutions, Inc., Service Agreement (date unknown), MyMail 001584-001586.
Zixit Corporation, Marketing Alliance Agreement and company literature, (Mar. 24, 2000) MyMail 001594-001597.
Network Solutions, Inc., Service Agreement and invoices, (Jan. 2001), MyMail 001652-001666.
Verisign, Domain name registration documents for Mymail.com, (Nov. 10, 2001), MyMail 001739-001754.
Verisign, Domain name registration documents for Mymail.com, (Dec. 6, 2002), MyMail 002222-002227.
MyMail 002576-002694, NetSafe Confidential Business Plan, 1999-2001, Dec. 10, 1998.
MyMail 002940-002970, NetSafe Confidential Business Plan, Feb. 1, 1999.
MyMail 003082-003084, Email dated Feb. 15, 1999.
MyMail 003096-003102, NetSafe product information, Dec. 21, 1996.
MyMail 003288-003301, NetSafe, Inc. Press Background Information, 1996.
MyMail 003368-003391, NetSafe Netrepreneur Introduction Manual, 1996.
NetSafe, Inc., Owning a Toll Booth on the Information Superhighway! (date unknown), MyMail 003398-003414.
MyMail 003415-003416, NetSafe, Inc. registration form, Oct. 1, 1996.
MyMail 003434-003437, NetSafe press release, Oct. 23, 1996.
MyMail 003601, Encryption Worksheet, Sep. 15, 1998.
MyMail 003602-003607, NetSafe's Proposal for Smith Barney's Internet Project, Aug. 1995.
NetSafe, Inc., Neat! product literature/NetSafe company literature, (1996), MyMail 005131-005143.
NetSafe, Inc., NetSafe Announces First Suite of Integrated, Customizable Internet Tools and Services/ other product literature; (Oct. 23, 1996), MyMail 005144-005177.
MyMail 007259-007261, Microsoft Corporation letter to Dear Windows Developer, Mar. 15, 1995.
Microsoft Corporation, undated letter from Microsoft Corporation to Tom and Michelle Selgas, MyMail 007262.
MyMail 007263, Dear Windows 95 Beta Tester letter, Mar. 15, 1995.
MyMail 007264, Microsoft Corporation letter to Dear Windows 95 Beta Tester, Oct. 28, 1994.
Netsafe, Inc., NetSafe's Security product literature (1998), MyMail 009120-009139.
Netsafe, Inc., Neat! product literature/NetSafe company literature, (date unknown), MyMail 009231-009258.
Netsafe, Inc., NetSafe company literature (date unknown), Mymail 009260-009268.
NetSafe, Inc., Neat! product literature/NetSafe company literature (date unknown), MyMail 009270-009289.
Netsafe, Inc., Neat! product literature/NetSafe company literature, (date unknown), MyMail 009301-009308.
NetSafe, Inc., Neat! product literature/NetSafe company literature (draft version), (May 26, 1997), MyMail 009677-009686.
MyMail 009690-009701, Neat! Quick Start Guide, 1997.

(56) References Cited

OTHER PUBLICATIONS

Gmuender, John notebook (Jun. 11, 1996-Aug. 2, 1996), MyMail 009746-009788.
NetSafe, Inc., Non-Disclosure Agreements with various entities/individuals (1995-1996), MyMail 009789, MyMail 009088-009104, MyMail 003392-003397.
Selgas, Tom notebook, (Mar. 1995-Jun. 1997), MyMail 010650-010758.
MyMail 013972-013974, Promissory Note, Nov. 25, 1996.
MyMail 015169-015872, Form S-4 for Microsoft Corporation, May 2, 1997.
Microsoft Corp., Form S-4/A for Microsoft Corporation filed with the SEC (Jun. 13, 1997), MyMail 015873-016076.
Microsoft Corp., Registration Statement on Form 2-8 as filed with the SEC, Aug. 18, 1998, MyMail 016077-016084.
Microsoft Corp., Form SC 13D for Microsoft Corporation as filed with the SEC, Dec. 29, 1997, MyMail 016085-016088.
Microsoft Corp., Form SC 13D for Microsoft Corporation as filed with the SEC, Sep. 26, 1997, MyMail 016089-016093.
Microsoft Corp., Form SC 13D/A for Microsoft Corporation as filed with the SEC, Jan. 6, 1998, MyMail 016094-016097.
Microsoft Corp., Form SC 13G for Microsoft Corporation as filed with the SEC, Mar. 9, 1998, MyMail 016098-016101.
Microsoft Corp., Form SC 13G for Microsoft Corporation as filed with the SEC, Feb. 13, 1998, MyMail 016102-016106.
Microsoft Corp., Form SC 13G for Microsoft Corporation as filed with the SEC, Feb. 19, 1997, MyMail 016107-016111.
Microsoft Corp., Form SC 13G for Microsoft Corporation as filed with the SEC, Feb. 14, 1997, MyMail 016112-016114.
Defendant America Online, Inc.'s Initial Disclosures, Aug. 23, 2004.
Defendant AT&T Corp.'s Initial Disclosures, Aug. 23, 2004.
Defendant Earthlink, Inc.'s Initial Disclosures Pursuant to Federal Rule of Civil Procedure 26(a)(1) and the Court's Discovery Order, Aug. 23, 2004.
MyMail, Ltd.'s Initial Disclosures, Aug. 23, 2004.
Initial Disclosures of NetZero, Inc., Juno Online Services, Inc. and Netbrands, Inc. Pursuant to F.R.C.P. 26(a)(1) and Rule 1 of the Court's Discovery Order, Aug. 23, 2004.
Defendants' Proposed Terms and Claim Elements for Construction, Nov. 23, 2004.
Rule 26(a) Initial Disclosures and Discovery Order Disclosures of Defendant SBC Communications Inc., Aug. 23, 2004.
Rule 26(a) Initial Disclosures and Discovery Order Disclosures of Defendants Prodigy Communication Corp. and Southwestern Bell Internet Services, Inc , Dec. 23, 2004.
GTE.Net LLC's Initial Disclosures, Nov. 15, 2004.
Defendants' Preliminary Claim Constructions and Identification of Extrinsic Evidence, Feb. 3, 2005.
GTE.Net LLC's First Amended Disclosures, Feb. 23, 2005.
MyMail, Ltd.'s First Amended Disclosures, May 17, 2005.
Amended Rule 26(a) Initial Disclosures and Discovery Order Disclosures of Defendants Prodigy Communication Corp. and Southwestern Bell Internet Services, Inc., Jun. 15, 2005.
MyMail, Ltd.'s First Supplemental Disclosures, Jul. 11, 2005.
MyMail, Ltd.'s Second Supplemental Disclosures, Jul. 21, 2005.
Defendant America Online, Inc.'s Supplemental Initial Disclosures, Jul. 22, 2005.
MyMail, Ltd.'s Third Supplemental Disclosures, Jul. 25, 2005.
Defendant America Online, Inc.'s Second Supplemental Initial Disclosures, Jul. 25, 2005.
Defendant America Online, Inc.'s Third Supplemental Initial Disclosures, Jul. 28, 2005.
Earthlink, Inc.'s First Supplemental Initial Disclosures, Aug. 2, 2005.
Supplemental Disclosures of NetZero, Inc., Juno Online Services, Inc. and Netbrands, Inc. Pursuant to F.R.C.P. 26(a)(1) and Rule 1 of the Court's Discovery Order, Aug. 15, 2005.
Protective Order from *MyMail, Ltd.* v. *American Online, Inc., et al.*, Sep. 17, 2004.
Defendants' Preliminary Invalidity Contentions (w/ Defendants' Responsive Claim Charts), Sep. 16, 2004.
Defendant SBC Communications, Inc.'s Preliminary Invalidity Contentions and Accompanying Document Production, Sep. 16, 2004.
GTE.Net LLC's Preliminary Invalidity Contentions (w/ GTE.Net LLC's Invalidity Chart), Dec. 1, 2004.
Defendants Southwestern Bell Internet Services Inc and Prodigy Communications Corporation Preliminary Invalidity Contentions and Accompanying Document Production, Jan. 10, 2005.
Final Invalidity Contentions of Defendants Netzero, Inc., Juno Online Services, Inc., and Netbrands, Inc., Jul. 25, 2005.
Defendant America Online, Inc.'s Final Invalidity Contentions, Jul. 25, 2005.
Earthlink, Inc.'s Final Invalidity Contentions, Jul. 25, 2005.
Prodigy's and SBIS's Final Invalidity Contentions, Jul. 25, 2005.
AT&T Worldnet Service, QuickStart Guide, Version 2.0, (1996), ATT 000247-000285.
AT&T Worldnet Service, QuickStart Guide, Version 2.02 (1996), ATT000325-000363.
DR 00001378, GTE.Internet CD ROM, 1996.
DR 00001379, Bell Atlantic 1.0 CD ROM, 1996.
GTE, Internet Installation Guide and materials (date unknown), GTE 04512-04531.
GTE, Internet Solutions Installation Guide—The Insiders Guide to the Outside World (date unknown), GTE 04532-04563.
Federal Communications Commission, CCB Pol. 96, Plan to Offer Comparably Efficient Interconnection, by Bell Atlantic (Mar. 8, 1996), GTE 16655-16683.
MyMail, Ltd., Collection of emails re: NetSafe (Jun. 1996), GTE 16684-16702.
MyMail 004971-004973, Memo to Tex Wooters from Bob Derby, Oct. 22, 1996.
MyMail 004994-005004, NetSafe, Inc. facsimile from Tex Wooters, Dec. 3, 1996.
NetSafe, Inc., Non-Disclosure Agreements with various entities/individuals (May 1995-Jul. 1998), MyMail 009790-009805.
NetSafe, Inc., Non-Disclosure Agreements with various entities/individuals (May 1995-Jul. 1998), MyMail 016115-016133.
NetSafe, Inc., Customer Listing (Jun. 1996), MyMail 039909-039921.
MyMail 040105-040115, GTE Intelligent Network Services NetSafe 800 Usage reports, Jul. 1996-Aug. 1996.
MyMail 040150, NetSafe, Inc. report re: GTE Invoices 1996.
MyMail 040203-040268, GTE Intellingent Network Services NetSafe 800 Usage reports, May 1996-Jan. 1997.
NetSafe, Inc., Customer Listing (Jun. 1996), MyMail 044123-044138.
NetSafe, Inc., Customer Listing (May 1996), MyMail 058620-058627.
NetSafe, Inc., Customer Listing (Apr.-May 1996), MyMail 058834-058922.
NetSafe, Inc., Customer Listing (May 1996), MyMail 161095-161144.
Patent Rule 4-3 Joint Claim Construction and Brief Statement (Feb. 14, 2005).
Appendix A to Patent Rule 4-3 Joint Claim Construction and Brief Statement, Feb. 14, 2005.
Appendix B to Patent Rule 4-3 Joint Claim Construction and Brief Statement, Feb. 14, 2005—Support for Defendants' Proposed Constructions, Feb. 14, 2005.
Plaintiff's Markman Tutorial PowerPoint presentation, Mar. 21, 2005.
U.S. Appl. No. 13/871,409, filed Apr. 26, 2013 entitled System and Method of Accessing a Network by Way of Different Service Providers; first-named inventor: Selgas.
U.S. Appl. No. 13/871,432, filed Apr. 26, 2013 entitled Method of Connecting a Device to a Network Using Different Service Providers; first-named inventor: Selgas.
Phillips, Richard L., An Interpersonal Multimedia Visualization System, LA-UR-90-2614, Oct. 22-26, 1990, Los Alamos National Laboratory, New Mexico.
Phillips, Richard L., MediaView: A General Multimedia Digital Publication System, Jul. 1, 1991, Communications of the ACM.
Draft of an online book, "Viola in a Nutshell, The Viola World Wide Web Toolkit," located at <http://www.viola.org/viola/book/preface.

(56) References Cited

OTHER PUBLICATIONS html>, printed Aug. 29, 2013; apparently still being updated, as indicated on first page "Very Draft, in Progress, Wet Glue & Paint.".
Internet Archive WaybackMachine, calender view for archived pages of http://viola.org, printed Sep. 6, 2013.
Internet Archive WaybackMachine, of viola.org, The Viola Home Page as it appeared on Oct. 13, 1999, printed Sep. 6, 2013.
MyMail, Ltd. v. Conduit Ltd. et al filed Nov. 14, 2013; Civil Action No. 2:13-cv-00961; USDC, Eastern District of Texas (Marshall); Attached is a copy of the following documents: Docket Report as of Nov. 20, 2013; Complaint (with Exhibits A-K) (filed Nov. 14, 2013).
U.S. Appl. No. 10/417,756; Office Action; May 16, 2012.
U.S. Appl. No. 10/417,756; Response; Nov. 15, 2012.
U.S. Appl. No. 10/417,756; Notice of Allowance; Nov. 28, 2012.
U.S. Appl. No. 10/417,756; RCE; Feb. 15, 2013.
U.S. Appl. No. 10/417,756; Notice of Allowance; May 31, 2013.
U.S. Appl. No. 10/417,756; Issue Notification; Aug. 20, 2013.
U.S. Appl. No. 10/417,821; Miscellaneous Communication to Appellant; Dec. 6, 2010.
U.S. Appl. No. 10/417,821; Board of Patent Appeals and Interferences Docketing Notice; Dec. 14, 2010.
U.S. Appl. No. 10/417,821; Notice of Hearing; Jan. 24, 2013.
U.S. Appl. No. 10/417,821; Response to Notice of Hearing; Feb. 13, 2013.
U.S. Appl. No. 10/417,821; Decision on Appeal; Apr. 4, 2013.
U.S. Appl. No. 10/417,821; Notice of Allowance; Aug. 15, 2013.
U.S. Appl. No. 10/417,821; RCE; Oct. 31, 2013.
U.S. Appl. No. 10/417,853; Applicant's Summary of Interview with Examiner; Jul. 21, 2010.
U.S. Appl. No. 10/417,853; Applicant's Summary of Meeting with Technology Center Director; Aug. 2, 2010.
U.S. Appl. No. 10/417,853; Supplement to Interview Summaries filed Jul. 21, 2010; Aug. 17, 2010.
U.S. Appl. No. 10/417,853; Applicant's Summary of Interview with Examiner; Nov. 15, 2010.
U.S. Appl. No. 10/417,853; Interview Summary; Mar. 7, 2011.
U.S. Appl. No. 10/417,853; Supplemental Response; Mar. 21, 2011.
U.S. Appl. No. 10/417,853; Office Action; Jun. 9, 2011.
U.S. Appl. No. 10/417,853; Interview Summary; Jul. 14, 2011.
U.S. Appl. No. 10/417,853; Response; Sep. 2, 2011.
U.S. Appl. No. 10/417,853; Response to Amendment; Nov. 29, 2011.
U.S. Appl. No. 10/417,853; Response; Dec. 6, 2011.
U.S. Appl. No. 10/417,853; Final Office Action; Apr. 25, 2012.
U.S. Appl. No. 10/417,853; Response; Jun. 1, 2012.
U.S. Appl. No. 10/417,853; Applicant-Initiated Interview Summary; Jun. 7, 2012.
U.S. Appl. No. 10/417,853; Notice of Allowance; Jun. 20, 2012.
U.S. Appl. No. 10/417,853; Notice to File Corrected Application Papers—Notice of Allowance Mailed; Aug. 7, 2012.
U.S. Appl. No. 10/417,853; Amendment in Response to Notice to File Corrected Application Papers—Notice of Allowance Mailed; Aug. 8, 2012.
U.S. Appl. No. 10/417,853; Issue Notification; Sep. 25, 2012.
U.S. Appl. No. 13/079,015; Office Action; May 24, 2013.
U.S. Appl. No. 13/079,015; Amendment and Response; Sep. 24, 2013.
U.S. Appl. No. 10/417,862; Issue Notification; Jul. 5, 2011.
U.S. Appl. No. 13/871,409; Office Action; Oct. 2, 2013.
U.S. Appl. No. 13/871,409; Agenda for Examiner Interview; Nov. 20, 2013.
U.S. Appl. No. 13/871,409; Applicant-Initiated Interview Summary; Nov. 29, 2013.
U.S. Appl. No. 13/871,432; Office Action; Oct. 2, 2013.
U.S. Appl. No. 13/871,432; Applicant-Initiated Interview Summary; Nov. 29, 2013.
MyMail, Ltd. v. Conduit Ltd. et al filed Nov. 14, 2013; Civil Action No. 2:13-cv-00961; USDC, Eastern District of Texas (Marshall); Attached is a copy of the following documents: Docket Report as of Dec. 11, 2013.

Plaintiff MyMail's Markman Claim Construction Brief, Mar. 3, 2005, including: Exhibit A—Declaration of Jeff Smith in Support of Claim Construction of U.S. Patent No. 6,571,290, Mar. 5, 2005 (with attached Curriculum Vitae); and Exhibit B—U.S. Patent No. 6,571,290 (Selgas).
Defendant America Online, Inc.'s Claim Construction Brief, Mar. 16, 2005, including: Exhibit 1—U.S. Patent No. 6,571,290 (Selgas), May 27, 2003; Exhibit 2—Notice of Allowance re: U.S. Appl. No. 09/100,619/U.S. Patent No. 6,571,290 (Selgas), Oct. 2, 2002; Exhibit 3—Interview Summary re: U.S. Appl. No. 09/100,619/U.S. Patent No. 6,571,290 (Selgas), Sep. 17, 2002; Exhibit 4—Excerpts from Webster's New World Dictionary of Computer Terms, Sixth Edition, 1997; Exhibit 5—Excerpts from the American Heritage College Dictionary, Third Edition, 1993; Exhibit 6—Excerpts from Microsoft Press Computer Dictionary, Third Edition, 1997; Exhibit 7—Merriam-Webster Online entry re: "800 number" and "modified"; Exhibit 8—Declaration of R. Greg Lavender [cover page only]; Exhibit 9—Excerpts from transcript of deposition of Thomas Selgas, Sep. 16, 2004; Exhibit 10—Excerpts from transcript of deposition of Thomas Selgas, Oct. 27, 2004; Exhibit 11—Excerpts from transcript of deposition of Thomas Selgas, Nov. 3, 2004; Exhibit 12—Letter from Bradley W. Caldwell to All Defense Counsel, Feb. 18, 2005; Exhibit 13—Letter from Lauren A. Dregnan to Bradley W. Caldwell, Feb. 28, 2005; Exhibit 14—Letter from Bradley W. Caldwell to Lauren A. Dregnan, Mar. 4, 2005; and Exhibit 15—Letter from Lauren A. Dregnan to Bradley W. Caldwell, Mar. 14, 2005.
Responsive Markman Brief of Defendants Netzero, Inc., Juno Online Services, Inc., NetBrands, Inc., Earthlink, Inc., Prodigy Communications Corp., Southwestern Bell Internet Services, Inc., and GTE. Net, LLC, Mar. 16, 2005, including exhibits: Exhibit 1—U.S. Patent No. 6,571,290 (Selgas), May 27, 2003; Exhibit 2—U.S. Appl. No. 09/100,619/U.S. Patent No. 6,571,290 (Selgas), Jun. 19, 1998; Exhibit 3—Redacted version of Network Services Agreement between UUNET Technologies, Inc. and Earthlink Network, Inc., Jul. 12, 1995, ELNKMM010090; Exhibit 4—Interview Summary re: U.S. Appl. No. 09/100,619/U.S. Patent No. 6,571,290 (Selgas), Sep. 17, 2002; Exhibit 5—Preliminary Amendment re: U.S. Appl. No. 09/100,619/U.S. Patent No. 6,571,290 (Selgas), Aug. 15, 2001; Exhibit 6—Excerpts from transcript of deposition of Michael B. Massing, Nov. 9, 2004; Exhibit 7—Excerpt from U.S. Appl. No. 09/100,619/U.S. Patent No. 6,571,290 (Selgas), Jun. 19, 1998; Exhibit 8—File History of U.S. Appl. No. 60/050,186 (Selgas); Exhibit 9—Preliminary Amendment re: U.S. Appl. No. 09/100,619/ U.S. Patent No. 6,571,290 (Selgas), May 10, 2000; Exhibit 10—Excerpts from American Heritage College Dictionary, Third Edition, 1993; Exhibit 11—Excerpts from Microsoft Press Computer Dictionary, Third Edition, 1997; Exhibit 12—Excerpts from Webster's New World Dictionary of Computer Terms, Sixth Edition, 1997; Exhibit 13—Excerpts from transcript of deposition of John Everett Gmuender, Nov. 7, 2004; and Exhibit 14—File History of U.S. Patent No. 6,571,290 (Selgas).
Plaintiff MyMail's Reply in Support of its Markman Claim Construction Brief, Mar. 23, 2005, including: Exhibit A—Interview Summary re: U.S. Appl. No. 09/100,619/U.S. Patent No. 6,571,290 (Selgas); and Exhibit B—Excerpts from Webster's New World Dictionary, 1990.
Plaintiff's Markman Presentation, Opening, Apr. 6, 2005.
Plaintiff's Markman Presentation, Claim Terms, Apr. 6, 2005.
Plaintiff's Presentation Slides unavailable on Apr. 6, 2005 (submitted Apr. 7, 2005).
Claim Construction Memorandum Opinion issued by the Honorable Leonard Davis, Jun. 3, 2005.
Transcript of Markman Hearing Before the Honorable Leonard Davis, Apr. 6, 2005.
Richard D. Grauer Expert Report, Jun. 30, 2005.
M.Y. Sanadidi Expert Report, Jun. 22, 2005, Exhibit A—Curriculum Vita of M.Y. Sanadidi, Ph.D., Exhibit B—Listing re: Materials Review for Preparation of Report, Exhibit C—Summary chart re: '290 patent and Juno 1.0 prior art, Exhibit D—Illustrations re: Juno 1.0 operating system Exhibit E—Summary chart re: '290 patent and IBM TDB, Exhibit F—Summary chart re: '290 patent and Kleinrock patent.
Jeffrey O. Smith Expert Report, Mar. 5, 2005.

(56) References Cited

OTHER PUBLICATIONS

Jeffrey O. Smith Supplemental Expert Report, Sep. 30, 2005.
Jeffrey O. Smith Expert Report, Jul. 1, 2005.
John R. Vollbrecht Expert Report, Jul. 1, 2005.
Ellen W. Zegura Addendum to Initial Expert Report, Oct. 19, 2005.
America Online, Inc., program files, (1996), including: AOL 028466-028480, America Online Program Diskettes; AOL 116227, Internet in a Box, Disk 1 of 3; AOL 116229, Internet in a Box, Disk 2 of 3 AOL; 116229, Internet in a Box, Disk 3 of 3; AOL 116422, Studio M Lite Gold Disk; AOL 116422, Studio M Lite Gold Disk; AOL 116423, Internet in a Box, Disk 1; AOL 116425, Internet in a Box Disk 2; AOL 116427, Internet in a Box, Disk 3; AOL 116429, Internet in a Box Disk 4; AOL 116433, Spry Mosaic Direct CD ROM; and AOL 116435, Spry Mosaic Direct CD ROM; AOL 116546, Spry Mosaic in a Box CD ROM.
AT&T Corp., AT&T WorldNet Service Quick Start Guide, Internet Access, Version 1.0 (Apr. 12, 1996), ATT 003136-003169.
EarthLink Network, Total Access in the Internet, Earthlink Program Diskettes (1995), ELNKMM 008107-008117.
EarthLink Network, Earthlink Screen Shots (2004), ELNKMM 008125-008147.
EarthLink Network, program file ELN Browserless Cammel Build, Burn #1 (Oct. 18, 1999), ELNKMM014304.
EarthLink Network, program file Startrek 400065513 Certified Master 200105240947, W5.068-67, M:2-253/2.5.7 (Aug. 31, 2001), ELNKMM014305.
EarthLink Network, program file E5.01 Certified Master Source Copy (Dec. 28, 1999), ELNKMM014306.
EarthLink Network, program file Earthlink 5.0, Build#2D, Win 98/99, TA2.3.2 WIN95, TA2.1.5 MAC, (Nov. 17, 1999), ELNKMM014307.
EarthLink Network, program file Earthlink 5.0 DSL, Build#1d, Copy Certified Master, Win 98/99SE, TA.2.1.5MAC, (Nov. 17, 1999), ELNKMM014308.
EarthLink Network, program file Earthlink Network TA 2.3. 2REF#5, Reg#rf2004, Build#1, (Jun. 4, 1999), ELNKMM014309.
EarthLink Network, program file Earthlink, Certified Master Build#4, PACPPC 68k2.1.7, Pergrine, (Jul. 11, 2000), ELNKMM014310.
EarthLink Network, program file ELN IE Canned, Build Domestic 1286t, Build#1p (Oct. 17, 1999), ELNKMM014311.
EarthLink Network, program file ELN IE Canned build, International 40 bit, Build#1p, (Oct. 18, 1999), ELNKMM014312.
EarthLink Network, program file Packard Bell Rebate Offer-2, Reg#050005, (Oct. 20, 1998), ELNKMM014313.
EarthLink Network, program file BOL Gold 980812, (Jun. 3, 2005), ELNKMM014315.
EarthLink Network, program file BOL Gold, (Aug. 18, 1998), ELNKMM014316.
EarthLink Network, program file Direct Partners, GM CD#1, Build#3, Peregrine, (Apr. 18, 2000), ELNKMM014317.
EarthLink Network, program file COMPUSA OEM, Browserless Build, Reg#RET099, Job#12, 179981024, Earthlink Network, Inc., (Dec. 23, 1998), ELNKMM014318.
EarthLink Network, program file Tribune Marketing, Capetal Hill People Fair, Reg#400052260, Build#1D, Earthlink WIN98/E5, PPC2.1.5, (Jun. 3, 2005), ELNKMM014319.
EarthLink Network, program file Earthlink, Inc. E5.06 #19, 400042822, Build#3, Sanwise, Job:071120001200, WIN9X 5.03#19, (Jul. 12, 2000), ELNKMM014320.
EarthLink Network, program file Reference Build 1, 5.03.42 Affinity Mem, Earthlink, Inc. 121820, (Jan. 3, 2001), ELNKMM014321.
EarthLink Network, program file Earthlink E5.06.8re12, 400042822 / AMD 54, Burn 1s, Job 200107131942, W.5.06.8, Dialup#4, (Jul. 24, 2001), ELNKMM014322.
EarthLink Network, program file Carolina Mudcats, 60 Days for 1, 400051300, Build#1 Samwise, Job: 050320001134, (May 9, 2000), ELNKMM014323.
EarthLink Network, program file UCLA BOL Gold, TA2.02 Mac, TA2.2 Win 95/98, Job#082419980537, (Aug. 17, 1998), ELNKMM014324.
EarthLink Network, program file MAC0101070514252206, Earthlink Pwc., OSC 2.5.5 ref#6, Classic 2.5.1, (Aug. 3, 2001), ELNKMM014348.
EarthLink Network, program file MAE0001070510252203, Earthlink Pwc., OSC 2.5.5, ref#3, Classic 2.5.1, (Aug. 2, 2001), ELNKMM014349.
EarthLink Network, program file MAZ0101070514252206, Earthlink Pwc., OSX2.5.3 ref#6, Classic 2.5.1, (Aug. 10, 2001), ELNKMM014350.
EarthLink Network, program file P08022001084758, Earthlink Pwc, M2.2.166, DSL, (Feb. 3, 2001), ELNKMM014354.
EarthLink Network, program file E5 Source Backup, 5.07.7 R2 Thru 5.07.9 R1, Samwise (Feb. 8, 2002), ELNKMM014356.
EarthLink Network, program file E5.06.7, E5.06.8, Source Backup, 200104726, (Jun. 21, 2001), ELNKMM014357.
EarthLink Network, program file Job#092419981507, Earthlink Network, Packard Bell Rebate Offer, Reg#802133, Uncertified Copy, (Sep. 25, 1998), ELNKMM014358.
EarthLink Network, program file E5.05.4 and E5.05.5 (Jan. 26, 2001), ELNKMM014359.
EarthLink Network, program file E5.07.1 and E5.01.2 (Sep. 11, 2001), ELNKMM014360.
EarthLink Network, program file E506.90 and E5.06.91 (Sep. 16, 2001), ELNKMM014361.
EarthLink Network, program file Old USAA 5.02 (Apr. 18, 2000), ELNKMM014362.
EarthLink Network, program file Earthlink TotalAccess 2.3 (Mar. 10, 1999), ELNKMM014364.
Earthlink Network, program file Sprint ION, 400048961, Build#1 R, Job#122819991502, (Dec. 29, 1999), ELNKMM014277.
EarthLink Network, program file UCLA BOL Gold, Build#3, Peregrine, Job:062320001100, (Jul. 6, 2000), ELNKMM014278.
EarthLink Network, program file Earthlink E5.03#39, 400042822, Build#1, SAMWISE, Job:10172000145915, (Oct. 18, 2000), ELNKMM014279.
EarthLink Network, program file DOT Planet, 400060445, Burn#1 P, 200101081443, (Jan. 18, 2001), ELNKMM014280.
EarthLink Network, program file Hewlet Packard, OMNI Book Pall, Burn#2, (2001), ELNKMM014282.
EarthLink Network, program file BM Fall 2001, OEMXP 400065204, Burn '1CS, W.5.06.9 lite 2, Dialup OEM, (Aug. 2, 2001), ELNKMM014283.
EarthLink Network, program file E5.06.8Rev2, 400042822, Burn#1S, WIN20010713194253, W.5.06.8, Dialup#3, (Jul. 27, 2001), ELNKMM014284.
EarthLink Network, program file Sony UaoLINE, Fall 2001Y, 400065244, Burn#1C-S, 200107200853, W.5.06.9, LITE2, Dialup OEM, (Aug. 2, 2001), ELNKMM014285.
EarthLink Network, program file Earthlink E05.6 Rev:1, Burn#1 Samwise, P01182001165633, WIN9X/ME5.05.6, Dialup, (Jan. 19, 2001), ELNKMM014286.
EarthLink Network, program file Direct Partners, 6M CD1, 400054757/400050901, Build#1, Peregrine, (Apr. 20, 2000), ELNKMM014287.
EarthLink Network, program file Earthlink, Inc., E5.03F09 AMID, 400042822, Build#1 Samwise, Job:P1617200014551, win9x 5.03 #39, (Oct. 8, 2000), ELNKMM014288.
EarthLink Network, program file Earthlink, Inc., TA 2.1.7-E.502, Small Media Ref, Build 1 Frodo, 062720001439, (Jul. 14, 2000), ELNKMM014289.
EarthLink Network, program file DP GMCD#1, Build#5, Peregrine (Apr. 18, 2000), ELNKMM014290.
EarthLink Network, program file Earthlink 5.0, Its Your Internet, B70.1-R2-0100, (2000), ELNKMM014291.
EarthLink Network, program file Earthlink Gold, vol. 6, WIN95/98V. 2.3, MAC V2.1, Premium Internet Access, (1999), ELNKMM014292.
EarthLink Network, program file TA Gold, Build#1, (Jun. 7, 2000), ELNKMM014293.

(56) References Cited

OTHER PUBLICATIONS

EarthLink Network, program file Earthlink 5.01, E5.01 Test Build, Build#8, Burn#1 (Dec. 20, 1999), ELNKMM014294.
EarthLink Network, program file USAA 5.03 Test, No: elnbonus.cfg; .cnt; .exe; .hlp (Dec. 8, 2000), ELNKMM014295.
EarthLink Network, Inc., Total Access Internet (1996), ELNKMM 014366-014375.
MindSpring Enterprises, Inc., Internet Access Software Windows version 2.0, (1995), ELNKMM 014385-014388.
EarthLink Network, Screen shots, Total Access 1.0 (date unknown), ELNKMM 015597-015634.
SBC Yahoo!, Software Installation Guide (date unknown), SBC 051021-051051.
SBC Yahoo! Software Installation Guide (date unknown), SBCMM 051684-051714.
U 003118-003119, Juno and Netzero executables (Jun. 27, 2005).
UOL's Reply in Support of its Motion for Summary Judgment of Noninfringment, Sep. 6, 2005 Exhibit A—Excerpts from transcript of deposition of Jeffrey O. Smith, Aug. 18, 2005, Exhibit B—Excerpts from transcript of deposition of Michael Sharp, Aug. 11, 2005, Exhibit C—Excerpts from transcript of deposition of Jeffrey O. Smith, Aug. 22, 2005.
MyMail's Sur-Reply to UOL Defendants' Motion for Summary Judgment of Non-Infringement, Sep. 16, 2005.
Plaintiff MyMail's Sur-Reply to Prodigy and SBIS' Reply in Support of its Motion for Summary Judgment of Non-Infringement, Sep. 29, 2005.
Defendants' [Earthlink, Inc., America Online, Inc., NetZero, Inc., Juno Online Services, Inc., NetBrands, Inc., Prodigy Communications Corp., and Southwestern Bell Internet Services, Inc.] Motion for Summary Judgment of Invalidity Based on the On-Sale Bar, Jul. 26, 2005, including exhibits: Defendants' Exhibit A—Plaintiff MyMail, Ltd.'s Objections and Responses to Defendants' Second Set of Common Interrogatories (Nos. 13-14), Oct. 29, 2004; Defendants' Exhibit B—Excerpts from transcript of deposition of Thomas D. Selgas, May 5, 2005; Defendants' Exhibit C—Excerpts from transcript of deposition of Thomas D. Selgas, Dec. 9, 2004; Defendants' Exhibit D—Excerpts from transcript of deposition of Thomas D. Selgas, Mar. 1, 2005; Defendants' Exhibit E—U.S. Appl. No. 60/050,186; Defendants' Exhibit F—Excerpt from U.S. Appl. No. 09/100,619 (now U.S. Patent No. 6,571,290 (Selgas)) 186; Defendants' Exhibit G—Excerpt from U.S. Patent No. 6,571,290 (Selgas); Defendants' Exhibit H—Excerpt from Preliminary Amendment re: U.S. Appl. No. 09/100,619 (now U.S. Patent No. 6,571,290 (Selgas)), Aug. 15, 2001; and Defendants' Exhibit I—Excerpt from U.S. Appl. No. 09/100,619 (now U.S. Patent No. 6,571,290 (Selgas)), May 8, 2000.
UOL Defendants' Motion for Summary Judgment of Patent Invalidity, Aug. 2, 2005, including exhibits: Exhibit 1—Declaration of Abhijit Khale; Exhibit 2—Memorandum Opinion 186; and Exhibit 3—Expert Report of M.Y. Sanadidi.
Defendants' Motion for Summary Judgment of Invalidity Under Section 102(B) Based on Sales and Public Use of the Inventors' "NEAT" Software System and Memorandum in Support Thereof, Aug. 2, 2005, Proposed Order, including exhibits: Exhibit A—Statement of Material Facts Pursuant to Local Rule CV-56; Exhibit B—Wooter E-mail of Dec. 8, 1996, MyMail 4994-5004; Exhibit C—Selgas & Derby e-mail of Jun. 22, 1997, MyMail 64377-64378; Exhibit D—U.S. Patent No. 6,571,290 (Selgas); Exhibit E—Excerpts from Plaintiff MyMail, Ltd.'s Objections and Responses to Defendants' First Set of Common Interrogatories (Nos. 1-12), Aug. 13, 2004; Exhibit F—Excerpts from transcript of deposition of John Everett Gmuender, Nov. 7, 2004; Exhibit G—Excerpts from Plaintiff MyMail, Ltd.'s Objections and Responses to Defendants' Second Set of Common Interrogatories (Nos. 13-14), Oct. 29, 2004; Exhibit H—MyMail, Ltd. Capital Ownership report, MyMail 647043-647054, May 3, 2005; Exhibit I—Excerpts from transcript of deposition of Thomas D. Selgas, May 5, 2005; Exhibit J—Excerpts from transcript of deposition of Thomas D. Selgas, Dec. 9, 2004; Exhibit K—Statement of Holman (Tex) H. Wooters, GTE 19829-19830;

Exhibit L—Excerpts from transcript of deposition of Holman (Tex) H. Wooters, Jul. 28, 2005; Exhibit M—Excerpts from transcript of deposition of Michael B. Massing, Nov. 9, 2004; Exhibit N—Netsafe Powerpoint presentation, MyMail 3313-3343; Exhibit O—Excerpts from transcript of deposition of Channing Corn, Jun. 3, 2005; Exhibit P—Customer Growth Data, GTE 18677-18679; Exhibit Q—GTE Invoice, MyMail 40150; and Exhibit R—GTE 800 Number Usage Data, MyMail 40240-40268.
Earthlink, Inc.'s Motion in the Alternative for Summary Judgment of Invalidity Based on Anticipation of Claims 3-8 and 11, Aug. 3, 2005, including exhibits: Earthlink's Exhibit A—Declaration of Gregory Collins, Aug. 3, 2005; Earthlink's Exhibit B—Excerpt from the transcript of the deposition of Cyrus Pejournand; Earthlink's Exhibit C—Expert Report of Jeffrey O. Smith, Jul. 1, 2005; Earthlink's Exhibit D—*Upsher-Smith Laboratories, Inc. v. Pamlab, L.L.C.*, 2005 U.S. App. LEXIS 11527, Jun. 17, 2005; Earthlink's Exhibit E—*Prima Tek II, L.L.C. v. Southpac Trust International, Inc.*, 412 F.3d 1284, Jun. 22, 2005; Earthlink's Exhibit F—Initial Expert Report of Ellen W. Zegura Regarding the Invalidity of U.S. Patent No. 6,571,290, Jul. 1, 2005; Earthlink's Exhibit G—Declaration of Kevin Lu, Aug. 2, 2005; Earthlink's Exhibit H—Rebuttal Expert Report of Jeffrey O. Smith, Jul. 29, 2005; Earthlink's Exhibit I—MyMail claim chart comparing U.S. Patent No. 6,571,290 and Earthlink Total Access 1.0; Earthlink's Exhibit J—MyMail claim chart comparing U.S. Patent No. 6,571,290 and Earthlink Total Access 1.0; and Earthlink's Exhibit K—MyMail claim chart comparing U.S. Patent No. 6,571,290 and Earthlink Total Access 1.0.
Plaintiff MyMail's Response to Defendants' Motion for Summary Judgment of Invalidity Under Section 102(B) Based on Sales and Public Use of the Inventors' "NEAT" Software System and Memorandum in Support Thereof, Aug. 26, 2005, including exhibits: Exhibit A—Declaration of Thomas D. Selgas, Aug. 25, 2005; Exhibit B—Excerpts from transcript of deposition of Thomas D. Selgas, Dec. 8, 2004; Exhibit C—Non-Disclosure or Confidentiality Agreements between Netsafe, Inc. and Comm Group, GTE, MarketArts, Inc., The Paradigm Group, Inc., Jim Edward Leo, Channing Corn, Richard Phillips, GTE Intelligent Network Services, Inc., Smith Barney, Inc., E. David Johnson, and Nancy Goodstein, and The Fidelis Group, and GCT, Inc.; Exhibit D—Internet Access Service Agreement between GTE Intelligent Network Services Incorporated and Netsafe, Inc., Dec. 5, 1995, MyMail 3103-3119; Exhibit E—Excerpts from transcript of deposition of Thomas D. Selgas, Sep. 16, 2004; Exhibit F—Excerpts from transcript of deposition of Thomas D. Selgas, Mar. 1, 2005; Exhibit G—Excerpts from transcript of deposition of Thomas D. Selgas, Dec. 10, 2004; Exhibit H—Netrepreneurial Network Training Course manual, Nov. 7, 2004; Exhibit I—Excerpts from transcript of deposition of Holman Wooters, Jul. 28, 2005; Exhibit J—Excerpts from transcript of deposition of Michael B. Massing, Nov. 9, 2004; Exhibit K—Excerpts from transcript of deposition of Thomas D. Selgas, Dec. 9, 2004; Exhibit L—Excerpts from transcript of deposition of Thomas D. Selgas, May 5, 2005; Exhibit M—Netsafe NEAT Version 3.0 Beta Review, MASS 106-109; Exhibit N—Excerpts from transcript of deposition of Thomas D. Selgas, Jun. 2, 2005; Exhibit O—Netsafe Announces First Suite of Integrated Customizable Internet Tools and Services, Oct. 23, 1996, MyMail 3285-3287; Exhibit P—Information Disclosure Statement re: U.S. Appl. No. 09/100,619 (now U.S. Patent No. 6,571,290), Mar. 27, 2003, MyMail 1555-1559; Exhibit Q—Excerpts from transcript of deposition of John Everett Gmuender, Nov. 7, 2004; Exhibit R—Excerpts from transcript of deposition of Channing Corn, Jun. 3, 2005; and Exhibit S—Task listing, MASS 1597-1598.
MyMail's Response to Defendants' Motion for Summary Judgment of Invalidity Based on the On-Sale Bar, Aug. 26, 2005, including exhibits: MyMail's Exhibit A—Excerpts from the Provisional Application That Preceded U.S. Patent No. 6,571,290; MyMail's Exhibit B—Defendant Earthlink, Inc.'s Second Supplemental Responses to Plaintiff MyMail, Ltd.'s First Set of Interrogatories; MyMail's Exhibit C—Excerpt from U.S. Patent No. 6,571,290 (Selgas); and MyMail's Exhibit D—Hand-drawn figures from provisional application.
Defendants' Reply in Support of Their Motion for Summary Judgment of Invalidity Based on Sales and Public Use of the "NEAT" Software System, Sep. 6, 2005.

(56) References Cited

OTHER PUBLICATIONS

Defendants' Reply in Support of Their Motion for Summary Judgment of Invalidity Based on On-Sale Bar, Sep. 6, 2005, including exhibits: Defendants' Exhibit A—Earthlink Claim Chart; and Defendants' Exhibit C—Excerpt from transcript of Markman Hearing Before the Honorable Leonard Davis, Apr. 6, 2005.
UOL Defendants' Reply in Support of Motion for Summary Judgment of Patent Invalidity, Sep. 6, 2005, including: UOL Defendants' Errata Sheet re: UOL Defendants' Reply in Support of Motion for Summary Judgment of Patent Invalidity, Sep. 7, 2005.
Prodigy's Reply in Support of its Motion for Summary Judgment of Invalidity, Sep. 13, 2005, including exhibits: Exhibit A—Declaration of Bruce Phillips in Support of Prodigy's Reply in Support of its Motion for Summary Judgment of Invalidity, Sep. 13, 2005; and Exhibit 1 to Exhibit A—Press release re: Prodigy, Inc. Launches Prodigy Internet 1.1, Oct. 16, 1996.
Defendants' [Earthlink, Inc., NetZero, Inc. Juno Online Services, Inc., NetBrands, Inc., Prodigy Communications Corp., SouthwesternBell Internet Services, Inc. and SBC Internet, Inc.] Reply in Support of AOL's Motion for Summary Judgment of Invalidity Under Section 102(b) Based on AT&T WorldNet, Sep. 13, 2005.
MyMail's Sur-Reply to Defendants' Motion for Summary Judgment of Invalidity Based on the On-Sale Bar, Sep. 16, 2005, including exhibits: MyMail's Exhibit A—Excerpts from U.S. Patent No. 6,571,290; and MyMail's Exhibit B—Excerpt from transcript of Markman Hearing Before the Honorable Leonard Davis, Apr. 6, 2005.
Plaintiff MyMail's Sur-Reply to UOL Defendants' Motion for Summary Judgment of Patent Invalidity, Sep. 16, 2005.
Plaintiff MyMail's Sur-Reply to Defendants' Motion for Summary Judgment of Invalidity Under Section 102(B) Based on Sales and Public Use of the Inventors' "NEAT" Software System and Memorandum in Support Thereof, Sep. 21, 2005.
Plaintiff MyMail's Sur-Reply to AOL's Motion for Summary Judgment of Patent Invalidity, Sep. 23, 2005.
Engst, Adam C., et al., "Spry Internet in a Box," Internet Starter Kit for Windows, Hayden Books, 1995.
Higgs, Scott, "Windows to the Internet," Byte, Jul. 1995, AOL 117741-117747.
Internet in a Box: Getting Started, O'Reilly & Associates, Inc., 1994.
Internet in a Box: Installation & Configuration Guide, O'Reilly & Associates, Inc., 1994.
Online Catalog: Internet in a Box, www.oreilly.com (Jun. 1995), AOL117830-117832.
Defendants' Joint Motion for Summary Judgment of Unenforceability Due to Inequitable Conduct, Aug. 2, 2005, including exhibits: Exhibit A—Excerpt from U.S. Patent No. 6,571,290 (Selgas), MyMail 1180; Exhibit B—File History of U.S. Appl. 09/100,619/ U.S. Patent No. 6,571,290, MyMail 1216-1418; Exhibit C—U.S. Appl. No. 60/050,186, MyMail 8917-9085; Exhibit D—Excerpts from WebTV Technical Spec., Aug. 19, 1997, MyMail 1707-1710; Exhibit E—Excerpts from WebTV Technical Spec., MyMail 1703-1706; Exhibit F—Excerpts from transcript of deposition of Thomas D. Selgas, Dec. 9, 2004; Exhibit G—Email from Tom Selgas to Bob Derby, Jun. 22, 1997, MyMail 643877; Exhibit H—Letter from Thomas D. Selgas to Gregory W. Carr, Jul. 22, 1997, MyMail 644207; Exhibit I—Excerpt from transcript of the deposition of Gregory W. Carr, Dec. 7, 2004; Exhibit J—WebTV: Microsoft's Consumer Foothold, MyMail 9743-9744; Exhibit K—Email from Tom Selgas to Bob Derby, Aug. 23, 1997, MyMail 643848; Exhibit L—Combined Declaration and Power of Attorney re U.S. Appl. 09/100,619/ U.S. Patent No. 6,571,290, MyMail 1285-1286; Exhibit M—Carr & Storm, LLP invoice to Netsafe, Inc., Aug. 7, 1998, MyMail 644637; Exhibit N—Memo from Gregory W. Carr to Tom Selgas re: Valuation of Certain Netsafe, Inc. Intellectual Properties, Jul. 24, 1998, MyMail 2578-5780.
Exhibit O—Memo from Gregory W. Carr to Tom Selgas re: Search for Patent of WebTV Technology, Oct. 7, 1998, MyMail 644205-644206; Exhibit P—Index re: WebTV patent search, MyMail 645133-645144; Exhibit Q—Confidential Business Plan, MyMail 2578-2580; Exhibit R—Excerpt from the transcript of the deposition of Carl A. Erickson, Jul. 27, 2005; Exhibit S—Information Disclosure Statement re U.S. Appl. No. 09/100,619/ U.S. Patent No. 6,571,290, Sep. 9, 1999, MyMail 1427-1428; Exhibit T—Office Action U.S. Appl. No. 09/100,619/ U.S. Patent No. 6,571,290, Dec. 20, 2000, MyMail 1432-1441; Exhibit U—Preliminary Amendment re: U.S. Appl. No. 09/100,619/ U.S. Patent No. 6,571,290, Aug. 15, 2001, MyMail 1447-1476; Exhibit V—Office Action re: U.S. Appl. No. 09/100,619/ U.S. Patent No. 6,571,290, Jun. 5, 2002, MyMail 1521-1528; Exhibit W—Excerpt from Manual of Patent Examining Procedure, Latest Revision, Feb. 2000; Exhibit X—Examiner Interview Summary re U.S. Appl. No. 09/100,619/ U.S. Patent No. 6,571,290, Sep. 17, 2002, MyMail 1533-1535; Exhibit Y—Draft Amendment re: U.S. Appl. No. 09/100,619/ U.S. Patent No. 6,571,290, MyMail 1536-1539; and Exhibit Z—Notice of Allowability re: U.S. Appl. No. 09/100,619/ U.S. Patent No. 6,571,290, Sep. 26, 2002, MyMail 1541-1546.
Exhibit AA—Request for Continued Examination re: U.S. Appl. No. 09/100,619/ U.S. Patent No. 6,571,290, Jan. 2, 2003, MyMail 1554; Exhibit BB—Information Disclosure Statement re: U.S. Appl. No. 09/100,619/ U.S. Patent No. 6,571,290, Mar. 27, 2003, MyMail 1555-1559; Exhibit CC—Notice of Allowance and Fees Due re: U.S. Appl. No. 09/100,619/ U.S. Patent No. 6,571,290, Sep. 26, 2002, MyMail 1561-1564; Exhibit DD—Excerpt from Plaintiff MyMail, Ltd.'s Objections and Responses to Defendants' Second Set of Common Interrogatories (Nos. 13-14); Exhibit EE—Excerpts from transcript of deposition of John Everett Gmuender, Nov. 7, 2004; Exhibit FF—NetSafe Customer Records; Exhibit GG—Statement of Holman (Tex) H. Wooters, Feb. 2, 2005; Exhibit HH—Netsafe PowerPoint presentation, 1997, MyMail 3313-3342; Exhibit II—PowerPoint presentation, MyMail 9259-9268; Exhibit JJ—Attorney Notes, MyMail 643335; and Exhibit KK—Draft IDS for MyMail Application, MyMail 643336-643337.
Plaintiff's Response to Defendants' Joint Motion for Summary Judgment of Unenforceability Due to Inequitable Conduct, Aug. 29, 2005 Plaintiff's Declaration of Scott L. Cole, with exhibits: Exhibit A—U.S. Patent No. 5,862,339 (Bonnaure), MyMail 16155-16186; Exhibit B—Expert Report of Gregory Lavender, Ph.D.; Exhibit C—Excerpts from the transcript of the deposition of Richard D. Grauer, Aug. 15, 2005; Exhibit D—Excerpts from the transcript of the deposition of Gregory W. Carr, Dec. 7, 2004 ; Exhibit E—Excerpts from the transcript of the deposition of Gregory W. Carr, Dec. 8, 2004; Exhibit F—Excerpts from the transcript of the deposition of Thomas D. Selgas, Dec. 10, 2004; and Exhibit G—Excerpt from Manual of Patent Examining Procedure § 2004 (8th Ed., 2002) entitled "Aids to Compliance with Duty of Disclosure".
Defendants' Reply in Support of Their Motion for Summary Judgment of Unenforceability Due to Inequitable Conduct, Sep. 9, 2005, including exhibits: Exhibit A—Excerpt from transcript of the deposition of Gregory W. Carr, Aug. 31, 2004; Exhibit B—Excerpt from transcript of the deposition of Richard Grauer, Aug. 15, 2005; Exhibit C—Excerpt from transcript of the deposition of Gregory W. Carr, Dec. 7, 2004; Exhibit D—Excerpt from transcript of the deposition of Gregory W. Carr, Dec. 7, 2004; Exhibit E—Excerpt from transcript of the deposition of Gregory W. Carr, Jun. 1, 2005; Exhibit F—Excerpt from transcript of the deposition of Gregory W. Carr, Dec. 8, 2004; Exhibit G—Excerpt from transcript of the deposition of Richard Grauer, Aug. 15, 2005; Exhibit H—Excerpt from transcript of the deposition of Thomas D. Selgas, Dec. 9, 2004 ; and Exhibit I—Excerpt from transcript of the deposition of Thomas D. Selgas, Dec. 10, 2004.
Plaintiff's Sur-Reply to Defendants' Joint Motion for Summary Judgment of Unenforceability Due to Inequitable Conduct, Sep. 19, 2005.
Defendants' Motion to Dismiss for Lack of Standing, Jul. 26, 2005, Defendants' Exhibit A—Excerpt of transcript of deposition of Thomas D. Selgas, Dec. 8, 2004, Defendants' Exhibit B—Excerpt of transcript of deposition of Robert T. Derby, Jun. 16, 2005, Defendants' Exhibit C—Purchase Agreement/Letter of Intent between Netsentinel and Netsafe Inc., MyMail 3029-3032, Defendants' Exhibit D—Patent Assignment Records re: U.S. Patent No. 6,571,290, Defendants' Exhibit E—Record of Assignment re: U.S. Patent No. 6,571,290, MyMail 643974-643975, Defendants' Exhibit

(56) References Cited

OTHER PUBLICATIONS

F—Promissory Note between Robert T. Derby and Netsafe, Inc., MyMail 1008, Defendants' Exhibit G—Original Petition from *Robert T. Derby* v. *Netsafe, Inc.*, MyMail 18836, Defendants' Exhibit H—Judgment from *Robert T. Derby* v. *Netsafe, Inc.*, MyMail 1003, Defendants' Exhibit I—Original Petition from *Robert T. Derby* v. *Netsafe, Inc.*, MyMail 18836, and Promissory Note between Robert T. Derby and Netsafe, Inc., MyMail 1008, Defendants' Exhibit J—Title page from U.S. Patent No. 6,571,290, MyMail 644049, and handwritten notes, MyMail 1030.

MyMail, Ltd.'s Response to Defendants' Motion to Dismiss for Lack of Standing, Aug. 12, 2005, including exhibits: MyMail's Exhibit 1—Declaration of Thomas Selgas, Aug. 10, 2005, with: Exhibit A to MyMail's Exhibit 1—Cyrix Corporation Employee Stock Purchase Plan, MyMail 653552-653560; Exhibit B to MyMail's Exhibit 1—Cyrix Corporation Incentive Stock Option Agreement, MyMail 653516-653524; and Exhibit C to MyMail's Exhibit 1—Assignment, Jun. 19, 1997, MyMail 14023. MyMail's Exhibit 2—Declaration of Andrew Viger, Aug. 10, 2005, with: Exhibit A to MyMail's Exhibit 2—Cyrix Corporation Employee Stock Purchase Plan, MyMail 653552-653560; and Exhibit B to MyMail's Exhibit 2—Cyrix Corporation Incentive Stock Option Agreement, MyMail 653516-653524. MyMail's Exhibit 3—Promissory Note, MyMail 647983-647984; MyMail's Exhibit 4—Texas Certificate of Involuntary Dissolution, MyMail 647985-647986; MyMail's Exhibit 5—Judgment from *Robert T. Derby* v. *Netsafe, Inc.*, MyMail 647989-647990; MyMail's Exhibit 6—Declaration of James Keifer, with: Exhibit A to MyMail's Exhibit 6—Assignment of Invention, MyMail 8775; and Exhibit B to MyMail's Exhibit 6—Articles of Conversion, MyMail 1065-1070. MyMail's Exhibit 7—Excerpts from transcript of deposition of Thomas D. Selgas, Jan. 25, 2005 (w/attached Deposition Exhibit 5—U.S. Patent No. 6,571,290); MyMail's Exhibit 8—Excerpts from transcript of deposition of Michael B. Massing, Nov. 9, 2004; MyMail's Exhibit 9—Declaration of Lucien Ostenkowski, with: Exhibit A to MyMail's Exhibit 9—Cyrix Corporation Employee Stock Purchase Plan, MyMail 653552-653560; and Exhibit B to MyMail's Exhibit 1—Cyrix Corporation Incentive Stock Option Agreement, MyMail 653516-653524.

Southwestern Bell Internet Services, Inc.'s and Prodigy Communications Corporation's Reply Brief in Support of Defendants' Motion to Dismiss for Lack of Standing, Aug. 22, 2005, including exhibits: Exhibit A—Excerpt from transcript of the deposition of Holman Wooters, Jul. 28, 2005; Exhibit B—Netsafe balance sheet, Jun. 1998; Exhibit C—Excerpt from transcript of the deposition of Robert Derby, Jun. 16, 2005; and Exhibit D—Excerpt from transcript of the deposition of Andrew Viger, Aug. 15, 2005.

MyMail, Ltd.'s Sur-Reply to Defendants' Reply Brief in Support of Defendants' Motion to Dismiss for Lack of Standing, Aug. 30, 2005, including exhibit: MyMail's Exhibit A—Excerpt from transcript of the deposition of Andrew Viger, Aug. 15, 2005.

Supplement in Support of Defendants' Motion to Dismiss for Lack of Standing, Sep. 29, 2005, including exhibits: Defendants' Exhibit A—Docket sheet re: *Robert T. Derby* v. *Netsafe, Inc.*, Jan. 24, 2000; Defendants' Exhibit B—Texas Secretary of State documents; Defendants' Exhibit C—Original Petition from *Robert T. Derby* v. *Netsafe, Inc.*; Defendants' Exhibit D—Certificate of Unclaimed Service, Sep. 26, 2005; Defendants' Exhibit E—Transmittal letter re: Certificate of Unclaimed Service, Apr. 6, 2000, MyMail 1017; and Defendants Exhibit F—Judgment from *Robert T. Derby* v. *Netsafe, Inc.*, Apr. 12, 2000.

MyMail's Motion to Strike Defendants' Emergency Supplement in Support of Defendants' Motion to Dismiss for Lack of Standing, Sep. 30, 2005.

Draft version of Defendants' Standing Presentation (date unknown).
Earthlink's Notice of Reliance on Supplemental Authority Regarding Defendants' Motion for Summary Judgment of Invalidity Based on the On-Sale Bar, Sep. 27, 2005, including: Earthlink's Exhibit A—Case cite re: *Pandrol USA, LP, et al.* v. *AirBoss Railway Products, Inc., et al.*, 2005 U.S. App. LEXIS 20054, Sep. 19, 2005.

Transcript of Pretrial Conference and Summary Judgment Hearing Before the Honorable Leonard David, Oct. 3, 2005.
Memorandum Opinion and Order re: Earthlink's Motion for Summary Judgment of Non-Infringement, UOL's Motion for Summary Judgment of Non-Infringement, Southwestern Bell Internet Services and Prodigy's Motion for Summary Judgment of Non-Infringement, and MyMail's Motion for Leave to Supplement the Summary Judgment Record, Oct. 28, 2005.
Non-Confidential Brief for Plaintiff/Appellant MyMail, Ltd., Mar., 7, 2006.
Non-Confidential Brief for Defendants/Appellees/Cross-Appellants NetZero, Inc., Juno Online Services, Inc. and Netbrands, Inc., May 17, 2006.
Non-Confidential Brief of Defendant/Counterclaimaint/Cross-Apellant Earthlink, Inc. and Defendants/Appellees Prodigy Communications Corporation, SBC Internet Services, Inc. and Southwestern Bell Internet Services, Inc., May 17, 2006.
Non-Confidential Reply Brief of Plaintiff/Appellant MyMail, Ltd., Jul. 13, 2006.
Corrected Non-Confidential Reply Brief of Defendant/Cross Appellant Earthlink, Inc. and Defendants/Cross Appellants NetZero, Inc., Juno Online Services, Inc. and NetBrands, Inc.Aug. 24, 2006.
U.S. Court of Appeals for the Federal Circuit, Non-Confidential Joint Appendix, vol. 1, with Protective Order, (Aug. 21, 2006) containing: U.S. Patent No. 5,571,290, pp. A 1-35; Final Judgment, p. A 36; Memorandum and Opinion, pp. A 37-48; Civil Docket, pp. A 49-98; Claim Construction Memorandum and Opinion, pp. A 99-122; Plaintiffs Markman Claim Construction Brief, pp. A 123-219; and Responsive Markman Brief of Defendants Netzero, Inc., Juno Online Services, Inc., Netbrands, Inc., Earthlink, Inc., Prodigy Communications Corp., Southwestern Bell Internet Services, Inc., and GTE. Net LLC, pp. A 220-712.
U.S. Court of Appeals for the Federal Circuit (Aug. 21, 2006), Non-Confidential Joint Appendix, vol. 2, containing: Defendant America Online, Inc. Claim Construction Brief, pp. A 713-1101 (Defendants/P.O. Precludes Submission: Declaration of Dr. R. Greg Lavender, pp. A 1066-1079).
U.S. Court of Appeals for the Federal Circuit (Aug. 21, 2006), Non-Confidential Joint Appendix, vol. 3, containing: Plaintiff's Reply in Support of its Markman Claim Construction Brief, pp. A 1102-1142; (Defendant(s)/P.O. Preclude Submission: Defendant AOL Motion for Summary Judgment of Noninfringement and Memorandum in Support Thereof, pp. A 1143-1420) (Defendant(s)/P.O. Preclude Submission: MyMail's Response to AOL's Motion for Summary Judgment of Noninfringement, pp. A 1421-1696); Earthlink's Motion for Summary Judgment of Non-Infringement, pp. A 1697-1802; MyMail's Response to Earthlink's Motion for Summary Judgment of Non-Infringement, pp. A 1803-2011.
U.S. Court of Appeals for the Federal Circuit, Non-Confidential Joint Appendix, vol. 4, (Aug. 29, 2006) containing: MyMail Response to UOL Defendants' Motion for Summary Judgment on Non-Infringement, pp. A 2460-2736; UOL's Reply in Support of its Motion for Summary Judgment on Non-Infringement, pp. A 2737-2795; MyMail's Sur-Reply to UOL's Motion for Summary Judgment on Non-Infringement, pp. A 2796-2805; MyMail Motion for Leave to Supplement the Summary Judgment Record with Testimony of UOL Witness First Deposed After the Summary Judgment Hearing Pursuant to the Court's Order, pp. A 2806-2820. UOL's Opposition to MyMail's Motion for Leave to Supplement the Summary Judgment Record, pp. A2821-2827; MyMail's Reply in Support of its Motion for Leave to Supplement the Summary Judgment Record, pp. A 2828-2836; Transcript of Markman Hearing (excerpts), pp. A 2837-3015; Transcript of Pretrial Conference and Summary Judgment Hearing (excerpts), pp. A 3016-3065; (Defendant(s)/P.O. Preclude Submission: excerpt from Pretrial Conference and Summary Judgment Hearing transcript, pp. A 3066-3217); MyMail's Third Amended Complaint, pp. A 3218-3262; (Defendant(s)/P.O. Preclude submission: MyMail's Response to Defendants' Motion to Dismiss for Lack of Standing, pp. A 3263-3409); (Defendant(s)/P.O. Preclude Submission: Defendants' Motion to Dismiss for Lack of Standing, pp. A 3410-3462); (Defendant(s)/P.O. Preclude Submission: MyMail's Response to Defendants' Motion to Dismiss for Lack of Standing, pp. A 3463-3627); (Defendant(s)/P.O. Preclude Submis-

(56) References Cited

OTHER PUBLICATIONS sion: Reply Brief in Support of Defendants' Motion to Dismiss for Lack of Standing, pp. A 3628-3648); MyMail's Sur-Reply to Defendants' Motion to Dismiss for Lack of Standing, pp. A 3649-3682; MyMail's Motion to Strike Defendants' Motion to Dismiss for Lack of Standing, pp. A 3649-3682; MyMail's Motion to Strike Defendants' Emergency Supplement in Support of Defendants' Motion to Dismiss for Lack of Standing, pp. A 3683-3720; Defendants Prodigy Communications Corporation and Southwestern Bell Internet Services, Inc.'s Answer to MyMail's Third Amended Complaint, pp. A 3721-3730; Answer and Counterclaim of Defendants Netzero, Inc., Juno Online Services, Inc., and Netbrands, Inc. to MyMail's Third Amended Complaint, pp. A 3731-3740; Defendants Earthlink, Inc.'s Answer and Counterclaims to Plaintiffs' Third Amended Complaint, pp. A 3741-3746; Statement of Holman (Tex) H. Wooters, pp. A 3747-3748; and Joint Final Pretrial Order, pp. A 3749-3771.

Deposition of Thomas Blahuta, Jul. 22, 2005.

Deposition of Gregory W. Carr, Dec. 7, 2004, with deposition exhibits: Exhibit 30-13 Subpoena; Exhibit 31—37 CFR 1.56; Exhibit 32—Email from Bob Derby; Exhibit 33—Mr. Carr's Objections and Responses to America Online's subpoena; Exhibit 34—Nondisclosure or Confidentiality Agreements between NetSafe, Inc.; Exhibit 35—Memorandum from Mr. Carr to Mr. Selgas; Exhibit 36—Document titled NetSafe, Inc. with listing of 10 items; Exhibit 37—Provisional patent application file; Exhibit 38—MyMail file history leading to patent; Exhibit 39—Information Disclosure Statement; and Exhibit 40—Bonnaure patent 5,862,339.

Deposition of Gregory W. Carr, Dec. 8, 2004, with deposition exhibits: Exhibit 41—U.S. Patent issued to Mighdoll; Exhibit 42—Office Action, MyMail 8819-8828; Exhibit 43—Draft IDS for MyMail Applications; Exhibit 44—Nondisclosure or Confidentiality Agreement with handwritten notes; and Exhibit 45—Document titled Netscape or MMail 132002.

Deposition of Gregory W. Carr, Jun. 1, 2005, with deposition exhibits: Exhibit 46—Subpoena; Exhibit 47—Email to O'Neil from Carr, Sep. 21, 1998, MyMail 646329; Exhibit 49—Newspaper article, MyMail 9743; Exhibit 50—WebTV Company Background, MyMail 1703; Exhibit 51—Letter to Carr from Selgas, Jul. 22, 1997, Mymial 644205; Exhibit 52—Email to O'Neil from Carr, Sep. 21, 1998, MyMail 645943; Exhibit 53—Letter to Selgas from Carr, Oct. 7, 1998, MyMail 644205; Exhibit 54—NetSafe Confidential Busines Plan, MyMail 2576; Exhibit 55—Fax to Selgas from Carr, Jul. 24, 1998, MyMail 644579; Exhibit 56—Carr & Storm Invoice 1026, MyMail 644181; Exhibit 57—Email to Erickson from Carr, Mar. 24, 1999, MyMail 645935; Exhibit 58—Handwritten stickie note, MyMail 645223; Exhibit 59—Carr's Handwritten notes, MyMail 645050; Exhibit 60—Carr & Storm Invoices 154, 436, 437, 438, 475, 439, 788, 834, 2062; Exhibit 61—Email to Wall from Carr, Sep. 25, 1998, MyMail 645940; Exhibit 62—Email to Gibson from Carr, May 4, 1999, MyMail 646386; and Exhibit 63—Email to Maynard from Carr, Sep. 11, 1998, MyMail 646821.

Deposition of Gregory W. Carr, Aug. 31, 2005, with deposition exhibit: Exhibit 1—Amended Deposition Notice.

Deposition of Greg Collins, Oct. 13, 2004.

Deposition of Greg Collins, Jun. 27, 2005, with deposition exhibits: Exhibit 1—Notice of Deposition, Sep. 20, 2004.

Deposition of Channing Corn, Jun. 3, 2005, with deposition exhibits: Exhibit 1—Subpoena; Exhibit 2—Confidentiality and Nondisclosure Agreement; Exhibit 3—Page of Code; Exhibit 4—Service Ticket; Exhibit 5—Customer and User List; Exhibit 6—Internal Use Definitions; Exhibit 7—PowerPoint Presentation; Exhibit 8—Gmuender Task List; Exhibit 9—Software Module—Test Application; Exhibit 10—Massing Associative Array Source Code; Exhibit 11—Massing Dialer Test Application; Exhibit 12—Corn 38-40; Exhibit 13—Database Dump; Exhibit 14—Gmuender GTE Account Source Code; Exhibit 15—Netrepreneur Registration Form; Exhibit 16—'290 Patent; Exhibit 17—Witness Handwritten Note; Exhibit 18—Gmuender Task List; Exhibit 19—Witness Toolbar Application Code, Feb. 28, 1996; Exhibit 20—Witness Toolbar Application Code, Mar. 2, 1996; Exhibit 21—Witness Toolbar Application Code, Mar. 4, 1996; Exhibit 22—Witness Toolbar Application Code, Mar. 5, 1996; Exhibit 23—Witness Toolbar Application Code, Mar. 6, 1996; Exhibit 24—Text File of WSFTP Program; Exhibit 25—Witness FTP Code File; Exhibit 26—Delphi 2.0 Web Apps Printout; Exhibit 27—Mar. 1999 E-mail string; Exhibit 28—"Message of the Day" software; and Exhibit 29—Packet of Customer Service Tickets.

30(b)(6) Deposition of Sky Dayton (Earthlink), Aug. 24, 2005, with deposition exhibit: Exhibit 1—Notice of Deposition, Aug. 5, 2005.

Deposition of Robert T. Derby, Sep. 15, 2005, with deposition exhibits: Exhibit 1—Subpoena; Exhibit 2—Promissory Note not signed by Selgas; Exhibit 3—MyMail, Ltd.'s Objections and Responses to Southwestern Bell Internet Services, Inc.'s Interrogatories (Nos. 1-4); Exhibit 4—Verification; Exhibit 5—Plaintiff MyMail Ltd.'s Objections and Responses to Defendants' First Set of Common Interrogatories (Nos. 1-12); and Exhibit 6—Plaintiff MyMail Ltd.'s Amended Objections and Responses to Defendants' First Set of Common Interrogatories (Nos. 1-12).

Deposition of Robert T. Derby, Jun. 16, 2005, with deposition exhibits: Exhibit 1—Limited Partnership Agreement of MyMail, Ltd.; Exhibit 2—Jul. 15, 1996 letter regarding employment confirmation; Exhibit 3—Handwritten document, not identified by witness; Exhibit 4—Compilation of documents beginning with Judgment, re: *Derby v. NetSafe*; Exhibit 5—Oct. 22, 1996 memo from Derby to Tex Wooters; Exhibit 6—Jun. 22, 1997 e-mail string between Derby and Selgas; Exhibit 7—Original Petition, re: *Derby v. NetSafe*; Exhibit 8—NetSafe, Inc. Presentation, MyMail 3313-3343; Exhibit 9—Dec. 3, 1996 e-mail from Tex Wooters to John Gmuender, Joe Gallagher, Tom Selgas, Subject: Spouse involvement; Exhibit 10—Handwritten documents, not identified by witness; Exhibit 11—Spreadsheet of the ownership as of Dec. 31, 2004 for MyMail, Ltd.; Exhibit 12—MyMail, Ltd. Loan Request, Jul. 16, 2004; Exhibit 13—Aug. 22, 1997 e-mail from Bob Derby to Tom Selgas; and Exhibit 14—Aug. 23, 1997 e-mail from Bob Derby to Tom Selgas.

Deposition of Bradley Ellis, Jun. 1, 2005, with deposition exhibits: Exhibit 1—Non-disclosure of Confidentiality Agreements, MyMail 16115; Exhibit 2—Non-disclosure of Confidentiality Agreements with handwritten notes, MyMail 643335; Exhibit 3—USPTO Patent Full-Text and Image Database, MyMail 645147; Exhibit 4—USTPO Patent search with Refined Search for AN/WebTV; Exhibit 5—USPTO Patent search with Refined Search for AN/WebTV and IN/"mighdoll"; Exhibit 6—USPTO Patent search, search 1999-2003; and Exhibit 7—Mighdoll patents.

Deposition of Carl Erickson, Jul. 27, 2005, with deposition exhibits: Exhibit 1—Subpoena to Tony Erickson; Exhibit 2—Memo to Tom Selgas from G. Carr, Jul. 24, 1998; Exhibit 3—Confidential Business Plan, 1999-2001; Exhibit 4—NetSafe, Inc. Business Plan Synopsis; Exhibit 5—E-mail to various persons from Tony Erickson, Mar. 24, 1999; Exhibit 6—Letter to Tony Erickson from Sparrow Marcioni, Apr. 3, 1999; Exhibit 7—Memo to NetSafe, Inc. Employees from Tony Erickson, Mar. 4, 1999; Exhibit 8—Series of E-mails; Exhibit 9—E-mail to toms@netsafe.net from William Wall, Apr. 6, 1999; Exhibit 10—NetSafe Expense Summary; Exhibit 11—E-mail to Tony Erickson from toms@netsafe.net, Mar. 5, 1999; and Exhibit 12—Memo to Tony Erickson from Lewis Parson, Mar. 8, 1999.

Deposition of Tim Gelinas, Aug. 9, 2005, with deposition exhibits: Exhibit 1—Installation and Configuration Guide dated Jan. 1995, AOL 115420-11537; Exhibit 2—Getting Started dated Aug. 1994; 118 pages, AOL 115540-115686; Exhibit 3—Remote Account Maintenance Protocol DOF (RAMP); undated, AOL 117753-11754; Exhibit 4—"Windows to the Internet" BYTE.com dated Jul. 1995, AOL 117741-117747; Exhibit 5—ACW Connections by Fred Kemp undated; 5 pages, AOL 117748-117752; Exhibit 6—"Travel the Information Highway on Your PC", BYTE.com dated Apr. 1994, AOL 117828-117829; Exhibit 7—oreilly.com Online Catalog undated AOL 117830-117832; Exhibit 8—SprintLink Customer Handbook 2.1 dates Oct. 11, 1995 AOL 117757-117795; Exhibit 9—LANtastic 7.0: Netscape Navigator 2.01 and SPRYNET Module NOS7006 dated May 28, 1996, AOL 117796-117827 Exhibit 10—Claim Construction Document dated Jun. 3, 2005; Exhibit 11—U.S. Patent No. 6,571,290 B2 dated May 27, 2003; and Exhibit 12—Mosaic in a Box Product Information; undated, AOL116437-116545.

(56) References Cited

OTHER PUBLICATIONS

Deposition of Richard C. Gibson, Jul. 26, 2005, with deposition exhibits: Exhibit 1—Notice of Deposition of Richard Gibson; Exhibit 2—Letter to R. Douglas from Richard Gibson, Jul. 29, 1999; Exhibit 3—E-mail from Tony Erickson, re: Tom Selgas rights to prior art held at Cyrix; Exhibit 4—Minutes of special meeting of the shareholders of NetSafe, Inc., Mar. 27, 1999; Exhibit 5—Letter to Tony Erickson from Sparrow Marcioni, Apr. 2, 1999; Exhibit 6—Memorandum to Tom Selgas from Gregory Carr, Jul. 24, 1998; Exhibit 7—Notice of NetSafe, Inc. shareholders meeting; Exhibit 8—Memo to NetSafe, Inc. employees; Exhibit 9—E-mail from Gibsondick@aol.com, Jun. 29, 1999; Exhibit 10—NetSafe expense summary, Mar. 21, 1999; Exhibit 11—Judgment, *Derby* v. *NetSafe*; and Exhibit 12—Confidential Business Plan, 1999-2001.
Deposition of John Everett Gmuender, Nov. 7, 2004, with deposition exhibits: Exhibit 1—Subpoena; Exhibit 2—NetSafe, Inc. Press Background Information; Exhibit 3—E-mail string, May 3, 2004; Exhibit 4—NetSafe, Inc. Presentation; Exhibit 5—U.S. Patent No. 6,571,290; Exhibit 6—File History of U.S. Patent No. 6,571,290; Exhibit 7—Notes on NetSafe Navigation Center and attached e-mails; Exhibit 8—NetSafe Agreement, Aug. 4, 1997; Exhibit 9—Memorandum of Understanding, Aug. 29, 1997; Exhibit 10—Fax memo to Tex Wooters, Oct. 22, 1996; Exhibit 11—E-mail, Dec. 3, 1996, with attachments; Exhibit 12—Listing of accounts; Exhibit 13—GTE Invoices, 1996; Exhibit 14—Listings of usage; Exhibit 15—Assignment of Invention; Exhibit 16—Netrepreneur Training Course printout, Mar. 21, 1996; Exhibit 17—Netrepreneurial Network, Netrepreneur Training Course; and Exhibit 18—NetSafe NEAT Version 3.0 Beta Review.
Deposition of Richard D. Grauer, Aug. 15, 2005.
Deposition of James P. Keffer, Sep. 8, 2005, with deposition exhibits: Exhibit 1—Amended Notice of Deposition to Plaintiff MyMail, Ltd. of Defendants NetZero, Inc., Juno Online Services, Inc., and NetBrands, Inc.; and Exhibit 2—Handwritten notes.
Deposition of Bruce Lutz, Jun. 2, 2005, with deposition exhibits: Exhibit 1—Notice of Service of Subpoena Duces Tecum and Testification by Defendant GTE.net LLC; and Exhibit 2—Carr & Storm Invoice Nos. 154, 436m 437, 438, 439, 788, 834 and 2062.
Deposition of Michael B. Massing, Nov. 9, 2004, with deposition exhibits: Exhibit 19—Subpoena; Exhibit 20—Document info; and Exhibit 21—E-mail string, Mar. 14, 1996.
Deposition of Robert D. McCutcheon, Jun. 2, 2005, with deposition exhibits: Exhibit 1—Notice of Service of Subpoena Duces Tecum and Testificandum by Defendant GTE.net LLC; and Exhibit 2—Provisional patent application filing, MyMail 8911.
Deposition of Lucien Ostenkowski, Sep. 15, 2004, with deposition exhibits: Exhibit 1—Notice of Deposition; Exhibit 2—U.S. Patent No. 6,571,290; Exhibit 3—MyMail's Preliminary Infringement Contentions; Exhibit 4—Slide Presentation to AOL; Exhibit 5—Serial Monitor Screenshots; and Exhibit 6—Drawing.
Deposition of Lucien Ostenkowski, Sep. 16, 2004.
Deposition of Lucien Ostenkowski, Aug. 3, 2005, with deposition exhibit: Exhibit 1—Presentation to SBC Yahoo!.
Deposition of Mohammad Sanadidi, Oct. 5, 2005, with deposition exhibits: Exhibit 1—U.S. Patent No. 6,571,290; Exhibit 2—Court's Claim Construction; Exhibit 3—Expert Report, Jun. 22, 2005; Exhibit 4—Rebuttal Expert Report, Jul. 29, 2005; Exhibit 5—Screen shots produced by MyMail; Exhibit 6—Attachment to Expert Report re Juno 1.0 Use Cases; and Exhibit 7—Claim chart pertaining to Juno 1.0.
30(b)(6) Deposition of Alex Sarafian (United Online Companies), Jul. 12, 2005, with deposition exhibit: Exhibit 1—Plaintiffs Amended Notice of Deposition, Jun. 10, 2005.
Deposition of Michelle Selgas, Jun. 23, 2005, with deposition exhibits: Exhibit 1—MyMail, Ltd. Capital Ownership, May 3, 2005, MyMail 647043-647054; and Exhibit 2—U.S. Patent No. 6,571,290.
Deposition of Thomas Selgas, Sep. 16, 2004, with deposition exhibits: Exhibit 7—Notice of Deposition; Exhibit 8—Slide Presentation to Earthlink; Exhibit 9—MyMail's Preliminary Infringement Contentions; and Exhibit 10—Drawing.

Deposition of Thomas Selgas, Oct. 27, 2004, with deposition exhibits: Exhibit 11—Def. AT7T Corp.'s Amended First Notice of Deposition of Plaintiff MyMail, Ltd.; Exhibit 12—'290 Patent Presentation to AT&T; Exhibit 13—Handwritten Diagram by Mr. Selgas; Exhibit 14—'290 Patent Presentation to AT&T; Exhibit 15—Sam Spade related document; Exhibit 16—Screen shot regarding MyMail testing; Exhibit 17—Sam Spade related document; Exhibit 18—Ethereal document; Exhibit 19—Ethereal document; Exhibit 20—Document pertaining to //cookies.js; and Exhibit 21—Document regarding MyMail testing.
Deposition of Thomas Selgas, Nov. 3, 2004, with deposition exhibits: Exhibit 3A—Preliminary Infringement Claim Chart for the '290 patent; Exhibit 22—America Online's first amended notice of deposition to MyMail; Exhibit 23—Hand-drawn sketch; Exhibit 24—MyMail 518463-518472; Exhibit 25—MyMail 517937-517941; Exhibit 26—MyMail 443353-443390; Exhibit 27—MyMail 440043-440365; and Exhibit 28—MyMail 439800-439816.
Deposition of Thomas Selgas, Dec. 8, 2004, with deposition exhibits: Exhibit 46—Copy of Notebook; MyMail 642124-64218; and Exhibit 47—Copy of Notebook; MyMail 642181-642227.
Deposition of Thomas Selgas, Dec. 9, 2004, with deposition exhibits: Exhibit 48—MyMail 2559-2560; Exhibit 49—MyMail 643828-643835; Exhibit 50—MyMail 1555-1560; Exhibit 51—MyMail 642375-642416; Exhibit 52—MyMail 16115-16133; Exhibit 53—MyMail 517674-517700; Exhibit 54—MyMail 643759-643764; Exhibit 55—MyMail 328-329; Exhibit 56—MyMail 642008; Exhibit 57—MyMail 642027; and Exhibit 58—MyMail 642971.
Deposition of Thomas Selgas, Dec. 10, 2004, with deposition exhibits: Exhibit 59—E-mail string, MyMail 985-986; Exhibit 60—Business plan, MyMail 2576-2694; Exhibit 61—MyMail 2815-2970; and Exhibit 62—MyMail 631808-631812.
Deposition of Thomas Selgas, Jan. 25, 2005, with deposition exhibits: Exhibit 1—Defendant GTE.Net LLC's First Notice of Deposition to Plaintiff MyMail, Ltd.; Exhibit 2—MyMail's Preliminary Infringement Contentions for GTE.Net LLC; Exhibit 3—Preliminary Infringement Claim Chart for U.S. Patent No. 6,571,290 B2, GTE.Net LLC; Exhibit 4—Dec. 15, 2004 MyMail presentation to GTE.Net; and Exhibit 5—U.S. Patent No. 6,571,290.
Deposition of Thomas Selgas, Mar. 1, 2005, with deposition exhibits: Exhibit 6—Defendant GTE.Net LLC's Notice of Deposition to Plaintiff MyMail, Ltd. Regarding Source Code; Exhibit 7—MyMail 334344 CD directories and files list; Exhibit 8—MyMail 334343 CD directories and files list; Exhibit 9—ASCII representation of NetSafe database; Exhibit 10—ASCII representation of database and index files; Exhibit 11—Version 3.0 database index files; Exhibit 12—2.0 Beta Release Candidate 10; Exhibit 13—ASCII representation of NSDB and NSDBX; Exhibit 14—Wise installation script in ASCII form; Exhibit 15—Wise installation script in ASCII form; Exhibit 16—Version 3.0 Beta Review; NetSafe 3.0 (RC20) Beta Test; Exhibit 17—Web page prototype; Exhibit 18—Proposed help file and walk-through for alpha testers; Exhibit 19—Netrepreneur Training Course; Exhibit 20—Wise manifest, script summary; Exhibit 21—Wise manifest document; Exhibit 22—Wise manifest document, NEAT Phone Update; Exhibit 23—Registration Wizard version 1.5 source code; Exhibit 24—Combination of Wise manifest with complete Wise dump; Exhibit 25—Wise Installation System Script; Exhibit 26—Wise Installation System Script version 4.23; Exhibit 27—Wise Installation System Script for NetSafe registration and configuration; Exhibit 28—Snippet of code belonging to the Navigation Center; Exhibit 29—Wise script for stamping tool; Exhibit 30—Program Hwiz code; Exhibit 31—Program credstf document; Exhibit—Pascal unit PCODUtil; Exhibit 33—Pascal unit PingUtl; Exhibit 34—Pascal unit RegUtil; Exhibit 35—Pascal unit Srvtype; Exhibit 36—Pascal code NetSafe Dialer; Exhibit 37—Pascal code unit Dialer16; Exhibit 38—Pascal code unit Dialer32; Exhibit 39—Pascal code unit Dutil; Exhibit 40—PERL code ISP Processing Module; Exhibit 41—PERL code Transaction Processing Module; * Exhibit 42—PERL code Open Test DB; Exhibit 43—Print-out not identified; and Exhibit 44—Print-out not identified.

(56) References Cited

OTHER PUBLICATIONS

Deposition of Thomas Selgas, May 5, 2005, with deposition exhibits: Exhibit 200—Selgas Amended Deposition Notice; Exhibit 201—MyMail Objections to UOL Amended Deposition Notice; Exhibit 202—Presentation to Juno; Exhibit 203—Presentation to Juno; Exhibit 204—Presentation to NetZero; Exhibit 205—Presentation to BlueLight; Exhibit 206—MyMail 517725-517750; Exhibit 207—MyMail 449038-449055; Exhibit 208—MyMail 470273-470543; Exhibit 209—MyMail 451426-451480; Exhibit 210—MyMail 503456-503708; Exhibit 211—MyMail 470544-470574; Exhibit 212—MyMail 485810-486670; Exhibit 213—MyMail 491789; Exhibit 214—Exhibit 5 U.S. Patent No. 6,571,290; Exhibit 215—Preliminary Infringement Claim Chart for U.S. Patent No. 6,571,290 B2 NetZero, Inc.; Exhibit 216—Preliminary Infringement Claim Chart for U.S. Patent No. 6,571,290 B2 Juno Online Services, Inc.; Exhibit 217—Preliminary Infringement Claim Chart for U.S. Patent No. 6,571,290 B2 NetZero, Inc. NetBrands, Inc.; and Exhibit 218—MyMail's Preliminary Infringement Contentions.
Deposition of Thomas Selgas, May 13, 2005.
Deposition of Thomas Selgas, Jun. 2, 2005, with deposition exhibits: Exhibit 64—Notice of Service of Subpoena; Exhibit 65—E-mail to Derby from Selgas, Jun. 22, 1997, MyMail 643877; Exhibit 66—E-mail to Selgas from Derby, Aug. 22, 1997, MyMail 643847; Exhibit 67—Email to Selgas from Derby, Aug. 23, 1997, MyMail 643848; and Exhibit 68—Email to O'Neil from Carr, Sep. 21, 1998, MyMail 646329.
Deposition of Thomas Selgas, Sep. 16, 2005, with deposition exhibits: Exhibit 1—Subpoena; Exhibit 2—NetSafe, Inc. Net Cash Projection; Exhibit 3—E-mail from Wooters to Gmuender, Gallagher and Selgas; Exhibit 4—Unsigned promissory note; Exhibit 5—Promissory note signed by Selgas; Exhibit 6—Memo to NetSafe, Inc. Employees from Erickson, Mar. 4,1999; Exhibit 7—Timeline; Exhibit 8—Memorandum Opinion; and Exhibit 9—Selgas presentation to Earthlink.
Deposition of Jeffrey O. Smith, Aug. 18, 2005.
Deposition of Jeffrey O. Smith, Mar. 30, 2005, with deposition exhibits: Exhibit 1—Subpoena for Appearance at Deposition; Exhibit 2—Declaration of Jeff Smith; Exhibit 3—U.S. Patent No. 6,571,290; and Exhibit 4—VIN Drawing by Mr. Smith.
Deposition of Jeffrey O. Smith, Aug. 22, 2005, with deposition exhibits: Exhibit 11—U.S. Patent No. 6,571,290; Exhibit 230—Subpoena; Exhibit 237—Court's Claim Construction Opinion; and Exhibit 239—SPI Record Display.
Deposition of Andrew Viger, Aug. 15, 2005, with deposition exhibit: Exhibit 1—Aug. 10, 2005 Declaration of Andrew Viger.
Deposition of Homan Wooters, Jul. 28, 2005, with deposition exhibits: Exhibit 1—Notice of Subpoena; Exhibit 2—Statement of Holman Wooters; Exhibit 3—E-mail re: Spouse involvement; Exhibit 4—Public announcement; Exhibit 5—Nondisclosure Agreement for Jim Leo; Exhibit 6—Nondisclosure Agreement for David Johnson; and Exhibit 8—Promissory Note.
*Non-confidential excerpt* of confidential 30(b)(6) deposition of Abhijit Khale (NetBrands, NetZero, Juno),, with deposition exhibit 1 (Jul. 11, 2005).
Non-confidential excerpt of confidential deposition of Justin Newton, Nov. 10, 2004, with deposition exhibit 2 and 3.
*Non-confidential excerpt* of confidential deposition of Cyrus Pejoumand, May 26, 2005, with deposition exhibit 5.
*Non-confidential excerpt* of confidential deposition of Michael Sharp, Aug. 11, 2005, with deposition exhibit 1.
ETSI ETS 300 535 GSM 03.22 V4.8.1 (Released on Feb. 1995).
ETSI ETS 300 599 GSM 09.02 V4.11.1 (Released on Nov. 1995).
ETSI ETS 300 557 GSM 04.08 V4.10.1 (Released on Feb. 1995).
ETSI ETS 300 596 GSM 08.58 V4.70 (Released on Jul. 1995).
Netscape Communications Corporation, AT&T Uses Netscape and the Web to Build a New Infrastructure for Information Access and Communication, 1997.
Legere, John, New Technologies, New Environment: A Blueprint for Continued Success in Asia Pacific, Nov. 22, 1996, AT&T.

AT&T, AT&T House of Style Planning, Programming Guidelines, product literature, 1997.
CNET News.com, "Microsoft Developers' conference in works" website article dated Oct. 18, 1996, located at http://news.com.com/2102-1001_3-2395335.html?tag=st.util.print (MyMail 645318).
Edwards, Mark Joseph, "The Normandy Invasion," Feb. 1997, WindowsIT Pro (MyMail 645319-645327).
Fisher, Shana M., "Making Your Site Dynamic With the Microsoft Commercial Internet System, Normandy Hits the Streets," Feb. 1997, Microsoft Interactive Developer (MyMail 645335-645344).
Flores, Michele Matassa, "Compuserve Agrees to Use 'Normandy' Technology," Jun. 4, 1996, The Seattle Times.
Flores, Michele Matassa, "Compuserve, Microsoft Are in Talks," Mar. 13, 1996, The Seattle Times.
Lewis, Peter H., "Microsoft Joins Compuserve in Internet Deal," The New York Times, Jun. 5, 1996 (2 pgs).
Microsoft PressPass, "Microsoft Announces Delivery of 'Normandy' Beta II CD to Preview Customers," Sep. 30, 1996 (MyMail 645331-645332).
Microsoft PressPass, "Microsoft Announces Digital Is First 'Normandy' Systems Integrator" Sep. 11, 1996 (MyMail 645329-MyMail 645330).
(Defendant(s)/P.O. Preclude Submission: Microsoft Normandy Beta-2 Preview, Presentations and Handouts, dated Sep. 30, 1996, MyMail 007272-MyMail 007349).
PR Newswire, "Microsoft Announces Digital is First 'Normandy' Systems Integrator," Sep. 11, 1996.
Richter, Jeffrey, "Extend the Windows 95 Shell with Application Desktop Toolbars" Mar. 1996, Microsoft Systems Journal (9 pgs), website article at http://www.microsoft.com/msj/archive/S274.aspx.
Prodigy, CD ROM re: Software Installation Disk, version 1.1, SBCIMM 000785.
GTE, Internet Access Kit, version Windows 95, GTE 004532-004563.
GTE, Internet Solutions Dial-Up Access Directory, GTE 004634-004644.
Netsafe, Inc., Neat! Download Instructions for 2.1 Full Release, MYMAIL 058724-058728.
Netsafe, Inc., Neat! Installation Help File print-out, MASS 000285-000288.
Netcom On-Line Communications Services, product literature, ELNKMM 013114-013117.
Netsafe, Inc., Press Background Information, MYMAIL 003288-003301.
Netsafe, Inc., Neat! Product literature, MYMAIL 001371-001417.
Netsafe, Inc., Neat! product literature, MYMAIL 009231-009258.
Netsafe, Inc., Neat! product literature, MYMAIL 009260-009268.
Netsafe, Inc., Neat! product literature, MYMAIL 009270-009289.
Netsafe, Inc., Neat! product literature, MYMAIL 009301-009308.
Netsafe, Inc., Neat! product literature, MYMAIL 005131-005143.
Netsafe, Inc., product literature, MYMAIL 003313-003342.
Random Access, Inc., product literature, ELNKMM 013149-013152.
SBC Yahoo! set-up materials, SBCMM 051021-051051 and SBCMM 051684-051714.
MYMAIL, Ltd., Neat! product literature, MYMAIL 003421-003433.
AT&T Worldnet Service, QuickStart Guide, Version 1.0, ATT 000005-000037.
Earthlink Network, Inc., Total Access Internet installation materials, ELNKMM 014325-014342.
Bell Atlantic, installation materials, GTE 04564-04577.
GTE, Internet Solutions Dial-Up Access Directory, GTE 04634-04644.
Netsafe, Inc., Presentation Materials, MYMAIL 003313-003343.
Prodigy, The Prodigy Internet System installation disks, SBCIMM 000781-000786.
ELNKMM 013042-013152, Mindspring materials.
Earthlink Network, program file Earthlink 2.565/2.5261, Classic Carbo, 010619, Mac World CD Reference, ELNKMM014351.
Earthlink Network, program file TA 2.1.761, 000612, ELNKMM014352.

(56) References Cited

OTHER PUBLICATIONS

Earthlink Network, program file 2.5.1/2.5.3, Original Media, Dev. Ref. Build, Earthlink Genesis Project, Star Tile K.Net, 012407, 260 megs, ELNKMM014355).
Betty, Gary, Organizational Chart, ELNKMM 014394-014395.
Juno, Illustration of claims 1, 11, 12, 13 with respect to use case 1 (registration and regular use).
Juno, Illustration of claims 1, 11, 12, 13 with respect to use case 2 (mail server rebinding).
Juno, Illustration of claims 3, 4, 5, 6, 8 with respect to use case 3 (phone No. update).
Juno, Illustrations summarizing Juno 1.0 Use Cases.
Print-out re: dialwiz.cpp, SAN0293-0315.
Print-out re: freemail.cpp, SAN0237-0253.
Print-out re: options.cpp, SAN0268-0274.
Print-out re: pop.nv, SAN0225-0233.
Print-out re: sample_bindings, SAN0326.
Print-out re: scripts, SAN0234-0236.
Print-out re: servuser.cpp, SAN0316-0318.
Print-out re: spooler.cpp, SAN0275-0292.
Print-out re: tcom.cpp, SAN0254-0267.
Print-out re: udb_create_fsm.cpp, SAN0319-0325.
Compuserve, Network Access Numbers, CompuServe Network Services, AOL 086221-086256.
Court Opinion, Feb. 20, 2007.
Prodigy, installation disk, CD ROM, SBCIMM 000786.
Access Net Direct, CD ROM, 1.0 Installation Disks (early kit later named Prodigy Internet), SBCIMM 000782.
Prodigy, CD ROM re: executable files, SBCIMM 000783.
Internet Atlanta, Inc., product literature, ELNKMM 013118-013122.
Network Solutions, Inc., Service Agreement, MYMAIL 001584-001586.
Netsafe, Inc., Owning a Toll Booth on the Information Superhighway!, MYMAIL 003398-003414.
Netsafe, Inc., Neat! product literature/NetSafe company literature, MYMAIL 009231-009258.
Netsafe, Inc., NetSafe company literature, MYMAIL 009260-009268.
Netsafe, Inc., Neat! product literature/NetSafe company literature, MYMAIL 009270-009289.
Netsafe, Inc., Neat! product literature/NetSafe company literature, MYMAIL 009301-009308.
GTE, Internet Installation Guide and materials, GTE 04512-04531.
GTE, Internet Solutions Installation Guide—The Insiders Guide to the Outside World, GTE 04532-04563.
Earthlink Network, Screen shots, Total Access 1.0, ELNKMM 015597-015634.
SBC Yahoo!, Software Installation Guide, SBC 051021-051051.
SBC Yahoo! Software Installation Guide, SBCMM 051684-051714.
Draft version of Defendants' Standing Presentation.
*MyMail, Ltd.* v. *Conduit Ltd. et al* filed Nov. 14, 2013; Civil Action No. 2:13-cv-00961; USDC, Eastern District of Texas (Marshall); First Amended Complaint and Jury Demand (with Exhibits) (filed Dec. 18, 2013).
*MyMail, Ltd.* v. *Conduit Ltd. et al* filed Nov. 14, 2013; Civil Action No. 2:13-cv-00961; USDC, Eastern District of Texas (Marshall); Docket Report as of Sep. 6, 2014.
copending U.S. Appl. No. 14/254,487, filed Apr. 16, 2014; first-named inventor: T. Selgas.
copending U.S. Appl. No. 14/466,221, filed Aug. 22, 2014; first-named inventor: T. Selgas.
U.S. Appl. No. 13/871,409; Response to Office Action Jan. 2, 2014.
U.S. Appl. No. 13/871,409; Amendment filed Mar. 21, 2014.
U.S. Appl. No. 13/871,409; Final Office Action mailed Mar. 26, 2014.
U.S. Appl. No. 13/871,409; Applicant-Initiated Interview Summary; Jun. 5, 2014.
U.S. Appl. No. 13/871,409; Response to Office Action and RCE; Jun. 26, 2014.
U.S. Appl. No. 13/871,432; Amendment and Response to Office Action; Jan. 2, 2014.
U.S. Appl. No. 13/871,432; Amendment; Mar. 21, 2014.
U.S. Appl. No. 13/871,432; Final Office Action; Mar. 25, 2014.
U.S. Appl. No. 13/871,432; Applicant-Initiated Interview Summary; May 28, 2014.
U.S. Appl. No. 13/871,432; Response to Office Action and RCE; Jun. 25, 2014.
U.S. Appl. No. 13/871,432; Office Action; Aug. 15, 2014.
U.S. Appl. No. 13/079,015; Final Office Action Jan. 31, 2014.
U.S. Appl. No. 13/079,015; Amendment; Mar. 21, 2014.
U.S. Appl. No. 13/079,015; Advisory Action; Apr. 25, 2014.
U.S. Appl. No. 13/079,015; RCE and Response to Office Action; Apr. 30, 2014.
U.S. Appl. No. 13/079,015; Amendment; May 15, 2014.
U.S. Appl. No. 10/417,821; Notice of Allowance; Mar. 14, 2014.
Olsen, J.W., Big Three On-Line Services Reach Out to the Internet, PC Magazine, Jun. 27, 1995 ClientConnect Ex 1007-1 through 1007-18.
December, John et al, The World Wide Web Unleashed (2nd ed. 1995) ClientConnect Ex 1008-1 through 1008-12.
*ClientConnect, Ltd.* v. *MyMail, Ltd.*; Petition for Inter Partes Review of U.S. Patent No. 8,275,863 filed Nov. 14, 2014 before the Patent Trial and Appeal Board.
*ClientConnect, Ltd.* v. *MyMail, Ltd.*; Declaration of Benjamin B. Bederson, Ph.D., Nov. 14, 2014, ClientConnect Ex 1009-1 through 1009-100.
*ClientConnect, Ltd.* v. *MyMail, Ltd.*; List of Materials Considered by Benjamin B. Bederson, Ph.D., Nov. 14, 2014, ClientConnect Ex 1010-1 through 1010-4.
*ClientConnect, Ltd.* v. *MyMail, Ltd.*; Curriculum Vitae of Benjamin B. Bederson, Ph.D., Nov. 8, 2014, ClientConnect Ex 1011-1 through 1011-40.
Oxford Dictionary of Computing, Fourth Edition, Oxford University Press, 1996, p. 28, ClientConnect Ex 1013-1 through 1013-3.
American Heritage College Dictionary, 3rd Ed., Houghton Mifflin Company, 1993, p. 93, ClientConnect Ex 1014-1 through 1014-3.
Wikipedia: "Web Browser" Apr. 3, 2009; http://en.wikipedia.org/w/index/php?title=Web_browser&oldid=281450574; ClientConnect Ex 1015-1 through 1015-4.
MacMillan Dictionary, "Web Browser" (printed Nov. 12, 2014) from http://www.macmillandictionary.com/dictionary/american/web-browser, ClientConnect Ex 1016-1.
Cambridge Dictionaries Online, "Web Browser", (printed Nov. 12, 2014) http://dictionary.cambridge.org/dictionary/british/web-browser, ClientConnect Ex 1017-1.
*MyMail, Ltd.* v. *Conduit Ltd. et al* Nov. 14, 2013; Civil Action No. 2:13-cv-00961; USDC, Eastern District of Texas (Marshall); Docket Report as of Jun. 20, 2014.
Compton, Charles L., Internet CNN NEWSROOM: The Design of a Digital Video News Magazine, Department of Electrical Engineering and Computer Science, May 1995.
Bense, Booker, Systems implementation of the Four Gopher Servers, Association for Computing Machinery, 1993, pp. 23-25.
Boyko, V., et al., Enhanced Imagemap 2.0: Web Design Advantages Conferred By Parameterization, New York University, Jul. 17, 1995, 10 pgs.
Allwright, J., et al., A Methodology for Structuring Web Documents, Jan. 24, 1996.
Debevc, M., et al., Design and Evaluation of an Adaptive Icon Toolbar, Kluwar Academic Publishers, 1996, pp. 1-21.
Reiterer, Harold, IDA-A Design Environment For Ergonomic User Interfaces, Chapman & Hall, 1995, pp. 305-310.
Hoeck, Wolfgang G., InfoTrac TFD: a Microcomputer Implementation of the Transcription Factor Database TFD with a Graphical User Interface, vol. 10, Oxford University Press, pp. 323-327.
Debevc, M., Adaptive Bar, ACM, New York, NY, 1993, pp. 117-118.
MacLean, A., et al., User-Tailorable Systems: Pressing the Issues with Buttons, ACM, 1990, pp. 175-182.

(56) References Cited

OTHER PUBLICATIONS

Arpinar, I., et al., MoodView: An Advanced Graphical User Interface for OODBMSs, Sigmond Record, vol. 22, No. 4, Dec. 1993, pp. 11-18.

Beaudouin-Lafon, M., User Interface Support for the Integration of Software Tools: an Iconic Model of Interaction, ACM, 1988, pp. 143-152.

Schilit, B., et al., Customizing Mobile Applications, Proceedings USENIX Symposium on Mobile & Location-independent Computing, Aug. 1993, pp. 1-9.

Taylor R., et al., Chiron-1: A Software Architecture for User Interface Development, Maintenance, and Run-Time Support, ACM Transactions on Computer-Human Interaction, vol. 2, No. 2, Jun. 1995, pp. 105-144.

Dingle, A., et al., Web Cashe Coherence, Fifth International World Wide Web Conference, May 1996, 10 pages.

Olson, M. et al., Berkeley DB, USENIX Association, Jun. 6, 1999, 10 pages.

Franks, Mike, The Internet Publishing Handbook: for Wolrd-Wide Web, Gopher, and WAIS, Oct. 1995, 9 pages.

Bowman, M., et al., Reasoning About Naming Systems, pp. 1-25, ACM, Nov. 1993.

Voelker, G., et al., Mobisaic: An Information System for a Mobile Wireless Computing Environment, Dec. 1994.

Benson, P.H., et al., Online Data Base Level Control, IBM Technical Disclosure Bulletin, vol. 18, No. 8, Jan. 1976, 2 pgs.

Microsoft Corp., Internet Explorer 2.1 for Windows 3.1 White Paper, Aug. 1996, 17 pages.

U.S. Appl. No. 13/573,311; Office Action; Sep. 10, 2014.

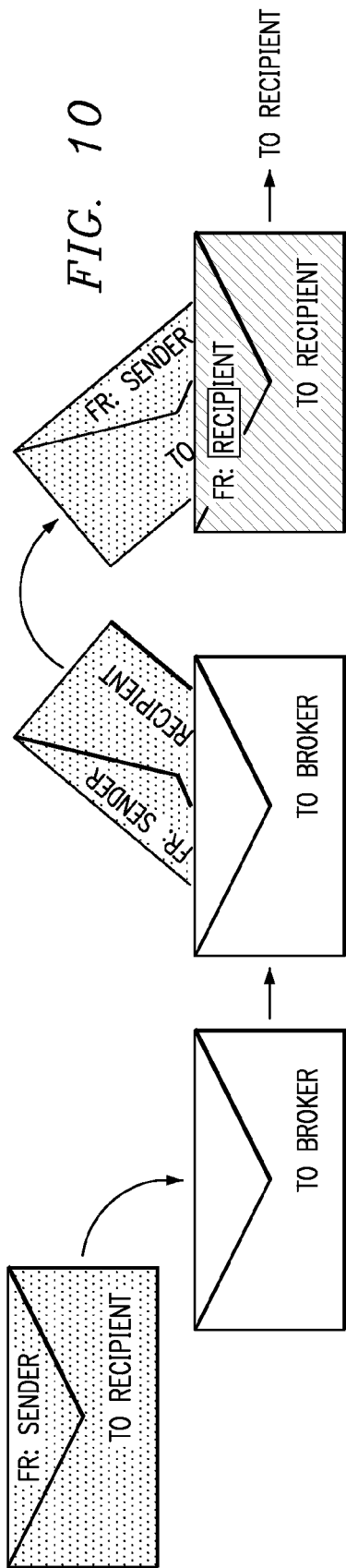
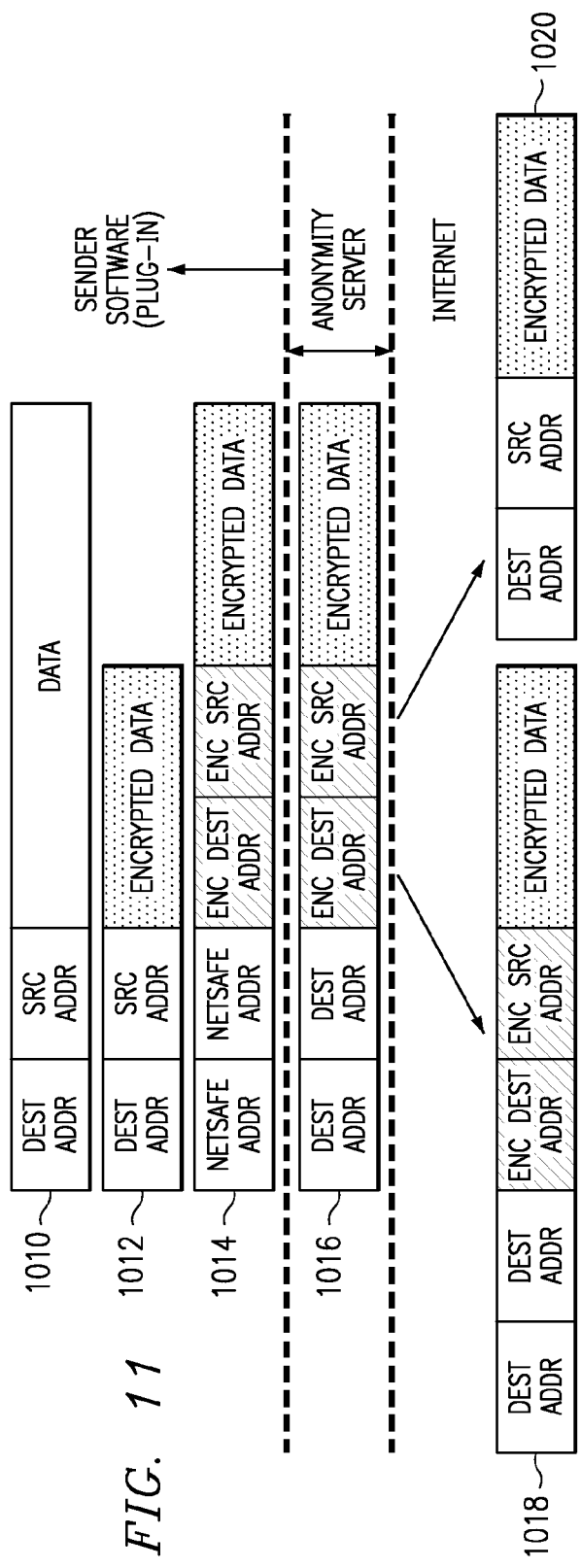
FIG. 10
FIG. 11

FIG. 17

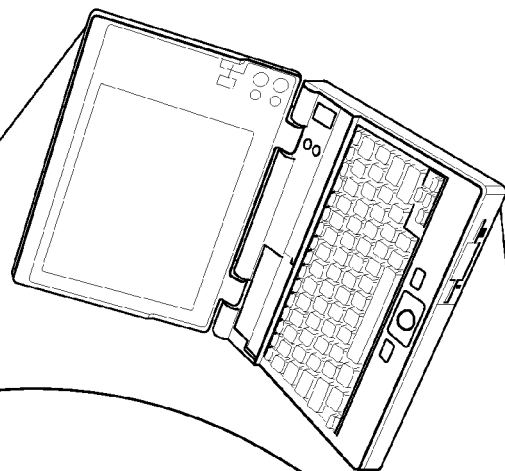

THE USERS SYSTEM IS CONFIGURED AND SETUP WITH A MINIMUM OF THREE RUDIMENTARY DATABASES

NS
(NETWORK SERVICES)

THE NS DATABASE INITIALLY CONTAINS NETWORK SPECIFIC INFORMATION NECESSARY TO INITIALIZE THE USERS SYSTEM TO RUN A NETWORK. IN THE WORKING SYSTEM THIS IS EITHER A TCP/IP NETWORK OR NetBEUI NETWORK.

PHONE
(CONNECTION NUMBERS)

THE PHONE OR CONNECTION DATABASE CONTAINS INFORMATION NECESSARY TO MAKE A CONNECTION TO AN UNDERLYING NETWORK ACCESS PROVIDER. IN THE WORKING SYSTEM THIS IS ACCOMPLISHED BY USING A MODEM OR A LAN ETHERNET CONNECTION

BTN
(BUTTON AND TOOLBAR)

THE BUTTON DATABASE CONTAINS BASIC TOOLBAR SETTINGS FOR THE ISP OR "PRIVATE BRANDED" SERVICES THAT MAY BE OFFERED FROM TIME TO TIME BY AN ISP. IT ALSO PROVIDES POINT AND CLICK CAPABILITIES TO COMMON NETWORK APPLICATIONS AND ASSOCIATED HELP FUNCTIONS.

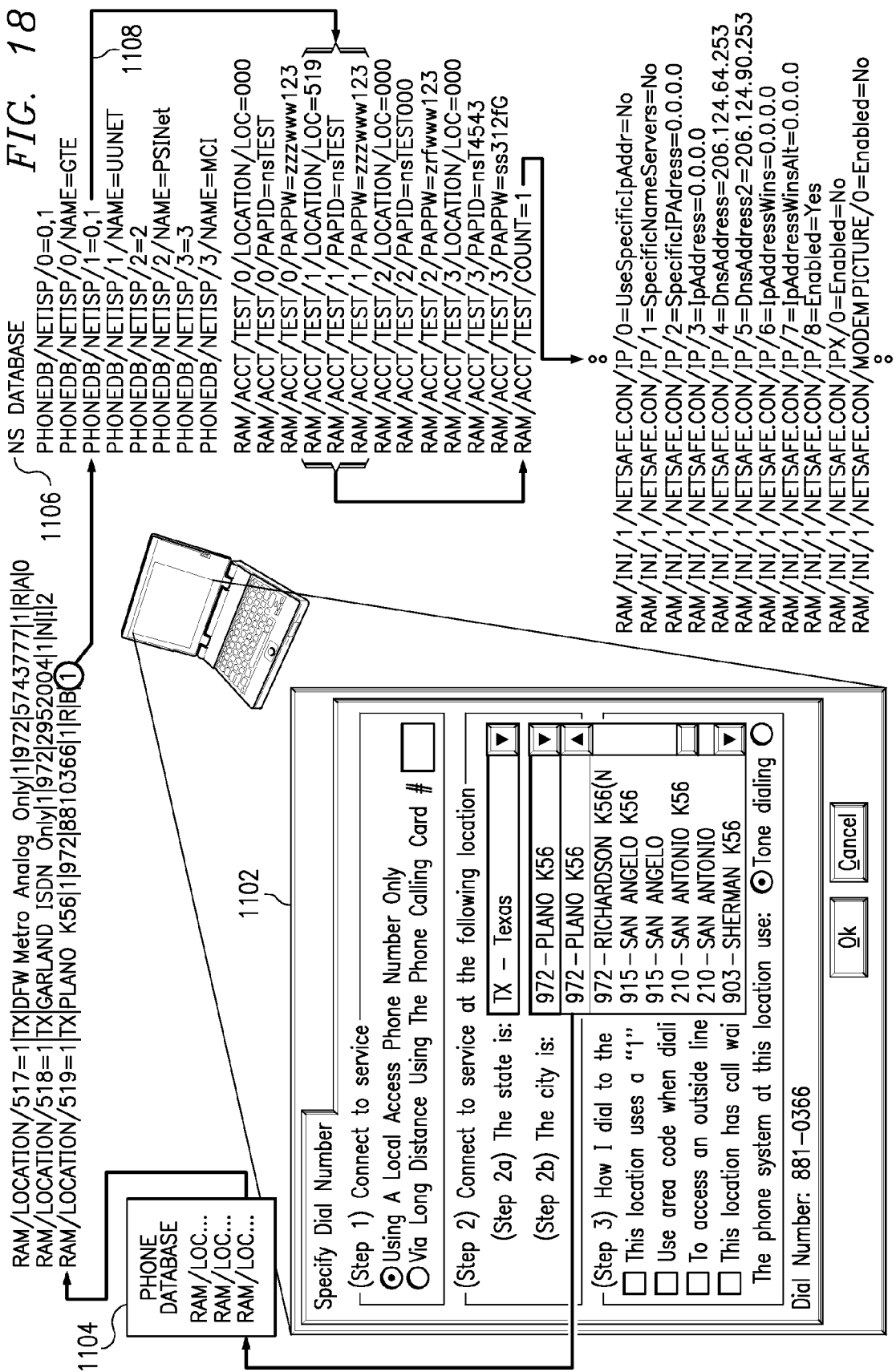

DYNAMICALLY MODIFYING A TOOLBAR

This application is a continuation of U.S. patent application Ser. No. 13/573,311, filed Sep. 10, 2012, and entitled "METHOD OF MODIFYING A TOOLBAR," which is a continuation of U.S. patent application Ser. No. 10/417,853, filed Apr. 16, 2003, and entitled "METHOD OF MODIFYING A TOOLBAR," (now U.S. Pat. No. 8,275,863), which is a divisional of U.S. patent application Ser. No. 09/100,619, filed Jun. 19, 1998, and entitled "METHOD AND APPARATUS FOR PROVIDING FUNGIBLE INTERCOURSE OVER A NETWORK," (now U.S. Pat. No. 6,571,290), which claims the benefit of the filing date of U.S. Provisional Patent Application No. 60/050,186, filed Jun. 19, 1997, and entitled "MULTI-USER INTERNET DISPATCH SYSTEM," the disclosures of all of which are hereby incorporated by reference for all purposes.

Concurrently submitted herewith is Appendix A, having file name APP_A.TXT, totaling 78 kilobytes and created on Jun. 20, 2001, consisting of a computer listing constitutes a part of the specification of this invention, pursuant to 37 C.F.R. Sections 1.77 and 1.96, the appendix being incorporated by reference herein for all purposes.

A portion of the disclosure of this appendix document contains material that is subject to copyright protection. The copyright owner has no objection to the facsimile reproduction by anyone of the patent disclosure, as it appears in the Patent and Trademark Office patent files or records, but otherwise reserves all copyrights whatsoever.

FIELD OF THE INVENTION

The present invention relates in general to digital data networks and, more particularly, to network access and to minimizing unauthorized interception of data and denial of network services.

BACKGROUND OF THE INVENTION

There are many networks of computers throughout the world and there is a need for the computers to communicate with each other across the network. To provide order and security, many networks require a computer wishing access to be authenticated before that computer is granted access. After establishing that the computer should be allowed to communicate over the network, it may be given an identification number so that the computer may be contacted by other computers on the network in accordance with network protocol. In general this process applies to a system designated as the Internet.

The Internet comprises a network of computers that interconnect many of the world's businesses, institutions, and individuals. The Internet, which means interconnected network of networks, links tens of thousands of smaller computer networks.

The Internet can be accessed directly through telephone lines with a device called a modem or indirectly though a local area network (LAN). Most users do not have the expertise to connect their computers and associated equipment to the Internet and/or finances to have a continuous connection to the Internet. Thus most users access the Internet through an Internet Service Provider (ISP). The ISP can distribute the costs of necessary equipment and telephone lines to many users on some time multiplexed basis. While an ISP may have access to only one server and a few modems for receiving incoming calls from users, some ISPs have access to hundreds and even thousands of modems and many servers to interface between users and one or more high speed telephone lines of at least DS1 standard communication capacity.

Usually the ISPs that charge the lowest prices to the user are the busiest and users often find that access to a low cost ISP is blocked by a "busy signal". On the other hand, a user of the high priced ISPs seldom encounters busy signals. The high priced ISPs have fewer customers, can afford to add modems as needed and are not confronted with suddenly increased demands on equipment capacity.

Some ISPs use less expensive (i.e. slower rate, poorer quality or lower capacity) telephone lines or equipment to provide low cost and as a result the data transmission rate of communications between the user and the Internet may be substantially less than the capability of the users modem. Many sets of information on the Internet, such as Web pages, include pictures, pointers to other pages, music etc, that require large amounts of data to be transmitted for ultimate display. When a user is attempting to access material requiring the transmission of large volumes of data, a low data transmission rate equates to a long time spent waiting to obtain that data.

When a user first installs software in a computer to be used in connecting the computer to a given ISP, many items of information need to be provided to the software before the user can communicate with the ISP and be connected to the Internet. While some of the information such as the specific communication port to be used (i.e. com1 or com2) and the modem type used in the computer would be universal and would be identical regardless of the ISP used, other information is ISP specific. ISP specific type information would include the ISP dial-in number, a Password Authentication Protocol (PAP) identification number and a PAP password for that ISP.

Different ISPs provide different services to users. Some ISPs (no or low service) may offer only a connection to the Internet without technical help to a user connected to that ISP and further without any additional features. Other ISPs (full service) may offer many features such as encyclopedia type information, interactive games, access to otherwise costly databases, etc.

A user in a commercial environment may operate a computer that is connected to a LAN and also is connected to a modem. There are often business considerations that require some communications with the Internet be accomplished through the LAN and other, especially personal, communications be accomplished through a modem. If a single software entity such as a browser is used for both types of Internet connection, several items of information need to be altered with the accompanying chance for error and frustration of the user.

When a computer is subjected to stress such as by a large and sudden variation in supply voltage (i.e. an electrical spike), there may be corruption of data in the software and/or data banks of the computer. When such corruption concerns the data needed to communicate with the Internet, a considerable amount of time is often required to ascertain the cause of the failure to attain communication and further time is required to correct the problem.

Some Internet users are highly mobile and may need to access the Internet from various locations, some of which locations do not have a local phone number for communicating with the normally used ISP. Such a user either must pay the cost of a long distance call or access a different ISP after modifying the appropriate data the operating system's networking, dial-up-networking, or communications properties used to accomplish such access. Such modification always invites a chance for erroneous data entry in the process and the accompanying time required to rectify the situation.

Another problem related to network use is related to electronic mail which terminology is popularly shortened to email. Email is used to quickly communicate with other users of connected network terminals. The process is normally accomplished by sending a set of data including a header portion, a message body and sometimes one or more file attachments. Typically, the header contains the name of the recipient in a TO line, the sender in a FROM line and a subject in a SUBJECT line. Even if the message body and the attachments are scrambled or otherwise encrypted a persistent entity monitoring the email being sent to and from a given terminal may glean considerable information from the subject matter listed and from the number of messages sent between same parties. This information is typically sent in clear text (unencoded) to facilitate the delivery of email to the proper temporary storage facility, normally a post office box like repository of the service provider of the recipient, until such time as the recipient retrieves the email from the service provider. The recipient also uses the header information in determining priority of messages to be read.

A further problem is third party mail relay. This is a process whereby junk emailers use a service system other than their own to send massive amounts of mail without paying for the service. The massive amount of mail can so overload the system that an invaded system can crash, overload or otherwise be damaged. This overload is termed in the art as a denial of service attack. The overall process of sending massive amount of junk email is termed "spamming". The third party mail relay process is also used to bypass other systems filters which are set up to block mail from the junk emailers system.

In view of the above, there exists a need to quickly and easily access the Internet from various locations, being able to access ISPs providing different types of services, using various adaptors (ie modem or LAN card) and being able to choose whether preference should be given to items such as cost and quality of service, without the user having to be concerned about correctly modifying associated data and parameters such as phone numbers, IDs, passwords etc used by the Internet software.

There is a further need to be able to send email to others in a manner which minimizes the possibility that unauthorized entities may be able to retrieve significant data from email header information.

Also there is a need to prevent junk emailers or other unauthorized parties from using the third party mail relay process in connection with a network service system.

SUMMARY OF THE INVENTION

The present invention comprises a method of and apparatus for simplifying the process of access to a network for a roaming computer user, divides the responsibility of servicing a given user wanting to access the network between multiple parties and minimizes the possibility of improper dissemination of email header data as well as improper use of network resources (including server systems) by non-clients.

BRIEF DESCRIPTION OF THE DRAWINGS

For a more complete understanding of the present invention, and the advantages thereof, reference is now made to the following descriptions taken in conjunction with the accompanying drawings, in which:

FIG. 10 comprises a simple diagrammatic showing of how the present invention may be used in combination with browser plug in software to minimize unauthorized viewing of email messages;

FIG. 11 provides more detail for illustrating the process of FIG. 10;

FIG. 17 summarizes the software installation process of a client users system that wishes to access the present invention:

FIG. 18 provides a graphic description of the procedure used by a client in testing the installed software by selection a location from which to access the components of the present invention;

DESCRIPTION OF THE INVENTION

Figure 1:
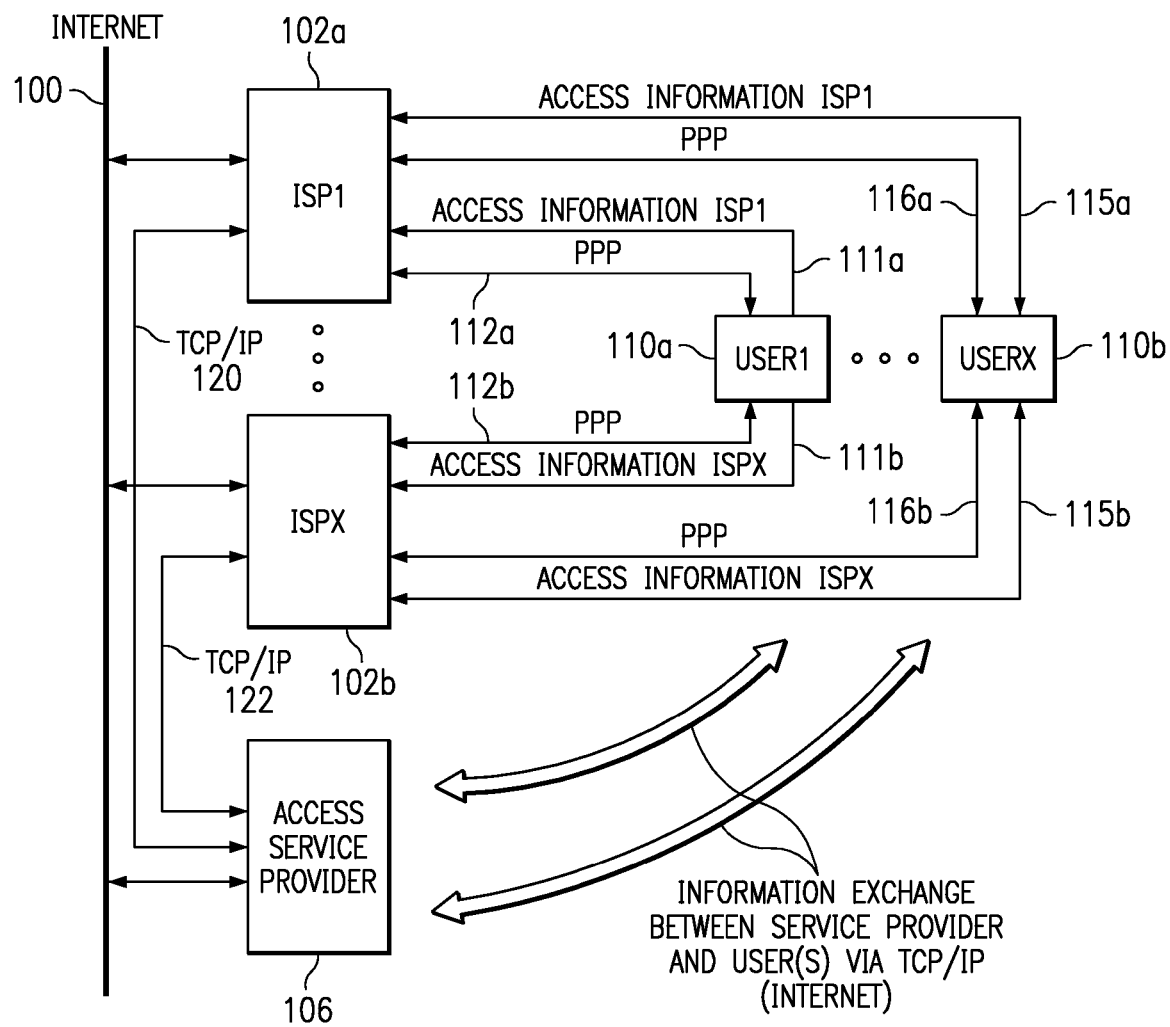
FIG. 1 illustrates signal communication paths between clients, ISPs and network access providers.

The entire contents of Provisional Patent Application Ser. No. 60/050,186, entitled: "Multi-User Internet Dispatch System," filed on Jun. 19, 1997, including appendices, are incorporated herein by reference for all purposes.

It should be noted that the present invention applies to any network or interconnected set of networks. However, since the Internet is a well known example of an interconnected set of networks, Internet terminology and interaction examples will be used in the explanation of this invention.

The present invention solves all or some of at least ten problems:

1 Eliminates the need for a computer user to configure and reconfigure computer networking software for network access through a multiplicity of ISPs and Network Access Providers (NAP) (companies which own the telephone networks and modem banks such as AT&T, GTE, UUNet, PSI, etc.).

2 Allows a Network Re-seller such as an Internet Service Provider to offer network access via a multiplicity of Network Access Providers based on cost, location, availability, reliability, etc.

3 Allows a Network Re-seller to balance network loads through a multiplicity of Network Access Providers and across a multiplicity of network computer servers.

4 Eliminates the need for a computer user to know or configure network access telephone numbers or network access protocol identification numbers.

5 Eliminates the need for a computer user or mobile computer user to reconfigure remote network access software to connect to a network from a remote location.

6 Allows multiple users to use a single computer each with their own unique networking attributes and unique network identity.

7 Allows separate and distinct identifications (ID) and passwords for different services and network functions such as PAP IDs and PAP password, Email ID and password, etc.

8 Provides a user with true network anonymity by assigning independent non-user specific identifications and passwords for such things as PAP authentication, FTP and Email logins, News Server logins, and network server logins.

9 Provides Email anonymity by transmitting and receiving all email through a third to party (broker) wherein, if appropriate, aliases may be used for all un-encrypted data and these aliases may be changed periodically by the system in a manner transparent to the user.

Eliminates third party email relay (SPAMMING) by transparently authenticating each user-system prior to giving access to a sendmail server.

This invention relates to network connections, such as the Internet, and allows systems to be independently, transparently and dynamically connected or reconnected to a network based upon any number of attributes such as user or group identity, cost, availability, reliability, etc. Further this invention supports many types of physical connections such as telephone dial-up connections, ISDN connections, Ethernet, and other local area networking connections. It should be noted that while Internet terms such as ISP are used throughout this description, the invention is operable with any network or portion of any network and thus terms such as NSP (Network Service Provider) have been coined for use in the claims to identify similar or analogous systems and devices.

A traditional network connection requires someone skilled in the art of computer networking to setup and configure both network related hardware (such as modems or Local Area Network cards (Ethernet, Token-ring or other cards) and network software. The invention eliminates the need for such network configuration skills.

The invention configures and reconfigures network related software to support multiple users with multiple network protocols and/or multiple networks using the same protocol without the need of any computer network configuration skills and further allows the configuration to be changed or modified dynamically without any user intervention.

The principles of the present invention and their advantages are best understood by referring to the illustrated embodiment depicted in FIGS. 1-21 of the drawings, in which like numbers designate like parts.

The invention includes software which is sometimes referred to as middle-ware because it resides between an electronic device operating system and the end-users interface. The inventive software has all the attributes of middleware as it configures and manages network communication equipment such as modems and Ethernet cards, network protocols such as the Transmission Control Protocol/Internet Protocol (TCP/IP), and the associated interfaces between the communication equipment, network protocol and the computer's operating system for each individual user or groups of users.

Now referring to FIG. 1, there is illustrated a plurality of Internet service providers (ISP1 through ISPx) 102a, 102b connected to a network 100 (sometimes referred to as the Internet). As will be appreciated, an Internet service provider (ISP) provides access for one or more users 110a, 110b to the Internet 100 through a physical interface. The term "internet service provider" includes network access providers (NAPs) and Network Service Providers (NSPs) as well. In general terms, a user 110 connects to the ISP 102 via a communications link and the ISP 102 provides connection to the Internet 100. As will be appreciated by many users of the Internet, the ISP typically has many modems accessible from a limited number of telephone numbers. Each of these modems has an assigned internet protocol (IP) address and normally an assigned DNS name. Such assigned names and (IP) addresses will look something like "1cust239.tnt.orl1.da.uu.net" and [208.250.77.239] respectively. When a user 110 contacts the ISP 102, the user 110 is connected to the next available modem and the IP address of that modem becomes the IP address of that user 110 for the remainder of that connection session. The user 110 may include a single computer, group of computers, local area network, or a larger network connected to the ISP 102 via a communications link. However, in most applications, the user 110 will include a single user requesting access time to the Internet 100.

The present invention provides a means for transmitting ISP-specific access information to a user 110 via a communications link (preferably, the Internet 100) that allows the user 110 to gain access to the Internet 100 through a selected one of the plurality of ISPs 102.

To begin the process of the present invention, the user 110 installs (downloads) a client dispatch application program 200 (see FIG. 2) that furnishes the user 110 with one or more ISP access telephone numbers, one or more valid test and Registration Password Authentication Protocol (PAP) identification (ID) numbers, and a valid PAP password associated with a predetermined one of the ISPs 102. The client dispatch application 200 will be described in more detail further below. The access information allows the user 110 to authenticate the user's right to connect to the Internet via the predetermined ISP 102. The access information mentioned comprises the previously mentioned access telephone number, the PAP ID, the PAP password and additional ISP-specific information required by the user 110 to gain access to the Internet 100 via the predetermined ISP 102 (collectively, ISP-specific configuration information) is initially provided by the client dispatch application 200. In addition, the client dispatch application 200 provides basic configuration and initialization information (installation and configuration) to the user's computer to configure and manage the network communication equipment, network protocols and the associated interfaces needed to develop the capability to access the Internet 100, regardless of the particular ISP.

After the client dispatch application 200 is installed and the initial ISP-specific information is known, the client dispatch application 200 causes the user 110 to automatically transmit access information to the predetermined ISP 102 (ISP1 102a or ISPX 102b). The line of communication through which the access information is transmitted to the predetermined ISP 102 by the user 110 (USER1 110*a* or USERX 110*b*) is identified by the reference numerals 111*a*, 111*b*, 115*a*, 115*b*, depending on the particular user (USER1 110*a* or USERX 110*b*) and the particular ISP (ISP1 102*a* or ISPX 102*b*). Upon receipt of the access information, the ISP "authenticates" the user 110. The ISP 102 checks to see whether the PAP ID and PAP password received from the user 110 is valid. It will be understood that the authentication process performed by the ISP 102 utilizes one or more appropriate methods (such as Remote Authentication Dial-In User Service (RADIUS)) which are normally associated with an authentication server running a database at the ISP, Network Service Provider (NSP) or the NAP. If the PAP ID and/or PAP password are not valid, the ISP 102 will disconnect the user 110 or notify the user 110 that the PAP ID and/or PAP password is invalid. If valid, the user 110 and the ISP 102 create a point-to-point protocol (PPP) (i.e., communications connection) which is identified in FIG. 1 by reference numerals 112*a*, 112*b*, 116*a*, 116*b*, depending on the particular user (USER1 110*a* or USERX 110*b*) and the particular ISP (ISP1 102*a* or ISPX 102*b*). The PPP allows the ISP 102 to transmit/receive information to/from the user 110. As a result, the user 110 is given access to the Internet 100 and the ISP generates an internet protocol (IP) address to uniquely identify the user on the Internet 100. The particular IP address assigned to the user 110 depends on the IP addresses that are available and assigned to the particular ISP 102 to which the user 110 is connected. An IP address is presently 32 bits and is normally represented with four decimal numbers each ranging from 0 to 255 (e.g. 128.54.28.200) where each decimal number represents one byte of the 32 bits.

In accordance with the present invention, an Internet service provider access service or ASP (Access Service Provider) 106 is connected to the Internet 100. The external location, or physical address of the access service 106 is defined by a predetermined and unique address (i.e., IP address). After the user 110 gains access to the Internet 100 via one of the ISPs 102, the client dispatch application 200 resident in the user's computer transmits a data message to the access service 106 through the Internet 100 using the predetermined address of the access service 106. This data message is sent via a path identified as TCP/IP 120 or TCP/IP 122, depending on the particular ISP 102 to which the user 110 is connected for access to the Internet 100. The communications link protocol used for Internet 100 communications is defined as Transmission Control Protocol/Internet Protocol (TCP/IP) and is well known in the art. As will be appreciated, other network communications protocols and standards may be used during the present or in the future by the present system invention due to the flexibility provided in the use of multiple databases to store various types of data.

The data message transmitted from the user 110 and received by the access service 106 contains information about the user 110, including the user's identification and address, current PAP ID, time stamp information, and version information of the client dispatch application 200 operating on the user's computer, etc. In response to the user information received, the access service 106 transmits an access information data message that includes access information for a particular ISP 102. The access information is specific to a dial-in telephone number of a particular ISP 102 and, upon receipt by the user 110, allows the user 110 to gain access to the Internet 100 via that particular ISP 102. The ISP-specific access information includes an ISP phone number (for dial-in to the ISP), a PAP ID for the ISP 102, and a PAP password for the ISP 102, and may also include default routing information (i.e., gateway address information), default directory information (including domain name server information), sub-protocols for the PPP for the ISP 102, and configuration information for the hardware (i.e. modem) of the ISP 102 (to configure the user's modem), such as data compression information and speed. The ISP-specific information may also include service option defaults such as Email IDs, POP protocols and browser information. The PAP ID may or may not be sent depending on the current PAP ID information transmitted from the user 110 to the access service in the data message (e.g., if the current PAP ID and the new PAP ID are the same, a new PAP ID does not need to be sent).

After receiving the ISP-specific access information, the client dispatch application 200 may disconnect the user 110 from the current ISP 102 and automatically dial and reconnect the user 110 to the desired ISP 102 associated with the ISP-specific access information. As will be appreciated, the desired ISP 102 may be another ISP or may be the same ISP to which the user 110 was previously connected, depending on the attributes of the particular ISP 102 desired to be used for access to the Internet 100. If the ISP phone number (for dial-in to the ISP) and a PAP ID received with the new access information, refer to the same ISP 102, the client dispatch application 200 will not disconnect the user 110 and the user's session will continue uninterrupted.

The access information data message includes the information necessary (PAP ID, PAP password, and other information if needed) to access a desired ISP 102 and, may include information for a plurality of desired ISPs 102, or multiple PAP IDs and PAP passwords for a desired single ISP 102. It will be understood that more than one access information data message packet may be utilized and transmitted, each packet containing a portion of the information packet or each may contain access information for a specific ISP 102.

The access service 106 offers Internet 100 access to the user 110 via a plurality of ISPs 102 based on cost, location, availability, reliability, etc. Based on the geographic location of the user 110, the access service 106 identifies, to the user 110, one or more ISPs 102 that provide local access availability (via local telephone numbers or toll free numbers) and provide the user 110 with information needed to access one of the identified ISPs 102 (using the ISP-specific access information). For desired low cost operation, the access service 106 identifies the ISP 102 that provides the lowest cost access service through which the user 110 may access the Internet 100 from the identified ISP 102 at the user's location. For the reliability operation, the access service 106 identifies one or more ISPs 102 that provide the highest reliability of connecting through which the user 110 may access the Internet 100 from the identified ISPs 102 at the user's location. For the availability operation, the access service 106 periodically receives availability information from each of the plurality of ISPs 102. In response to this information, the access service 106 identifies one or more ISPs 102 that provide the highest availability through which the user 110 may access the Internet 100 from the identified ISPs 102.

As will be appreciated, the location operation, reliability operation, and availability operation may each provide to the user 110 the identity of multiple ISPs 102 or multiple dial-in numbers for a particular ISP 102 whereby the user 110 will attempt connection in order of priority. For example, the user 110 may attempt access to a first ISP 102 contained in a list of multiple ISPs 102 that have been identified based on availability or reliability. If a connection is not successful with the first ISP 102, the user 110 will next try a second ISP 102 in the list, and so on, until a connection is made. In another mode of operation example, the user 110 may attempt access to a first ISP 102 utilizing a first dial-in number contained in a list of multiple dial-in numbers for the first ISP 102 that have been identified based on availability or reliability. If a connection is not successful with the first dial-in number, the user 110 will next try a second dial-in number in the list, and so on, until a connection is made. Further a combination of multiple ISPs 102 and multiple dial-in numbers may be used.

Figure 2:
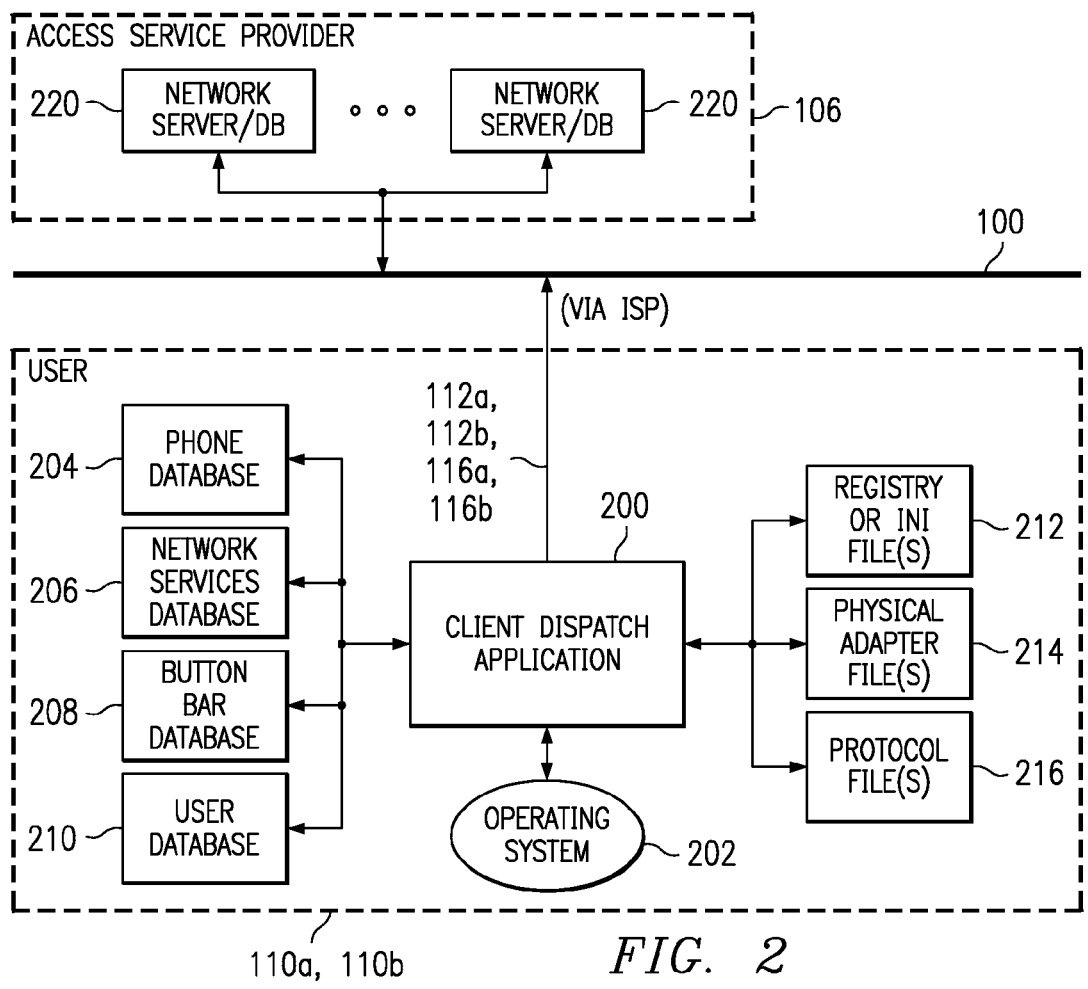
FIG. 2 illustrates in more detail the software interaction between a client and an access service provider.

Now referring to FIG. 2, there is illustrated a block diagram of the access service 106 connected to the Internet 100 and a block diagram of the user 110 connected to the Internet 100 via the ISP 102. The user 110 may be a computer system that includes the client dispatch application 200 and the computer's operating system 202, as well as a registry or initialization file(s) 212, a physical adaptor file(s) 214, and a protocol file(s) 216. The files 212, 214, 216 are operating system files (system configuration files) that provide the user 110 with system configuration information for supplying the basic capabilities needed to successfully connect the user 110 to a network, such as the Internet 100. The client dispatch application 200 correctly configures and sets the system configuration files 212, 214, 216 with the necessary system configuration information, including network protocols, adapter information, IP addresses, domain name system (DNS) server addresses, gateway addresses, other operating system binding functions, dynamic host control protocol options, and any other system options. As will be appreciated, the system configuration information necessary for the user 110 to access the Internet 100 is well known in the art.

The user 110 also includes several databases for storing information, including a phone database 204, a network services database 206, a button bar database 208, and a user database 210. As will be appreciated, the databases 204, 206, 208, 210 may be combined into a single database, may be separate, and/or may be relational. Generally, the client dispatch application 200 includes the databases, or generates the databases and stores pre-loaded information into the databases, inserting data or at least a portion of the data into the database upon installation of the client dispatch application 200 on the user 110 computer.

The phone database 204 includes one or more dial-up telephone numbers for the access location(s) of each of the ISPs 102. Each dial-up number entry includes associated information including on-off field data, state (or a toll free number), city, dial-up telephone number, type of modems supported (analog or digital), whether the number is available for registration, identity of the ISP 102 that owns the dial-in number (ID for provider), sequence number (order for putting number in a specific area). Some of the foregoing data is access information. An example of some of the contents of the phone database 204 and its data entries is set forth in Appendix A which is hereby incorporated by reference.

The network services database 206 includes access information for each dial-in number contained within the phone database 204. Each of the stored dial-in numbers is associated with an ISP 102. The access information for each dial-in number (for a particular ISP) includes one or more PAP IDs, one or more PAP passwords, default routing information (i.e., gateway address information), default directory information (including domain name server information), sub-protocols for the PPP, and configuration information for the hardware (i.e. modem of the ISP) to configure the user's modem, such as data compression information and speed. The network services database 206 may also include service option defaults such as Email IDs and the POP protocols and browser information associated with the dial-in number. The network services database 206 also includes the basic configuration and initialization information necessary to configure and manage the network communications equipment, network protocols and associated interfaces for the user 110 for basic communications between the user 110 and the Internet 100. In addition, the network services database 206 includes information relating to the type of service (type of account) requested by the user 110, such as the "lowest cost service", the "highest reliability service", the "most reliable service", or combinations thereof, plan pricing and descriptions, and includes information identifying one or more primary processes to be performed by the client dispatch application 200. As will be appreciated, some of the information in the network services database 206 and the phone database 204 may overlap. An example of the network services database 206 and its data entries is set forth in Appendix A which is hereby incorporated by reference.

The button bar database 208 includes information related to button bar creation and modification. All functions may be initiated through the human interface—a Toolbar (also described in the art as a button bar and basic examples of which may be found in many present day computer applications). Software responsive to the button bar database 208, for displaying the Toolbar in accordance with data in the button bar database 208, may be provided as part of a network browser. The Toolbar of the present invention has some unique properties as it can be dynamically changed or updated via a Pinger process or a MOT script. As defined in this application and as will be described in more detail later, a Pinger process comprises an entity that acts transparently as a "services" coordinator to provide and/or administer the following:

1. Heartbeat service to help maintain network connectivity with a client.
2. Authentication services that securely authenticate client access to email, commerce, and other public and private network servers and services.
3. Update services that can perform client software, database, and maintenance services during periods of inactivity.

The Pinger entity, as suggested above, has, as one of its functions, the responsibility of providing database updates to the client user. When a MOT script is used, it can be a "mime type" definition part of an E-mail message, an HTTP web document download and so forth, which transparently automates the Toolbar update. The Toolbar can be integrated with ticker tape which can spawn MOT scripts, URLs, or execute programs. Each Toolbar button may be programmed with a function in the button bar database 208. The Toolbar reads a plurality, for this example five, of attributes from the button bar database 208:

1. Caption-Title or Button Name.
2. Enabled-Enables or disables the button function
3. Execution Type—This attribute supports the following types and further determines if the fifth attribute read by the toolbar would be "Execute File" (5a) or "URL" (5b)
   DDE to a URL
   DDE to a URL without going online
   Launch a Program or Script
   Launch a Program or Script and wait to complete before continuing
   Go online and then launch a program or Script
   Change Preferences
   Change Passwords
   Display Account Information
   Set Dialing Properties
   Execute a MOT script
   Jump to another Tab or Button on the Toolbar
   Reload the Toolbar's Tabs and/or Buttons 4. Hint—Button functionality description 5a. Execute File—Command line of file to be executed 5b. URL—URL for a browser to open whether remote or local When a user 110 clicks on one of the Toolbar functions or the Ticker tape, the appropriate procedure is started. For example, if a button is programmed to go to the USA Today (button Caption) web site the Execution type would be set to "DDE to a URL" and the "URL" would be set to something similar to http://www.usatoday.com/ and the "Hint" would be set to something similar to "Open to XXXXXXXXX Web site for the latest news!".

As will be appreciated, a MOT script defines how to build a button bar using the button bar database 208 and its database entries. The MOT script is typically associated with a Web page and when the user 110 clicks on the Web page, the MOT script associated with the Web page is read back by the client dispatch application 200. The client dispatch application 200 uses the particular MOT script and the button bar database 208 information and builds the button bar automatically according to the MOT script specifications. An example of the button bar database 208 and its data entries is set forth in Appendix A which is hereby incorporated by reference.

The user database 210 includes information related to the user 110, such as name, address, phone numbers, billing information, Email ID and Email password, type of account, and unique PAP ID and PAP password, if applicable. It will be understood that the user database 210 may be merged into the network services database 206. An example of the user database 210 and its data entries is set forth in Appendix A which is hereby incorporated by reference.

The access service 106 is connected to the Internet 100 and is defined by a predetermined and unique address (i.e., IP address). The access service 106 includes one or more network servers/databases 220. It will be understood that access service 106 includes a computer system having one or more processors, memory, and support hardware (all not shown in this figure) for processing and storing information and data communications. The network servers/databases 220 store information relating to the user(s) 110, including the same information that is (or would normally be) in the user database 210, and also includes session keys (transaction keys) billing data, connection history data, ISP-specific access information, and information about what procedures a user 110 has performed, and the like. Specific functions of the access service 106 have been described in the foregoing and will be described in more detail below. The Pinger entity may be a part of the access service provider 106 or it may be separate. For the present discussion, it will be assumed to be part of the access service provider 106.

After the user 110 connects to the Internet 100 via a predetermined ISP 102, the client dispatch application 200 dispatches an initial "pinger" message to the access service 106 via the Internet 100. Included within the pinger message is header information that includes the current user ID, account owner ID, PAP ID, the current IP address assigned to the user 110, Group ID, the users system's current time, database (204, 206, 208, 210) revisions levels, client dispatch application 200 and other related software revision levels.

All communications between the client dispatch application 200 and the access service 106 take place through a process identified as the Pinger. The Pinger provides secure and unsecure periodic bi-directional communication between the user 110 and the access service 106. The functions of the Pinger are as follows:

Read, Write or Update any entry in any of the databases 204, 206, 208, 210 of the user 110 and any of the databases 220 of the access service 106 and further initiate a secondary transmission when appropriate.

Execute a program or script with command line entries if appropriate.

Save a file or script and further initiate the execution of the file or script when appropriate.

Continue Transaction.

With these functions, the client dispatch application 200 can request database updates or save files for execution later, and the access service 106 can initiate events, database updates, or save files for execution later. The Pinger process also provides a "heartbeat" mechanism to prevent the premature disconnection of the user 110 from the network by an ISP 102. That is, many ISPs 102 have a modem inactivity timeout interval that disconnects users 110 after some short interval of time if there has been no network activity during that interval of time. The heartbeat function is programmable and, in the preferred embodiment, is set at five minutes during the user's first three hours of connection time and increases by five minutes each half hour thereafter. In the heartbeat function, the client dispatch application 200 transmits the user's ID to the access service 106.

The pinger is initiated by the client dispatch application 200 upon connection to the network 100. The client dispatch application 200 transmits header information to the access server 106 using the IP address of the access server 106. The header information includes the current user ID, account owner ID, PAP ID, the current IP address assigned to the user 110, Group ID, the users system's current time, database (204, 206, 208, 210) revisions levels, and client dispatch application 200 and other related software revision levels. With this information, the access server 106 determines whether a user 110 is making two connections while only paying for one and thus needs to be disconnected, or is a user 110 that needs a database or file update. The Continue Transaction function provides a mechanism to partially transmit data and commands over multiple sessions (successive connections by the user 110 to the network 100) without having to restart the transaction from the beginning.

While the pinger process (transparent to the user 110) allows the client dispatch application 200 and the access service 106 to interact and download database updates (or other information) to the user 110, there is an alternative way to provide the updates to the databases, etc. at the request of the user 110. The access service 106 may provide a Web page whereby when the user 110 clicks on the Web page, a MOT script and other data associated with the Web page is transmitted from the Web page site to the client dispatch application 200. This gives the user 110 the capability to request a data update (or to receive other information). Alternatively a MOT script and other data can be transmitted via an email message, an FTP (file transfer procedure) site or other similar networking storage and transport mechanism to the client dispatch application 200.

Figure 8:
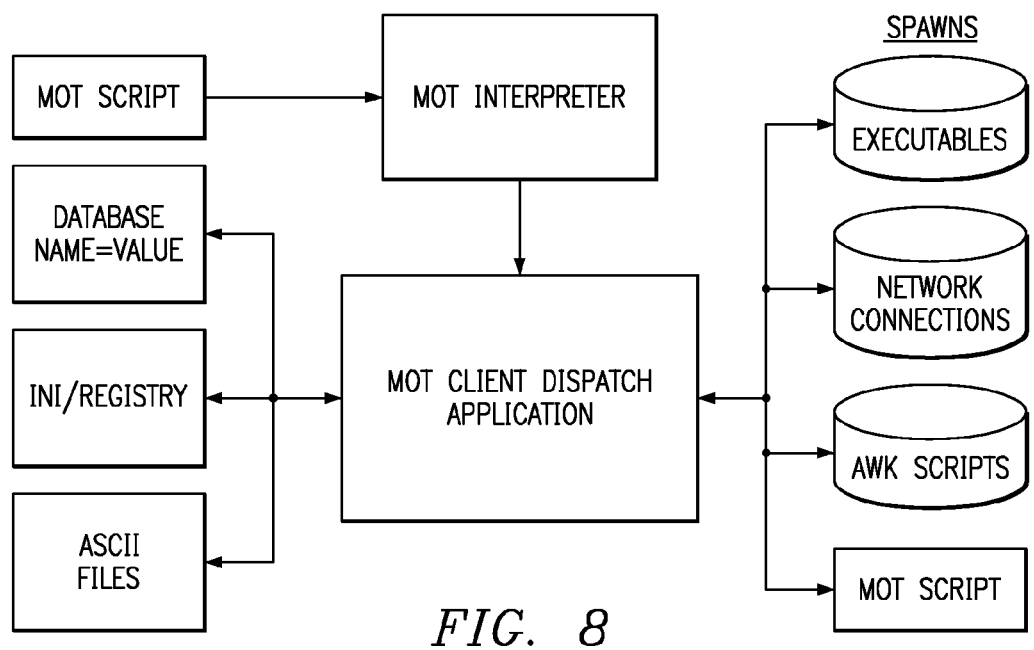
FIG. 8 illustrates a plurality of MOT (a computer script language) potential processes.

The Script Language used by the Pinger and elsewhere in this application for patent is designated by the term MOT (see FIG. 8). MOT is not, however, an acronym for anything meaningful. The script language is an interpretive language which is stored in an encrypted file from which the interpreter reads to initiate the MOT client dispatch application 200. The MOT client dispatch application 200 can read and write database (db) entries, Operating System initialization file entries (INI and Registry Files), and ASCII Text files. Further, the MOT client dispatch application 200 can spawn executable programs, network connection, AWK scripts, and other MOT scripts. A MOT script may have a "mime type" defining the MOT script language as the language of the MOT script.

Now referring to FIGS. 3 through 7, there is illustrated the process of the client dispatch application 200. The flow diagrams of FIGS. 3-7 are representations of closed-loop programming (structured programming). The client dispatch application 200 performs five primary procedures or functions as set forth in the CASE block. These include the installation, registration, regular use, manual update, and multi-dial procedures. Within the multi-dial procedure are several sub-functions defined as the low cost, reliability, location, availability, busy-sequence, and single dial/multi-login sub-functions shown and explained subsequently in connection with FIG. 7. The client dispatch application 200 manages the procedures based upon data from one or more databases of the access service 106 or other inputs received from the access service 106, the user's databases 204, 206, 208, 210, and/or the user's computer operating system files. It will be understood that databases and database information may be encrypted to prevent a user 110 from tampering with entries contained therein.

Figure 3:
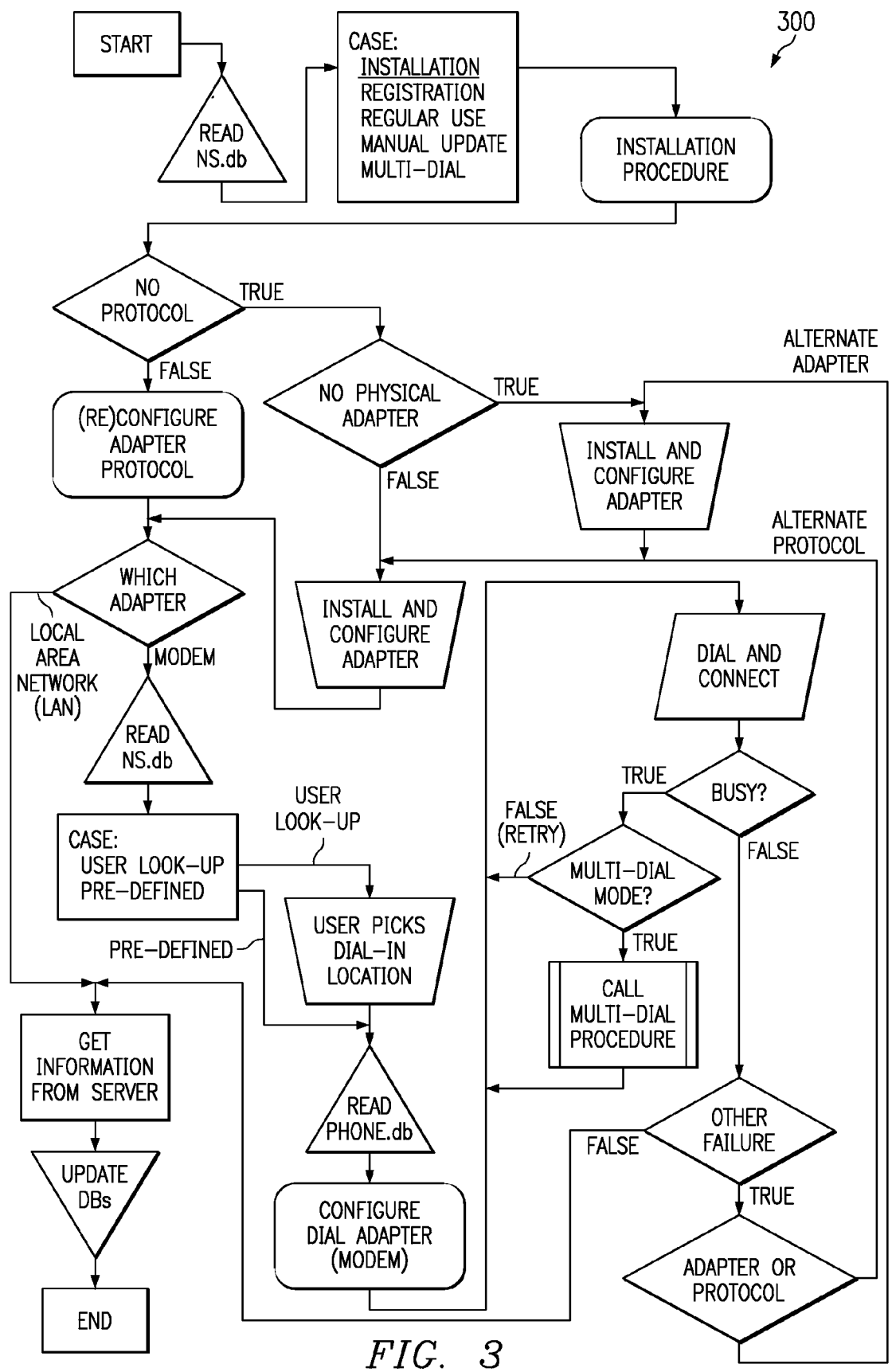
FIG. 3 illustrates a flow diagram of an installation procedure of the client dispatch application.

Now referring to FIG. 3, there is illustrated a flow diagram of an installation procedure 300 of the client dispatch application 200. The procedure 300 starts by reading information from the network services database 206. The network services database 206 forms part of the software package which is loaded into a network access device, such as the user 110 (computer). The network services database 206 includes basic configuration and initialization information necessary to configure and manage the network communication equipment, network protocols and the associated interfaces between the communication equipment and network protocols and the computer's operating system.

After the network services database 206 is read, the user's operating system files (which in the case of a Windows operating system comprises Registry and INI files, Protocol files, and Physical Adapter files) are examined to determine if any networking options have been installed and whether or not the files, if installed, are correct and configured properly as part of the "No Protocol" decision block. If no Protocol or Adapter has been installed, the "True" path will be followed whereby the Installation function will configure the Adapter and necessary Protocol to successfully connect the user 110 to a network such as the Internet 100. If the Protocol or Adapter that is installed is misconfigured, the "False" path will be used whereby the Installation function will reconfigure the Adapter and necessary Protocol to successfully connect the user 110 to a network such as the Internet 100. As part of the configuration process, it may be noted that the correct configuration for utilization of the TCP/IP Protocol would include configuring and setting the proper Operating System Registry and INI (initialization) files with the necessary Protocol configuration information in instances where the operating system is a version of windows. Such information includes: IP addresses whether statically or dynamically assigned, Domain Name System (DNS) name server addresses whether statically or dynamically assigned, Gateway Addresses whether statically or dynamically assigned, Other operating system Binding functions, Dynamic Host Control Protocol options, Windows Internet Naming Service (WINS) options whether statically or dynamically assigned, and the assignment of such Protocol functions to be utilized by the appropriate Adapter. The function of configuring or reconfiguring is executed near the beginning of each of the five primary procedural (300, 400, 500, 600, 700) tasks of the client dispatch application 200 to ensure successful operation of a network connection even for those instances where a computer user 110 accidentally misconfigures their system and thereby makes networking inoperable.

After the successful configuration of both the Adapter and the Protocol, the procedure 300 proceeds to the "Which Adapter" decision block. The appropriate adapter is utilized which is either the adapter pre-programmed into the network services database 206 (if available) or if there is only one Adapter then it will be used. If the Adapter is a Modem, the "Modem" path will be followed to read from the network services database 206 to determine if the user 110 chooses a dial-in location under the case of "User Look-up" or if the modem shall be programmed to dial a "Pre-Defined" dial-in phone number reference in the network services database 206 and stored in the phone database 204. If a database entry in the network services database 206 is set to allow the user 110 to choose a dial-in location, then the user 110 chooses a location based on Country, State or Province, and City in accordance with the "User Picks Dial-In Location" block. After the user 110 selects the proper dial-in location, the installation procedure 300 reads from the phone database 204 to determine the dial-in phone number to use. If a given location has multiple dial-in phone numbers, a dial-in number is selected based upon attributes read from the network services database 206 (and/or the phone database 204). Such attributes include installation dial-in numbers (dial-in phone numbers which are only available during installation or testing). Although not pertinent to the installation procedure 300, other attributes of phone numbers appearing in the phone database 204 include Registration Dial-in Numbers (phone numbers and locations which appear to a user 110 during registration), Sequence Numbers (a prioritized list of phone numbers which shall be tried in sequential order to produce the highest probability of connection), Available ISP numbers (phone numbers of a given ISP's modems), Currently Valid Numbers (phone numbers which are currently valid for use by a given user 110), or any combination of the aforementioned.

If a value in the network services database 206 is set for the user 110 to use a predefined dial-in number (such as an 800 type toll-free number) the client dispatch application 200 will read the appropriate predefined phone number entry from the phone database 204. After the client dispatch application 200 has determined the proper dial-in phone number, whether user selected or pre-defined, the user's modem is initialized and dialing occurs, as set forth in the "Dial & Connect" block. If the modem is busy, it will either continue to retry the same phone number or initiate a multi-dial procedure 700 (as set forth in FIG. 7) depending on the outcome of the "Multi-dial Mode?" decision block (from an entry in the network services database 206). If the "False (Retry)" path is followed, the same number is dialed until the user 110 "gives up". If a Multi-Dial mode "True" path is followed, based upon the entry in the network services database 206, the multi-dial procedure 700 is initiated and other dial-in numbers will be tried to gain access to the network. The multi-dial procedure 700 is one of the five primary procedures of the client dispatch application 200 and is explained in more detail in connection with FIG. 7.

Once a connection is made, the "False" path from the "Busy?" decision block is followed and communication with the access service 106 begins by sending an installation PAP ID and PAP password (read from the network services database 206) to the access service 106 for transparent login authentication as shown by the "Get Information From Server" block. Once the login has occurred, communication with the access service 106 is established, and transfer of data begins. The data transferred during the installation procedure 300 may contain some basic system information about the user's computer system, the type of connection being used and the location from which the connection has occurred.

Once this information is received at the access service 106, the access service 106 sends appropriate information back to the client dispatch application 200 and inserts at least a portion of the data into the database. Such information (data) may include updates to the phone database 204 including "Location" addition or subtractions, phone number changes, and updates to the network services database 206 including ISP 102 additions and subtractions, group, user, or multiple user specific configuration, DNS and IP information, etc. Updates to the databases 204, 206, 208, 210 which reside on the user's computer can occur transparently to the user 110 whenever the user 110 is connected to the Internet 100; thereby ensuring that the user's network related information is always current and accurate. Any updates received from the access service 106 are written to the appropriate database (i.e. network services database 206, phone database 204, or others) by the client dispatch application 200. The client dispatch application 200 also updates the network services database 206 to reflect "installation complete". Thus, the client dispatch application 200 is informed that the next execution "Case" to start is "Registration" as will be shown in FIG. 4.

At this point, the dial-in location attributes (Installation dial-in numbers, Registration Dial-in Numbers, Sequence Numbers, Available ISP numbers, Currently Valid Numbers) provide control mechanisms to ensure that a user 110 receives the appropriate level of service for which they are subscribed such as "the lowest cost service", "the highest reliability service", "the most available service", or combinations thereof. Further, these updated and database stored attributes allow for remote testing of the network communications (full connection TCP/IP test to the Internet 100), the user's system for basic configuration, database integrity, network load balancing and the reduction of fraud by dynamic control of phone number validity.

If the Adapter used to connect to the network is a Local Area Network device such as an Ethernet card, the "LAN" path is followed from the "Which Adapter" decision block. In this situation, once communication with the access service 106 is established, transfer of data and updates begin as described in the paragraphs above.

Figure 4:
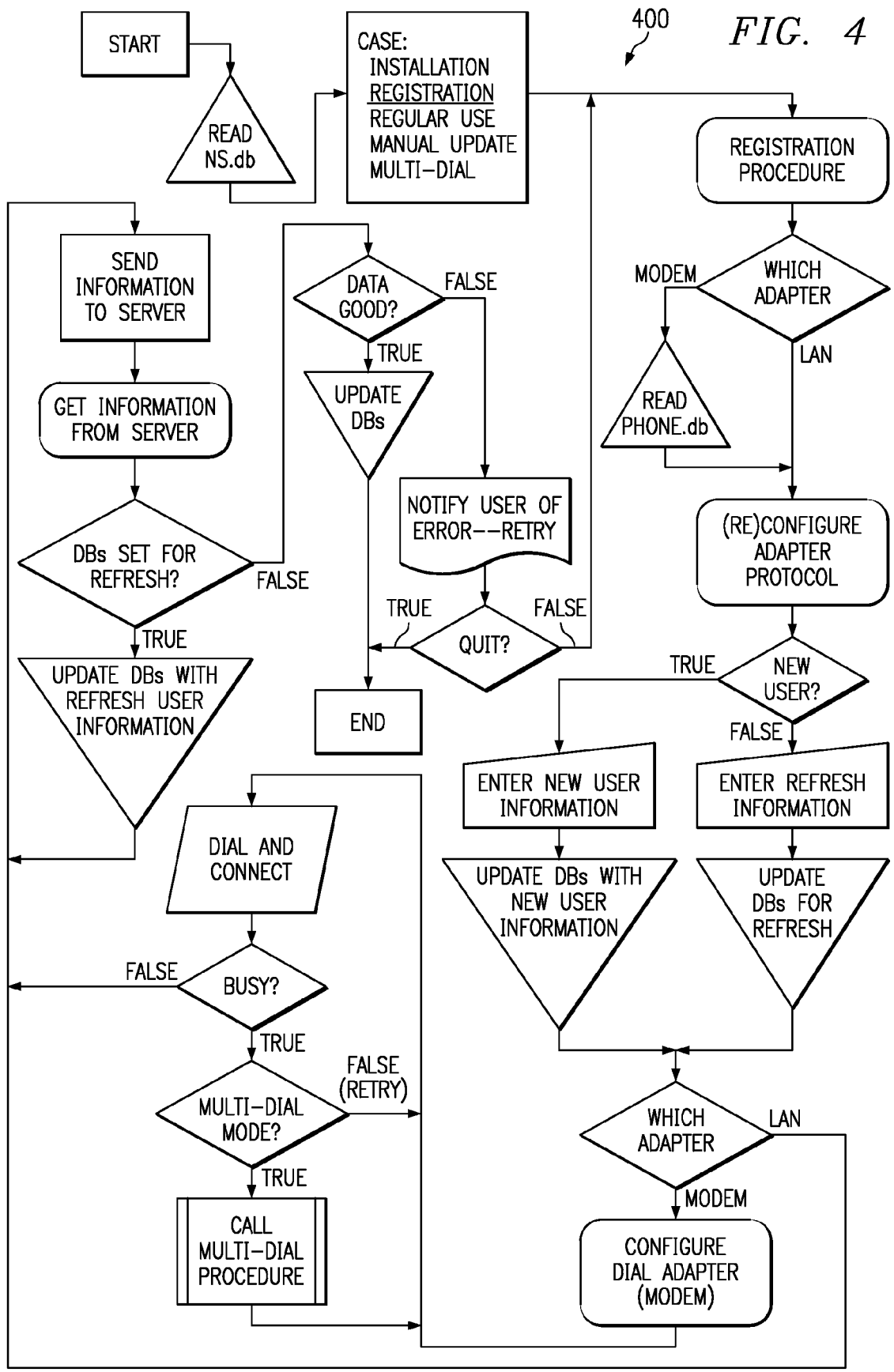
FIG. 4 illustrates a flow diagram of a registration procedure of the client dispatch application.

Now referring to FIG. 4, there is illustrated a flow diagram of the registration procedure 400 of the client dispatch application 200. The registration procedure 400, as all primary procedures, starts by reading the network services database 206 to determine the appropriate execution "Case", and in this case, the registration procedure 400. The registration procedure 400 starts by reading the network services database 206 to gather the necessary information, such as which Adaptor and Protocol to use and proceeds to configure and initialize the appropriate networking functions to start the user registration process. A "Which Adapter" decision block includes the two paths of "Modem" and "LAN". After a determination is made as to which Adapter and Protocol to use, the process proceeds to the "(Re)Configure Adapter Protocol" block to configure and initialize the appropriate networking functions to start the user registration procedure 400 (i.e. configuration process for the user's computer).

The registration procedure 400 comprises several forms (pop-up forms) into which the user 110 enters specific information about the user 110. Such information typically will include Name, Address, Phone Numbers, Credit Card and/or Banking Information, Referral Information (if available), Personal Security information (like: mother's maiden name), Birthdate, and Preferred E-mail Identity and Preferred E-mail Domain Choice. The registration information for each user 110 is stored in the network services database 206 and/or a user specific database 210, as well as information about the user's system and revision levels of the client dispatch application 200 and databases (204, 206, 208, 210). Upon completion of the new user registration forms as indicated by the "Update DBs with New User Information" block, the client dispatch application 200 initiates communications with the access service 106 as described earlier. The adapter used, as determined by the lower most "Which Adapter" decision block, will be the adapter determined and used during the installation process. Once communication with the access service 106 begins, the client dispatch application 200 sends all the information that was added or updated into the network services database 206 (or user database 210) of the user 110 to the access service 106 as indicated by the "Send Information To Server" block. The access server 106 transmits the received information plus additional information, such as one or more user 110 assigned PAP IDs and PAP passwords, Email IDs and Email Passwords, back to the client dispatch application 200 for comparison and verification of the information that was sent as indicated by the "Get Information From Server" block. If the information returned is not identical to the information which was sent, the client dispatch application 200 will resend the information again to the access service 106 along the path commencing with the "Notify User of Error-Retry" block. This process will continue until all transmitted information from the client dispatch application 200 to the access service 106 matches all information returned to the client dispatch application 200 from the access service 106 or when a maximum retry value is reached in accordance with the "Quit?" decision block. In the preferred embodiment, the maximum retry value is five. If the client dispatch application 200 reaches a maximum retry value, an error message is sent to the user 110 notifying the user 110 that an Error has occurred and to try reconnecting or registering again. This error message comprises a part of the "True" path output of the "Quit?" decision block.

It will be understood that registration procedure 400 may be designed to have an alternate process of prompting the user 110 to use an alternate Adapter or Protocol and then retry where such an alternate process may be deemed appropriate.

If other users (sub-users) are permitted to access the network under this initial user's authority, such as other family members, the registration process for these other users can be started during a regular use procedure 500 described in connection with FIG. 5. Upon completion of a user's 110 initial registration, the user's network access display device will display an Electronic Registration Number (ERN) which, with other personal security information, can be used later to refresh a system as described below.

The registration procedure 400 also allows users 110 registered with the access service 106 to temporarily use a computer or other network access device or permanently use a secondary network access device by using a refresh function which bypasses the standard registration form screens by asking the user 110 if they have already registered. If the user 110 has previously registered, the refresh process of the registration procedure 400 will connect, communicate with the access service 106 and download all the user information sent during the user's initial registration and the client dispatch application 200 will update the appropriate databases (204, 206, 208, 210) on the user's network access devices storage system.

Figure 5:
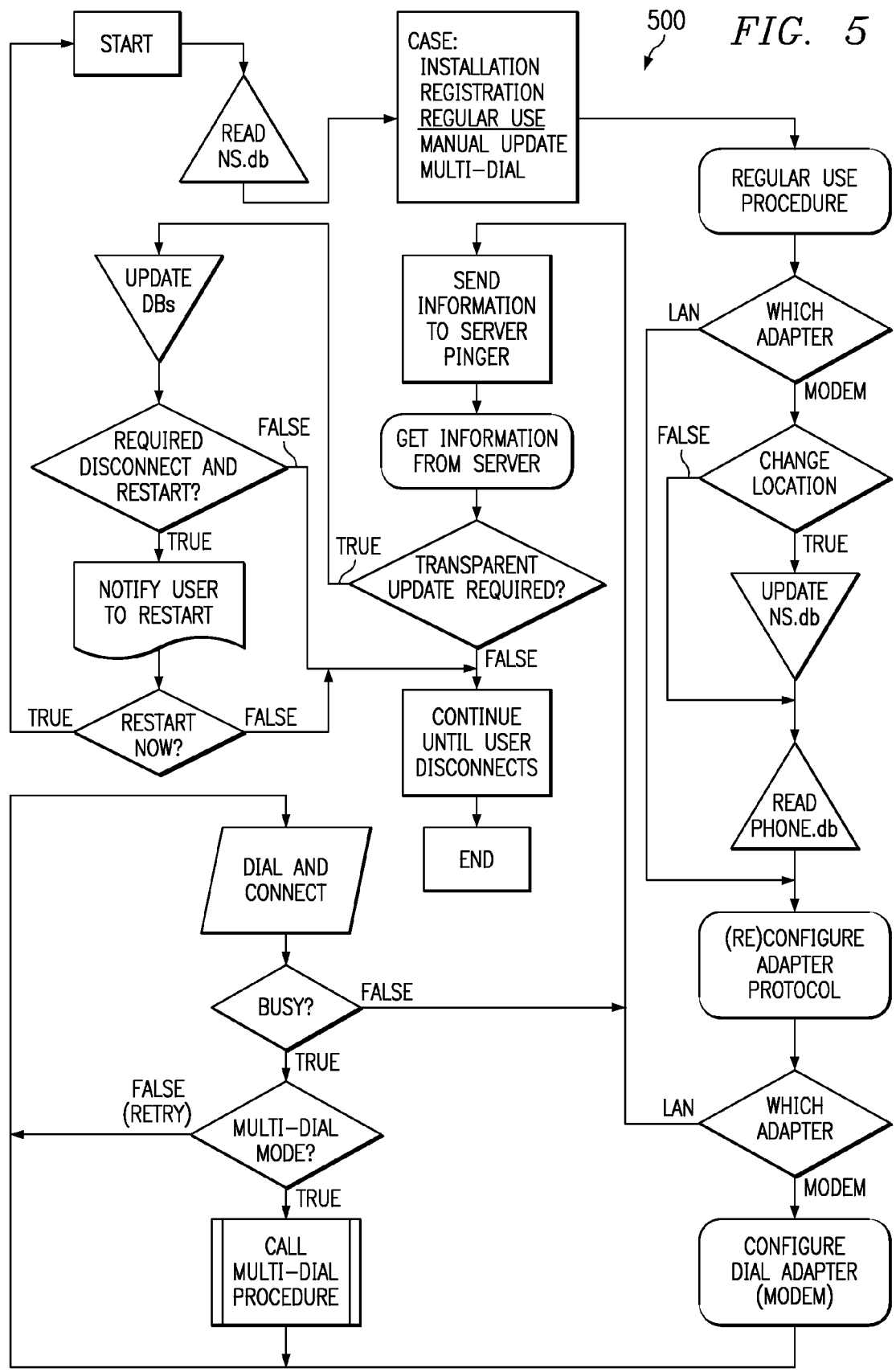
FIG. 5 illustrates a flow diagram of a regular use procedure of the client dispatch application.

Now referring to FIG. 5, there is illustrated a flow diagram of a regular use procedure 500 of the client dispatch application 200. The regular use procedure 500 is enabled after a user 110 has both installed client dispatch application 200 on a particular computer system or other network access device and registered with the access service 106.

The regular use procedure 500 functions to connect a user 110 to the network 100 using a login and password access which is transparent to the user 110. This is accomplished by reading the network services database 206 for login information such as the user PAP ID and PAP password as shown in the "Read NS.db" block. After reading the necessary information from the network services database 206 and prior to the user 110 logging onto the network 100, the user 110 is given an opportunity to change the user's dial-in Location if the user 110 is using a modem as an Adapter, as illustrated by the "Change Location" decision block. If the Adapter is a modem, and the user 110 desires to change locations, the user 110 is presented with a "chooses a location" form that may be identical to one seen by the user 110 during registration. The "chooses a location" form allows the user 110 to select a local dial-in location from pull down menu selections based on Country, State or Province, and City selections for a given ISP 102 for which the user PAP ID and PAP password are valid. After the user 110 selects the proper dial-in to location, the phone database 204 is read to determine what dial-in phone number to use.

If a given location has multiple dial-in phone numbers, a dial-in number is selected based upon attributes that are read from the phone database 204, user db, network services database 206 or any combination thereof as part of the "Dial & Connect" block. As discussed elsewhere, and in particular in connection with FIG. 3, such attributes include Installation dial-in numbers (dial-in phone numbers which are only available during Installation or testing), Registration Dial-in Numbers (phone numbers and locations which appear to a user 110 during registration), Sequence Numbers (a prioritized list of phone numbers which shall be tried in sequential order to produce the highest probability of connection), Available ISP numbers (phone numbers of a given ISP's modems), Currently Valid Numbers (phone numbers which are currently valid for use by a given user 110), or any combination of the aforementioned.

After the user 110 establishes a connection to the access service 106, a "pinger" function is initiated as discussed previously. The pinger function causes the client dispatch application 200 to transmit header information to the access service 106, as set forth in the "Send Information To Server (Pinger)" block. The header information may include a Unique Identification string for the user (user ID, PAP ID, etc.), a unique computer identification string (IP address, etc.), time stamp information, and revision information for the client dispatch application 200 and databases 204, 206, 208, 210, as described earlier. After receipt, the access service 106 reviews the header information to determine what, if any, updates are required to be made to the user client's dispatch application, databases, or network access devices operating system. Such updates may include: new dial-in locations, new identification information such as PAP IDs, network authentication passwords such as PAP passwords, other IDs, other passwords, change of phone numbers, change of area codes, low cost ISP, dial-in location priority sequence numbers, or any combination thereof, or any other information relating to gaining access to the ISP 102. If any updates are required, these are supplied by the access service 106 and any necessary updates will take place transparent (automatic while the user 110 is logged on) to the user 110 as part of the "True" process path emanating from the "Transparent Update Required?" decision block. If such updates require user intervention, such as rebooting the user's computer, the user 110 will be notified prior to the update and/or prior to a reboot as part of the "Notify User to Restart" block. Updates which require a lot of time, may span multiple log-ins (to the network 100) by the user 110 with partial updates being performed until the full completion of the update. The partial updates will take place when the user's system is connected but idle and/or during a "pinger/heartbeat" function.

Figure 6:
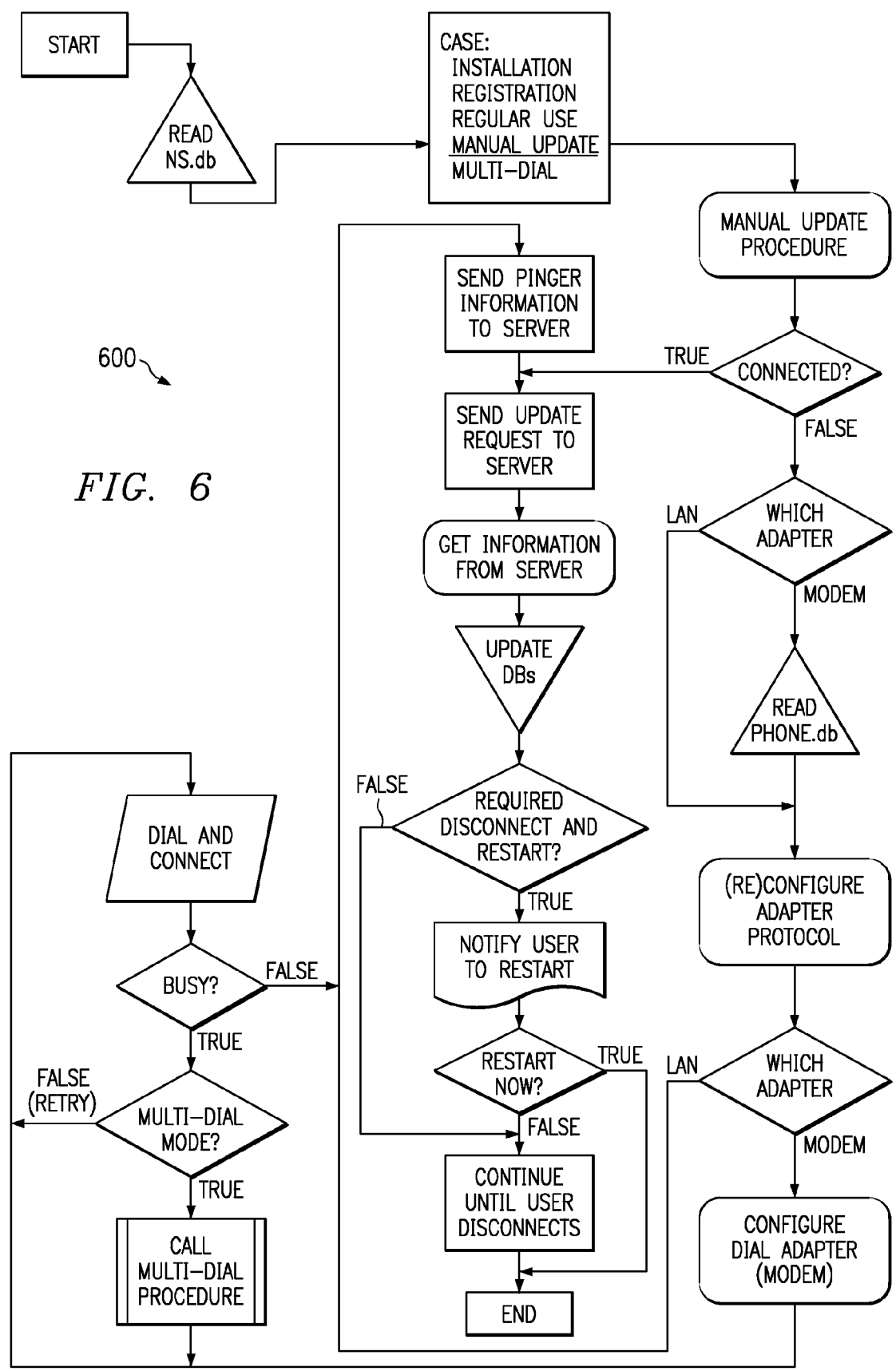
FIG. 6 illustrates a flow diagram of a manual update procedure of the client dispatch application.

Now referring to FIG. 6, there is illustrated a flow diagram of a manual update procedure 600 of the client dispatch application 200. The manual update procedure 600 provides a mechanism for a user 110 to manually recover, change, modify or update the client dispatch application 200 and the databases 204, 206, 208, 210. This capability is useful for ISPs 102 managing customers with billing issues, as well as for servicing customers with special system configuration issues.

The manual update procedure 600 initiates and makes a network connection using a special set of log-in information defined herein as the "Manual Update PAP ID and PAP password" (the manual update PAP ID and PAP password, including the Installation, Multi-dial and Test PAP IDs and PAP passwords are incorporated into the user's installed client dispatch application 200 as part of the network services database 206 and are not easily accessible to the user 110). If a connection is not immediately obtained, the adapter and protocol checking is completed as set forth in connection with the previous Figure (and description thereof) and as set forth in this flow diagram, via the "False" path output of the "Connected?" decision block. Once the connection is established, either via the "LAN" path from the "Which Adapter" decision block or the "False" path from the "Busy?" decision block, the "pinger" function is initiated as indicated by the "Send Pinger Information to Server" block. If there already is a connection, the "True" path is followed from the "Connected?" decision block.

Once communication is established by the client dispatch application 200 with the access service 106, pinger header information, any special database update request, and the like, etc. is transmitted from the client dispatch application 200 (generated from the network services database 206 and/or the user database 210) to the access service 106, as shown by the "Send Update Request to Server", in order to establish the identity of the user 110 and system that is requesting an update of information from the access service 106. The access service 106 uses this update request information to generate any updated information which is needed to update a specific user 110, group of users, a specific network access device such as the computer, a group of computers, or any combination thereof and sends any required information back to the user 110 to update the appropriate databases 204, 206, 208, 210 or Registry or INI, Adapter, and/or Protocol files 212, 214, 216 (operating system files). Upon completion of the update, the client dispatch application 200 disconnects the user 110 from the network 100 (breaks the network connection) and if appropriate, the user 110 will be notified that the network access devices operating system must be rebooted in order for the update to take effect.

Figure 7A:
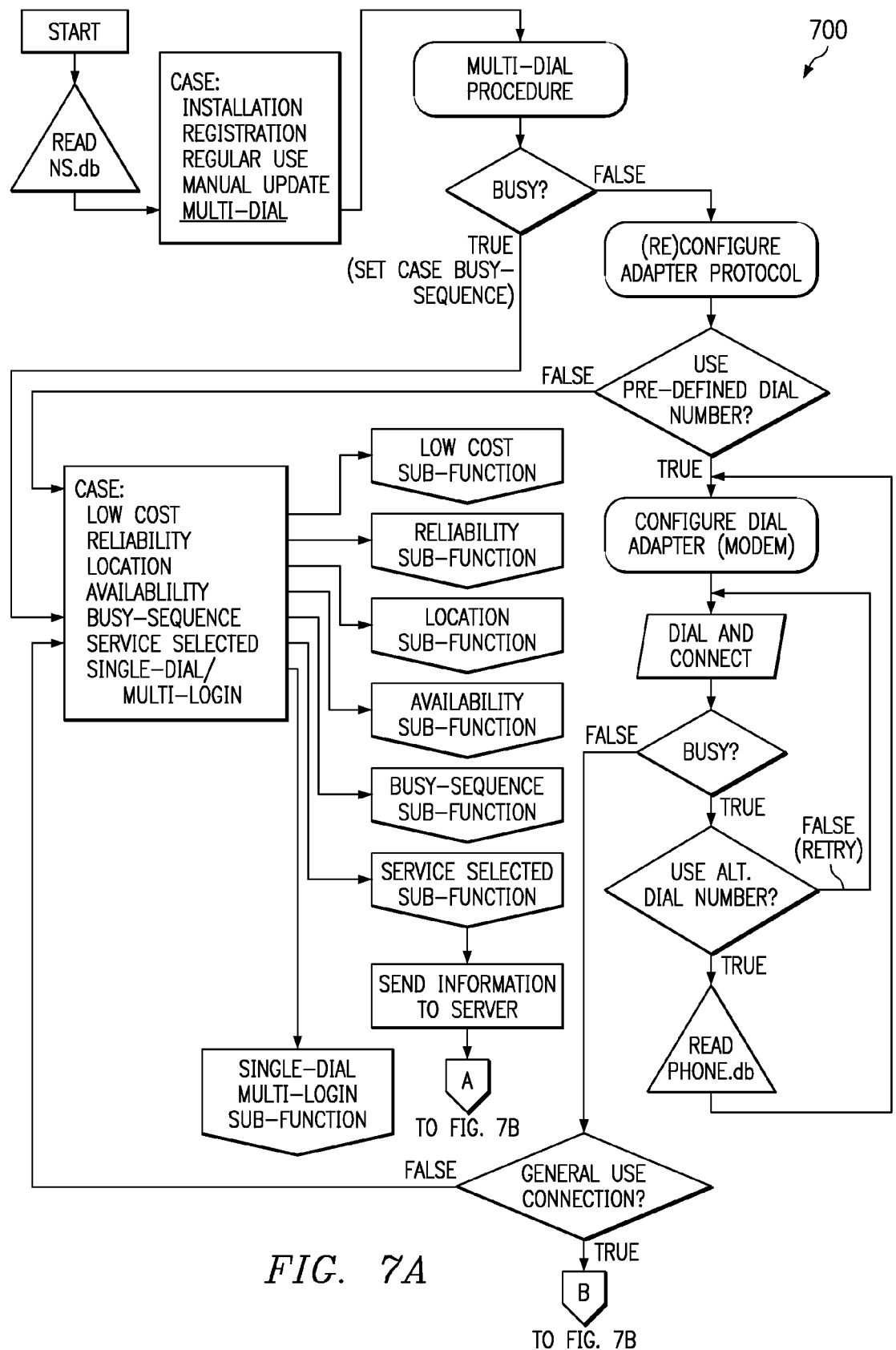
FIGS. 7A and 7B illustrate a flow diagram of a multi-dial procedure of the client dispatch application.
Figure 7B:
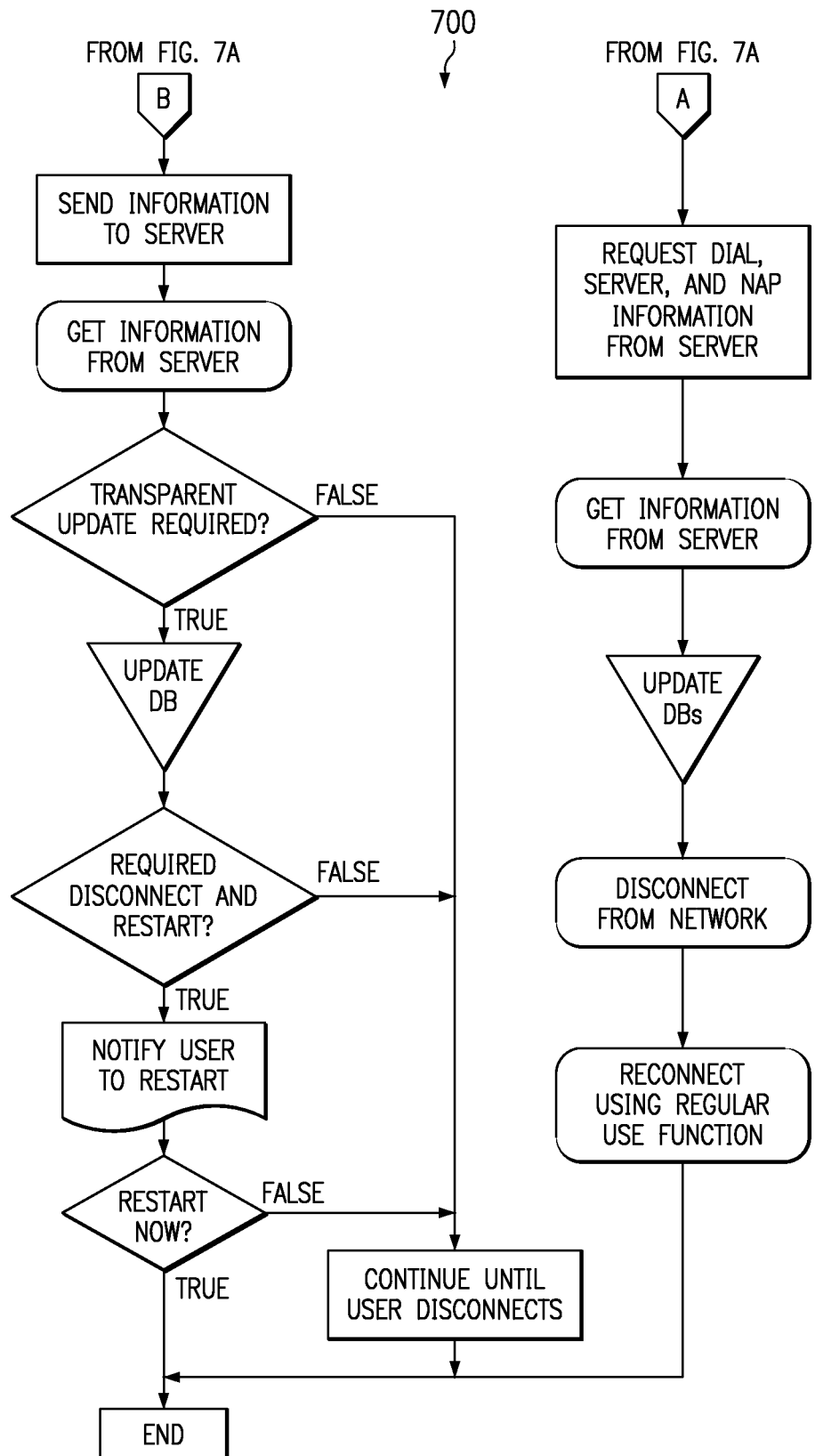

Now referring to FIG. 7, there is illustrated a flow diagram of a multi-dial procedure 700 of the client dispatch application 200. The multi-dial procedure 700 provides the access service 106 with a mechanism to control access by a user 110, a group of users, a computer, a group of computers, a local area network (LAN) of computers, or any combination thereof, to the Internet 100, based upon any one of the following seven sub-function attributes: Cost, Availability, Reliability, Location, Busy-Sequence, Service Selected, or Single Dial/Multi-Login. The multi-dial procedure 700 is initiated by one of the other primary procedures 300, 400, 500, 600 (see FIGS. 3 through 6) of the client dispatch application 200 and/or by a multi-dial procedure tag programmed into the network services database 206.

When the multi-dial procedure 700 is initiated in response to a busy signal received during operation of one of the other primary procedures 300, 400, 500, 600 and the multi-dial procedure tag is enabled in the network services database 206, the multi-dial procedure 700 initiates a Busy-Sequence sub-function. The Busy-Sequence sub-function initiates one of the other multi-dial procedure sub-functions, re-dials the same dial-in number before initiating one of the other multi-dial procedure sub-functions, or dials a new dial-in number identified in the next sequential "area" location from a list of area locations available, all in response to database information based on the user's selected plan. The list of "area locations available" is based on the type of service plan (also found in the network services database 206) subscribed to by the user 110 and/or on PAP IDs and PAP passwords stored in the network services database 206. If the user 110 has chosen to subscribe to a higher cost plan, multiple PAP IDs and PAP passwords for multiple ISPs 102 may be stored in the network services database 206 (certain locations may to only have a single ISP). As a result, a list of available dial-in locations may contain one or more dial-in numbers from one or more ISPs 102. Alternatively, multiple ISPs 102 may have PAP ID and PAP password sharing agreements allowing a single user PAP ID and PAP password entry in the network services database 206 to generate a dial-in location list from multiple ISPs 102. In any case, the Busy-Sequence sub-function sequentially attempts to make a connection to an ISP 102 at each location until either a successful connection is made or the user 110 aborts the connection attempt.

When the multi-dial procedure 700 is initiated for any reason other than a busy signal, the client dispatch application 200 reconfigures or reinstalls the system configuration adaptor and protocol information necessary for network connection. Thereafter, based on data in network services database 206, it is determined whether or not to initiate a connection attempt to the Internet 100 using a pre-defined dial-in number or location. If a connection is desired using a predefined dial-in number or location, the multi-dial procedure 700 uses one of four types of possible PAP IDs and PAP passwords. These types are defined as a "multi-dial PAP ID and PAP password", a "group PAP ID and PAP password", a "user PAP ID and PAP password", and a "test PAP ID and PAP password."

When both the "pre-defined dial-in number" entry and a "General Use" entry are enabled in the network services database 206, a general use connection to the Internet 100 is established using either the "group PAP ID and PAP password" or the "user PAP ID and PAP password." When the "pre-defined dial-in number" entry is enabled and the "General Use" entry is disabled, then the multi-dial procedure 700 establishes a connection to the Internet 100 using either the "multi-dial PAP ID and PAP password" or the "test PAP ID and PAP password". In either case, the user's 110 dial adaptor (modem) is configured with the ISP-specific access information associated with the predefined dial-in number. After proper configuration, the client dispatch application 200 automatically dials and attempts connection to the ISP 102. If the line is busy, it is determined whether an alternate dial-in number should be used. If an alternate number is not to be used, the dial and connect is retried with the previous dial-in number. If an alternate number is to be used, the alternate dial number is read from the phone database 204 and the user's dial adaptor (modem) is configured with the ISP-specific access information associated with the alternate dial-in number.

Upon successful connection, if the connection is not a "general use" connection, the Service Selected sub-function is initiated (a double dial procedure). If the connection is a "general use" connection, the client dispatch application 200 transmits pinger header information to the access service 106. In response, the access service 106 transmits information to the user 110 (client dispatch application 200). The multi-dial procedure 700 determines from this received information whether a transparent update is needed (i.e., update information in the database(s) without user 110 intervention). If so, the client dispatch application 200 updates the database(s) and determines whether a disconnect is required. If not, the user 110 continues regular use until disconnected by some other means. If so, the user 110 is notified and may be given the option to choose to disconnect or may be forced to disconnect.

If after a connection is made and the user 110 has used a PAP ID and PAP password that is used by another in order to establish the user 110 connection, then the access service 106 updates the user's database(s) (possibly with a new and valid PAP ID and PAP password) and the client dispatch application 200 either disconnects the user 110 (and notifies the user 110 that the PAP ID is not valid) or allows the user 110 to stay connected (if the user 110 has received a new and valid PAP ID). This particular process also applies to the regular use procedure 500 (see FIG. 5).

In the preferred embodiment, when a "pre-defined dial-in number" entry in the network services database 206 is disabled, then the multi-dial procedure 700 executes one or more of the seven sub-functions in response to entries in the network services database 206.

The Service Selected sub-function reads pinger header information from the network services database 206 and the user database 210 and sends this information in a data message to the access service 106 (to the network server/database 220). The access service 106 uses the information to generate database updates (including new PAP ID, etc.) which may or may not assign, reassign, or update ISPs 102, dial-in locations, PAP IDs and PAP passwords, dial-in numbers, network routing information, Adapters, Protocol, or any other information stored in the to databases 204, 206, 208, 210. Such database updates are then transmitted to the user 110 and the client dispatch application 200 to update the appropriate database 204, 206, 208, 210. After the database information is updated, the user 110 is disconnected, and the Regular Use primary procedure 500 is initiated using the updated information received from the access service 106.

The "Low Cost" sub-function obtains information from both the network services database 206 and the phone database 204 and determines which ISP 102 and what locations (dial-in phone numbers for local access) have the lowest priced service for a given user's dial-in location. The lowest cost sub-function next determines if the user's PAP ID and PAP password stored in network services database 206 are valid (compare the current user's PAP ID and PAP password with the user's currently selected dial-in location) for the ISP 102 that provides the low cost connection point-of-presence at the user's location. If the user PAP ID and PAP password are valid, the network connection sequence will dial and connect as described in the regular use procedure 500. If the user PAP ID and PAP password are invalid then this sub-function will initiate the manual update procedure 600 requesting from the access service 106 a valid user PAP ID and PAP password for the ISP's 102 dial-in network at the user 110 selected location. Then, the network connection sequence will dial as described in the regular use procedure 500.

The "Reliability" sub-function obtains information from both the network services database 206 and the phone database 204 and determines which ISP 102 and what locations (dial-in phone numbers for local access) have the highest reliability of connecting the user 110 to the Internet 100. This determination is based upon prior data (reliability data) transmitted to the client dispatch application 200 from the access service 106 that is used to update the user databases. This data transmission occurs during a previous session when the user 110 is connected to the Internet 100. The reliability data is transferred by the access service 106 to the users 110 who have a reliability entry enabled in their network services database 206. The reliability sub-function next determines if the user PAP ID and PAP password stored in the NS.db are valid (compare the current user's PAP ID and PAP password with the user's 110 currently selected dial-in location) for the ISP 102 that provides the highest reliability at the selected location. When the user PAP ID and PAP password are valid, the network connection to sequence will dial and connect as described in the regular use procedure 500. When the user PAP ID and PAP password are invalid, then this sub-function will initiate the manual update procedure 600, as described in connection with FIG. 6, requesting from the access service 106 a valid user PAP ID and PAP password for the ISP's dial-in network at the user selected location. Then, the network connection sequence will dial as described in the regular use procedure 500 of FIG. 5.

Reliability refers to the ability to reliably connect on a first or second attempt (availability) and the ability to stay connected for a substantial period of time without disconnection, due mainly because of line noise problems, faulty equipment, etc. (integrity). Availability information used to determine availability of various ISPs 102 (and dial-in numbers) may include at least three types of information. The first type of information includes availability information that is received by the access service 106 from the ISPs 102 themselves (typically updated periodically). The second type of information includes information in a client histogram (client specific) that is generated by the client dispatch application 200 of the user 110. Over an extended time during which the user 110 makes more and more connections to the Internet 100 (via an ISP 102), the client dispatch application 200 keeps track of the times a connection is made on the first try, second try, etc. for each dial-in phone number (and/or ISP 102) used by the user 110. From this, a client-specific histogram is generated that contains information about the past history of the user's 110 connections. The third type of information includes information in a server histogram that is generated by the access service 106. The access service 106 tracks and stores information relating to all ISPs 102 and dial-in numbers regarding past history connections. See also, the description set forth below in the availability sub-function description. As will be appreciated, the reliability sub-function may use any one of the types of availability information, or combination thereof, for determining the dial-in number (or multiple numbers in priority) that will provide the user 110 with a high reliability connection.

With respect to the integrity information used to determine the integrity of the various ISPs 102 (and dial-in numbers), there are at least two types of information. The first type of information includes information received via technical support inquiries to the access service 106 by the users 110. If the access service 106 receives a call (or calls) from users 110 regarding faulty lines and/or premature disconnects, this information can be tabulated and stored for determining integrity. Since the access service 106 stores data relative what ISP(s) 102 (and dial-in number(s)) a particular user 110 has been using (through information in the access service 106 database gained through the pinging or heartbeat process—described earlier), the access service 106 can determine which ISP(s) 102 (and/or dial-in number(s)) have relatively high and/or low integrity. In response to this information, the access service 106 can update the user's 110 databases with this information. The second type of information includes information automatically gathered by the access service 106 that includes a history of the number of users 110, how long each has been connected, and what ISP(s) 102 (and/or dial-in number(s)) to which each user 110 has been connected (through information in the access service 106 database gained through the pinging or heartbeat process described earlier). The access service 106 can transmit the integrity data to the user 110 for use by the reliability sub-function of the client dispatch application 200. As will be appreciated, the reliability sub-function may use any one of the types of integrity information, or combination thereof, for determining the dial-in number (or multiple numbers in priority) that will provide the user 110 with a high reliability connection.

From a combination of the availability information and the integrity information, the reliability sub-function determines the dial-in number (or multiple numbers in priority) that will provide the user 110 with high reliability connection.

The "Location" sub-function obtains information from the phone database 204 and determines all the dial-in phone numbers available to a user 110 from a selected location. The location sub-function generates a list of "surrounding area" locations into which user 110 may dial. The user 110 then selects a dial-in number from this list. The location sub-function next determines if the user PAP ID and PAP password stored in the network services database 206 are valid (compare the current user's PAP ID and PAP password with the user's currently selected dial-in location) for the ISP 102 in which the user's 110 computer will dial into the selected location. When the user PAP ID and PAP password are valid, the network connection sequence will dial and connect as described in the regular use procedure 500. When the user PAP ID and PAP password are invalid, this sub-function will initiate the manual update procedure 600 requesting from the access service 106 a valid user PAP ID and PAP password for the ISP's 102 dial-in network at the user 110 selected location. Then, a network connection sequence will dial as described in the regular use procedure 500 of FIG. 5.

The "Availability" sub-function generates a dial-in location (number) list based upon user PAP IDs and PAP passwords stored in the network services database 206 and the type of service plan (also found in the network services database 206) to which a user 110 has subscribed. If a user 110 has chosen to subscribe to a higher cost plan, multiple PAP IDs and PAP passwords for multiple ISPs 102 may be stored in the network services database 206. Accordingly, the list of available dial-in locations may contain one or more (multiple) dial-in numbers from one or more (multiple) ISPs 102. Alternatively, multiple ISPs 102 may have PAP ID and PAP password sharing agreements allowing a single user PAP ID and PAP password entry in the network services database 206 to generate a dial-in location list from multiple ISPs 102.

As will be appreciated, the availability sub-function utilizes the same type of availability information as described above in the reliability sub-function.

The availability sub-function utilizes one or more methods or the service selected sub-function to increase the probability that the user 110 at a given location will successfully connect on the first try. This functionality is based upon historical data (Histogram data) or real time data supplied by an ISP 102 to the access service 106. The historical data may include two types of data—Client Histogram data or Server Histogram data. To accomplish the availability function, the Server Histogram data, Client Histogram data, or the service Selected sub-function is utilized, or any combination thereof is utilized, as desired.

The Client Histogram data is based upon connection history of the user 110. The Client Histogram data is not as beneficial, as other data, until a particular user 110 has consistently established a network connection (to the Internet 100) for a period of time sufficient to create a meaningful histogram. It has been determined that a period of at least ninety days is sufficient if a user 110 accesses regularly. After a sufficient period of time, a Client Histogram can be built to determine the probability of success of the user 110 connecting to the network 100 the first time. This minimizes the necessity of having the client dispatch application 200 perform a second dial-attempt to connect to the network 100.

The Server Histogram data is based upon the connection history of each particular ISP 102 and its dial-in numbers. This information is stored in the access service 106 in response to the monitoring of all the users 110 (through the "pinging" process). The Server Histogram data is transmitted to the user's network services database 206 upon any connection to the network 100 when the availability sub-function is enabled within the client dispatch application 200.

In the preferred embodiment, the Server Histogram data is normally used in conjunction with the Client Histogram data (when appropriate) to determine the highest probability of success of connecting to the network 100 without a second dialing attempt. Accordingly, upon the user 110 initiating a connection to the network 100, the client dispatch application 200 automatically selects a dial-in phone number that it has determined to have a high probability of success for connection. Thus, the Client Histogram data and the Server Histogram data are used to facilitate a statistical approach to determine the highest probability of a user 110 connecting to the network 100 on the first attempt.

However, there may be times when a user 110 desires a very high confidence (near 100% or 100%) connection, or the Histogram data is not desired to be used, such as when the data for a particular area is unreliable (i.e. certain geographic areas may have insufficient telecommunications infrastructure that may skew the data) and therefore possibly useless. In these cases the service selected sub-function is initiated and a "double dial" process takes place (see FIG. 7 and the description of service selected sub-function). In the service selected sub-routing, availability information of ISPs 102 is used by the access service 106 to give the user 110 a dial-in number that is available. This availability information for the ISPs 102 is periodically transmitted or given to the access service 106, typically every five minutes. The "double dial" process is also exemplified in FIG. 7 and the accompanying text.

The last sub-function of the multi-dial procedure 700 is the "Single-dial Multi-Login" sub-function. Initiation of the single-dial/multi-login sub-function requires a "multi-dial" attempt only when the user 110 receives a busy signal; otherwise this sub-function is a single-dial function with a multiple PAP ID and PAP password assignment/reassignment function. This function (the assignment/reassignment) requires that all users (client) 110 authentication for all ISPs 102 happens at the access service 106 (i.e., all authentication for all ISPs 102 is centralized) or at a centrally located database point. Thus, this function works with multiple ISPs 102 when each allows user authentication to take place at a centrally located server independent of each ISP's 102 own user authentication server. For example, an ISP 102 that has its own Authentication Server, and who resells the underlying ISPs modem access to a user 110, may support this function by allowing a user 110 to dial and connect using an "Initial Access PAP ID and PAP password", then assigning a unique session PAP ID and PAP password and "re-logging" into the Authentication server without disconnecting the user 110. This eliminates the time that would otherwise be required to disconnect and re-dial using a newly assigned PAP ID and PAP password.

The client dispatch application 200 also functions to provide users 110 with network identity anonymity. That is, the architecture of the client dispatch application 200 provides anonymity for users 110 during access to the network 100 as IDs and passwords (such IDs and passwords would include PAP IDs and PAP passwords, Email IDs and Email passwords, NEWS IDs and NEWS passwords, FTP and Web Space IDs and passwords, and custom network application IDs and passwords) can be dynamically reassigned for a given user 110, a given system, a given group of users, a given group of systems, or any combination thereof. Thus, if a user 110 has three computer systems (A_Computer, B_Computer, and C_Computer) each requires a unique user/system identification which is generated during installation and registration and stored in the client's network services database 206 and/or the user database 210. This unique user/system identification allows the access service 106 to maintain unique and independent IDs and passwords for the user/system pair. Thus, when a user 110 connects the A_Computer to the network, unique IDs and passwords which may be distinctly different from the B_Computer and C_Computer's IDs and passwords (stored in the network services database 206 and/or the user database 210) may be used to transparently log the user 110 into such things as the network, Email, FTP/Web Space, NEWS groups, Bulletin Boards, or any other application requiring login identification and password. Thus, the architecture supports single life IDs and/or passwords for all network and application logins.

Figure 9:
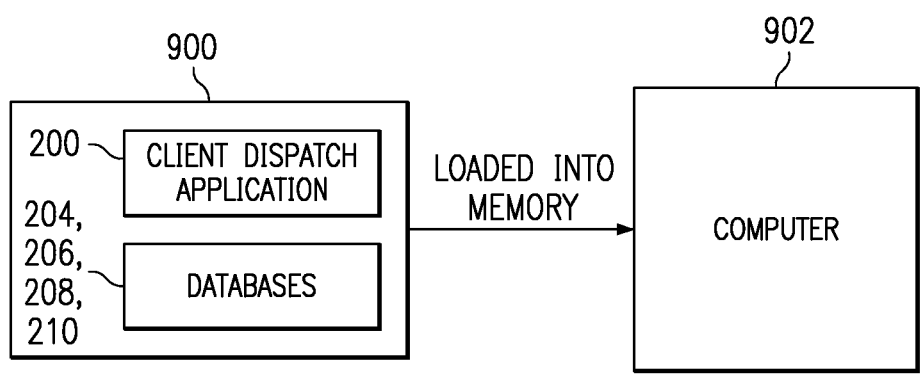
FIG. 9 is a block diagram of a storage medium comprising the client dispatch application for causing a computer to function in accordance with the present invention.

Now referring to FIG. 9, there is illustrated a block diagram of a storage medium 900 and a computer 902. The storage medium 900 includes client dispatch application 200 (computer program) and may also include the databases 204, 206, 208, 210. The computer 902 also includes a means (not shown) for reading or downloading the client dispatch application 200 (computer program) into the computer 902 to cause the computer 902 to perform one or more steps in accordance with the principles of the present invention. As will be appreciated, the storage medium 900 may include a floppy or hard disk, magnetic or optical taps; or any other data storage medium known presently or developed in the future for storing a computer program, such as the client dispatch application 200 of the present invention.

As will be realized by those skilled in the art of email (electronic mail) sent between parties on a network, email is typically held in a post office box type storage facility at the recipient's ISP 102 until retrieved by the recipient. However the ISP 102 typically keeps a copy of the email for a period of time after receipt thereof for various purposes. Many people have the technical capability to access and read these stored messages at the ISP 102. Even where the message body is encrypted, considerable information may be gleaned over a period of time by keeping track of who is sending messages to whom, the frequency of messages to given parties and data gleaned from the subject matter portion of the header.

The structure of the present invention combined with an email program, software plug-in for a standard email program or browser lends itself to a method of minimizing the possibility of unauthorized gleaning of information from email and further minimizes the possibility of spamming where spamming is defined as the sending of large amounts of email to a given recipient for harassment like purposes.

One way to minimize the gleaning of information is to send all mail through a third party to recipients. The third party acts as a trusted banker or broker. Such an operation is shown diagrammatically in FIG. 10 where the sender sends the email to a Broker. The broker repackages email as deemed appropriate by agreement with the sender and/or the recipient and sends it on its way. The simplest form is to merely place the entire original message including header information in message body of the email and send the package to the recipient with the recipient also listed as the sender and placing an innocuous subject in the visible header.

A next level of security is for either the sender or the broker or both to encrypt the package sent by that party to the next party. This could result in double encryption of the message body. Similar plug-in software comprising part of the recipient's email program, software plug-in for a standard email program or browser may be used to decipher the received package and the original email would then be recreated for reading by the recipient. The deciphering may be accomplished by keys transmitted by the pinger entity to the recipient's software. As part of this next level of security, the email sent to the broker or third party in a preferred embodiment of this invention has the TO and FROM portions of the visible header listing the broker, has the subject changed to innocuous data and the entire original message encrypted as shown in the drawing.

FIG. 11 presents the above process in a slightly different format where a row labeled 1010 illustrates the original message composed by the sender. Either the sender of the plug-in software may then provide a first level of encryption to the data as shown in row 1012. Transparent to the user 110, the plug-in software then repackages the original message by encrypting the entire message and generating a new header with the third party (here the third party is listed as NetSafe) listed as both the sender and the recipient. The email sent to the broker is labeled 1014. Since the broker is in contact with the data bases in the plug-in software via the pinger entity, the broker may decipher to second layer of encryption to determine the destination address. The broker may then re-encrypt and send the email 1018 if the recipient is also a client of that broker and/or has similar plug-in software in contact with a network pinger. Otherwise, the originally composed, and possibly encrypted, message is sent to the recipient as shown by the labeled message 1020

Figure 12:
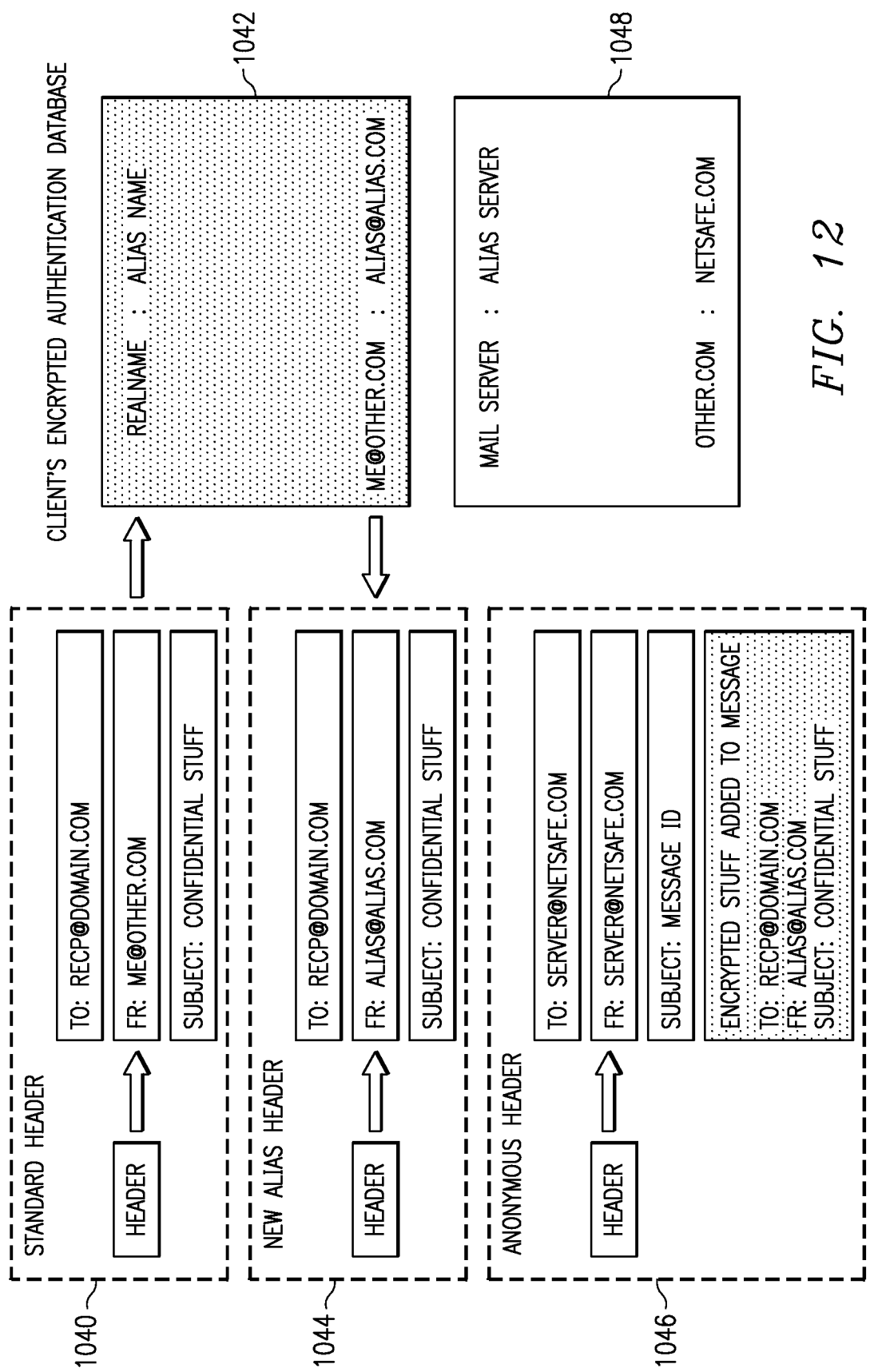
FIG. 12 shows details of sender plug-in software process for email transmission that is more secure than that shown in FIG. 11.

There may be times that the sender of email may not want the recipient to know the sender's true identity or even the network service provider of the sender. Alternatively, the sender may wish to use different aliases or names for different classes of email contacts so that the sender may quickly sort incoming mail into a set of priority stacks. Further the recipient of email in a system using the present invention may have similar requirements. FIG. 12 illustrates a second order anonymity header process for email transmission.

In this figure a block 1040 represents a standard header of email composed by the sender. When the sender has completed the email and posts it, the sender's email program, software plug-in for a standard email program or browser plug-in intercepts the email and checks the appropriate database. It is determined in block 1042 that for identity "me@other.com" the address "alias@alias.com" should be used. The plug-in software thus creates a new header in substitution for the one composed by the sender and encrypts the entire message including the altered header as shown in the lower portion of block 1046. The software then consults the database represented by block 1048 and determines that the most recent data received from the pinger entity suggests that the network service provider to be used for "other.com" in this instance should be "netsafe.com". Accordingly, a new anonymous header is prepared in accordance with that shown in block 1046 before the message is forwarded to a third party for retransmission to the recipient.

Figure 13:
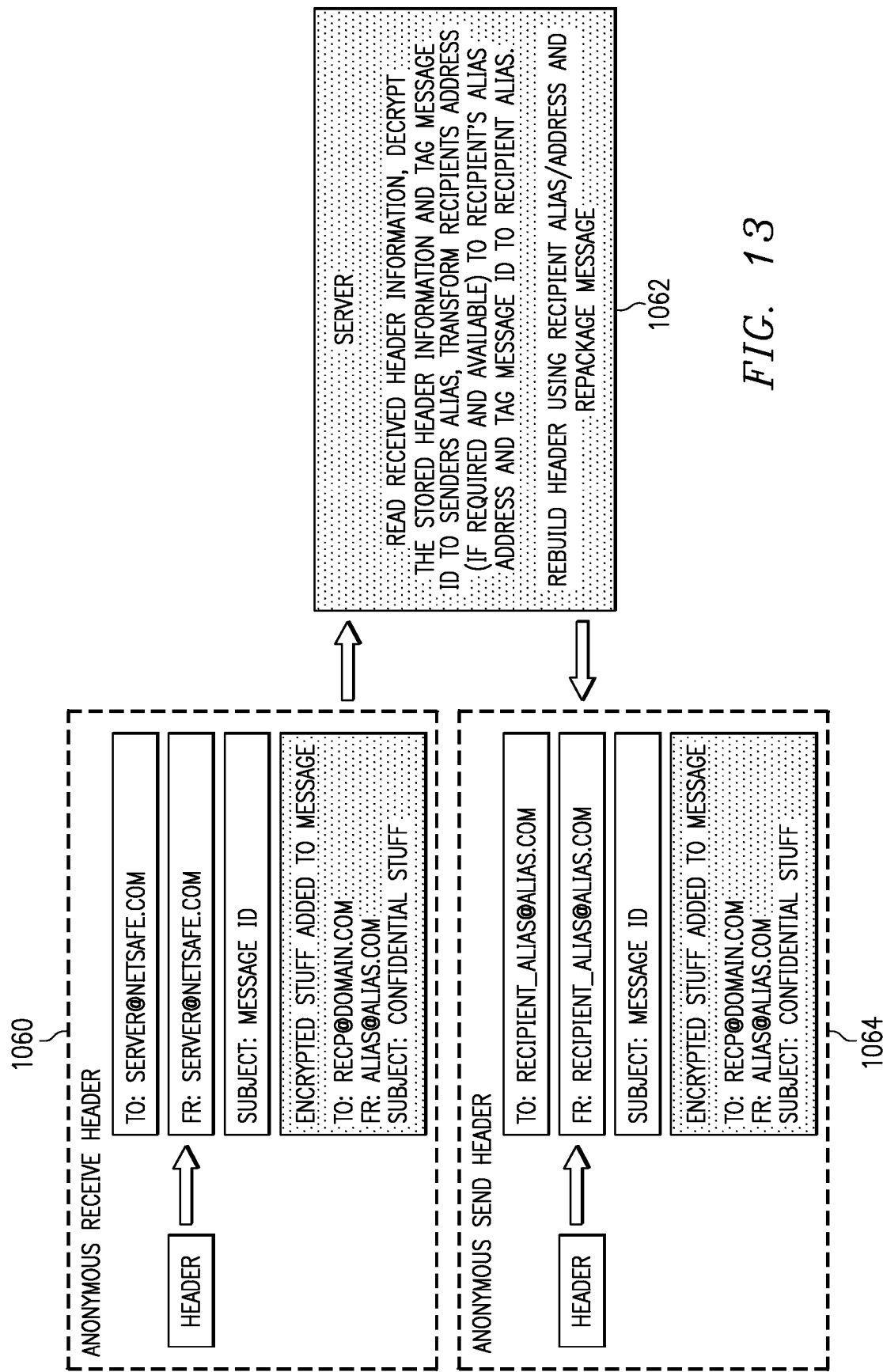
FIG. 13 shows details of the process of FIG. 12 at a third party site.

As shown in FIG. 13, the third party or broker receives the email as represented by block 1060 where 1060 is identical to block 1046. The software in the server of the third party, as set forth in block 1062, decrypts the stored header information after noting the form of the visible header information. It is able to do so because the pinger entity that determines the encryption code to be used in the senders encryption process and provides the senders database with the third party to be used, also informs the third party the encryption code to be used for deciphering. This code may be part of the visible message id or may be inserted in the server database of that specific third party. If the recipient has signed up for anonymity service, the server will retrieve from its database a presently assigned alias for the recipient. Whether or not an alias is used for the recipient, the third party server will rebuild the header using an address for the recipient in both the TO and FROM portions of the visible header as shown in block 1064.

Figure 14:
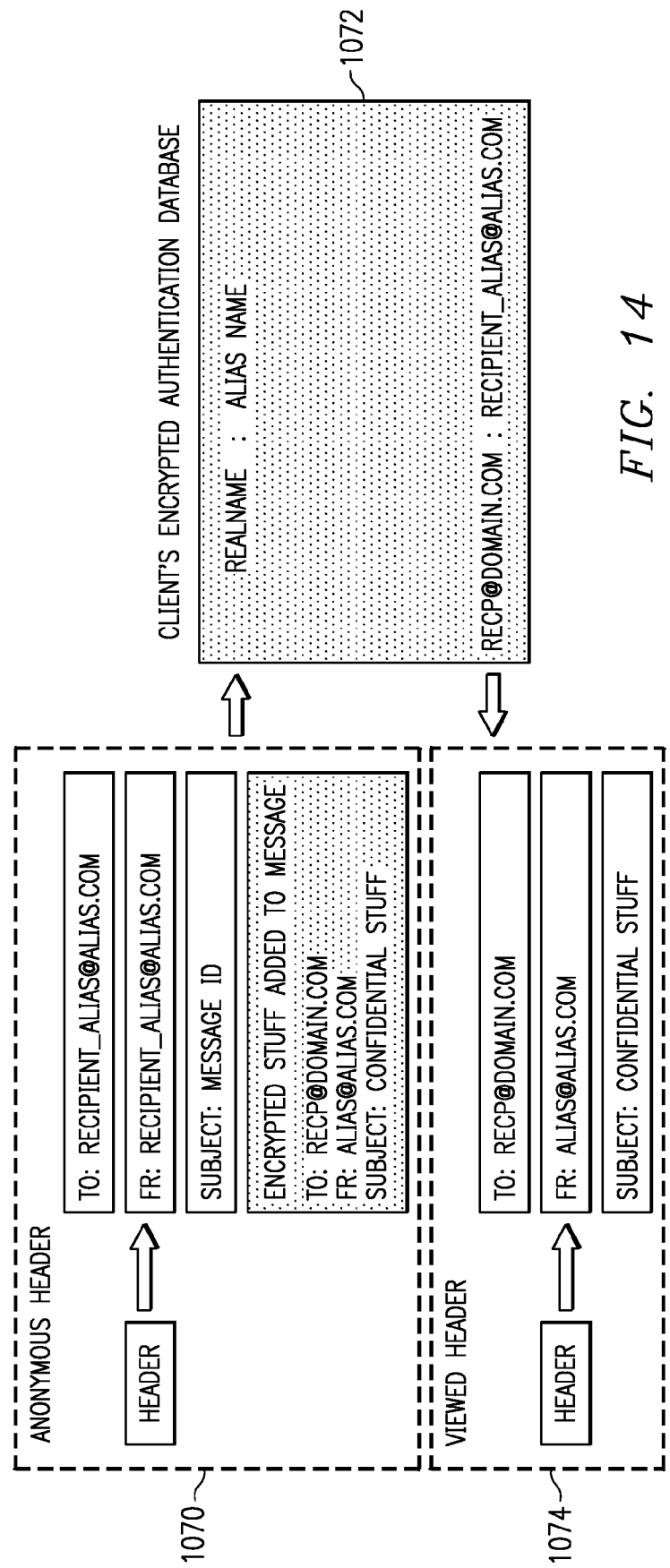
FIG. 14 shows details of the process of FIG. 12 at a recipient site.

FIG. 14 presents a block 1070 representing a received email as retrieved from the server storing email for alias.com. This message is identical to the previously designated block 1064. The recipients software checks the database and in accordance with block 1072 deciphers the message and creates the viewable header set forth in block 1074.

Figure 15:
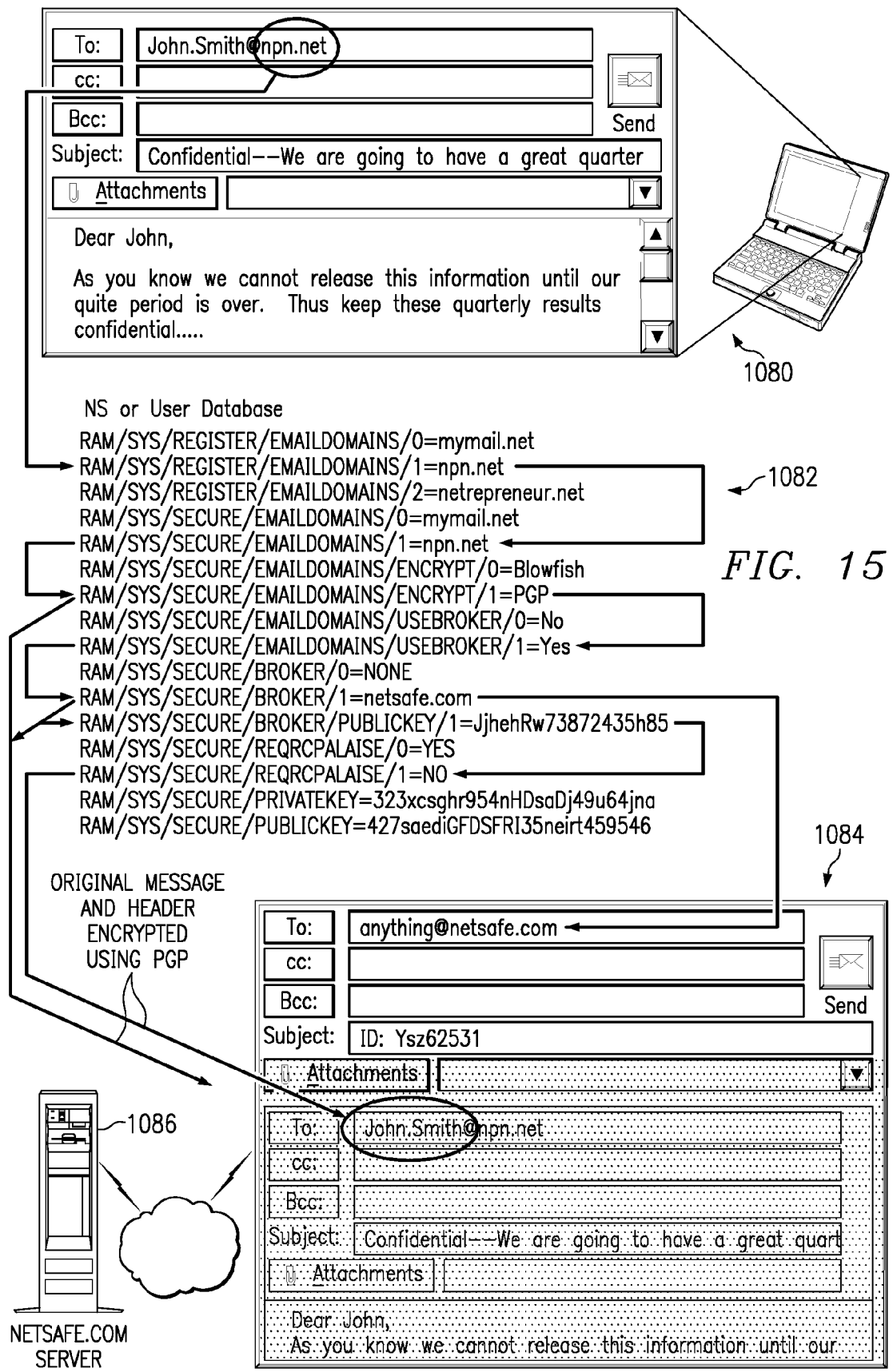
FIG. 15 shows the process of FIG. 12 as applied to a changeable internal database.

FIG. 15 shows a sender composed message designated as 1080 and a partial representation of an Internet device database such as a sender computer stored database 1082 along with a revised message 1084 wherein block 1084 corresponds with previously designated block 1046 in FIG. 12. The software checks the database and notes the subscript 1 for the server listed as "npn.net" in the registered email domain portion of the database. The same subscript is checked under the SECURE/EMAILDOMAIN portion to determine whether or not to encrypt the message, the encryption code whether or not to use a third party and if so the address to be used. As may be observed by the arrow lines, for npn.net, a PGP encryption is to be used, a broker is to be used and the broker listed with a subscript "1" is "netsafe.com". Thus "netsafe.com" is inserted in the visible header of the message shown as 1084. The database also specifies the public key to be used for the encryption and deciphering processes. The NO in the third to the last line of the illustrated database 1082 provides an indication that the sender wants the recipient to be advised of the sender's name as composed on his computer. This is in contradistinction to that shown in FIG. 12 previously. When the server 1086 receives the message 1084, it will consult a database similar to that illustrated as 1082 and perform the functions set forth in FIG. 13.

The generation of software for intercepting a message, consulting a database, altering header data in accordance with the database, encrypting the entire message including the altered header and then creating a new header before sending the entire data package is well within the capability of anyone skilled in the art of network computer programming in view of the presentation in FIGS. 10-15 and the accompanying explanatory material. As will be apparent, the software will be different for each different operating system email program, software plug-in for a standard email program or browser and thus no pseudo code or detailed flow diagram has been presented herein.

Figure 16:
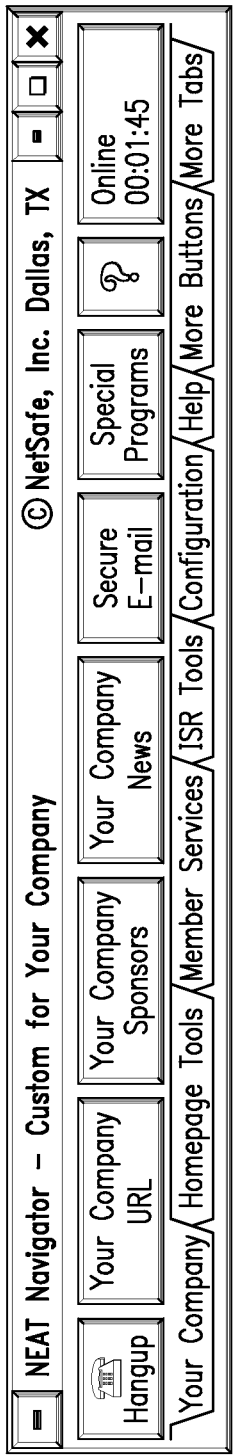
FIG. 16 illustrates a an example of a customized button bar that may be generated using the MOT script in accordance with the teachings of this invention.

FIG. 16 provides a simplified example of a button bar, power bar, or tool bar that can be generated using the referenced MOT script language in combination with data retrieved from the data bases. If a client were traveling away from home and accessed the network from New York, this information would be provided to the pinger entity. If the client then logged onto a web page of an airline who was also a client of a service using the present inventive components, the web page could be programmed, since data would be available that the client's home was, for example, Dallas, Tex., to immediately bring up a list of all flights leaving New York and bound for other destinations that the client had regularly traveled to in the recent past such as Dallas. The MOT generated bar or graphic in one implementation including a moving display. Such a display may provide advertising or information like ticker tape like stock market data.

In FIG. 17, an illustrative commentary is provided of the databases and their contents upon initial installation of software of a new client wishing to access the services of the present invention.

In FIG. 18 a selection menu 1102 is representative of a display that would be presented upon a client's system for selecting a test location to initially use the software installed in FIG. 17. The phone database is represented by 1104 while the NS (network services) database is represented by 1106. When the client selects a city in Tex. such as Plano, the software will note the number "1" at the end of the data of database 1104. In the NS database a "1" is shown to refer to UUNET services. As may be observed, if Garland had been picked, a "2" would have been detected and PSINet services would be used. As shown by arrow line 1108, the software would determine that the test location number is "519", the PAPID to be used is "nsTEST" and the PAP password is "zzzwww123". Other data that may be utilized is also contained in the database.

Figure 19:
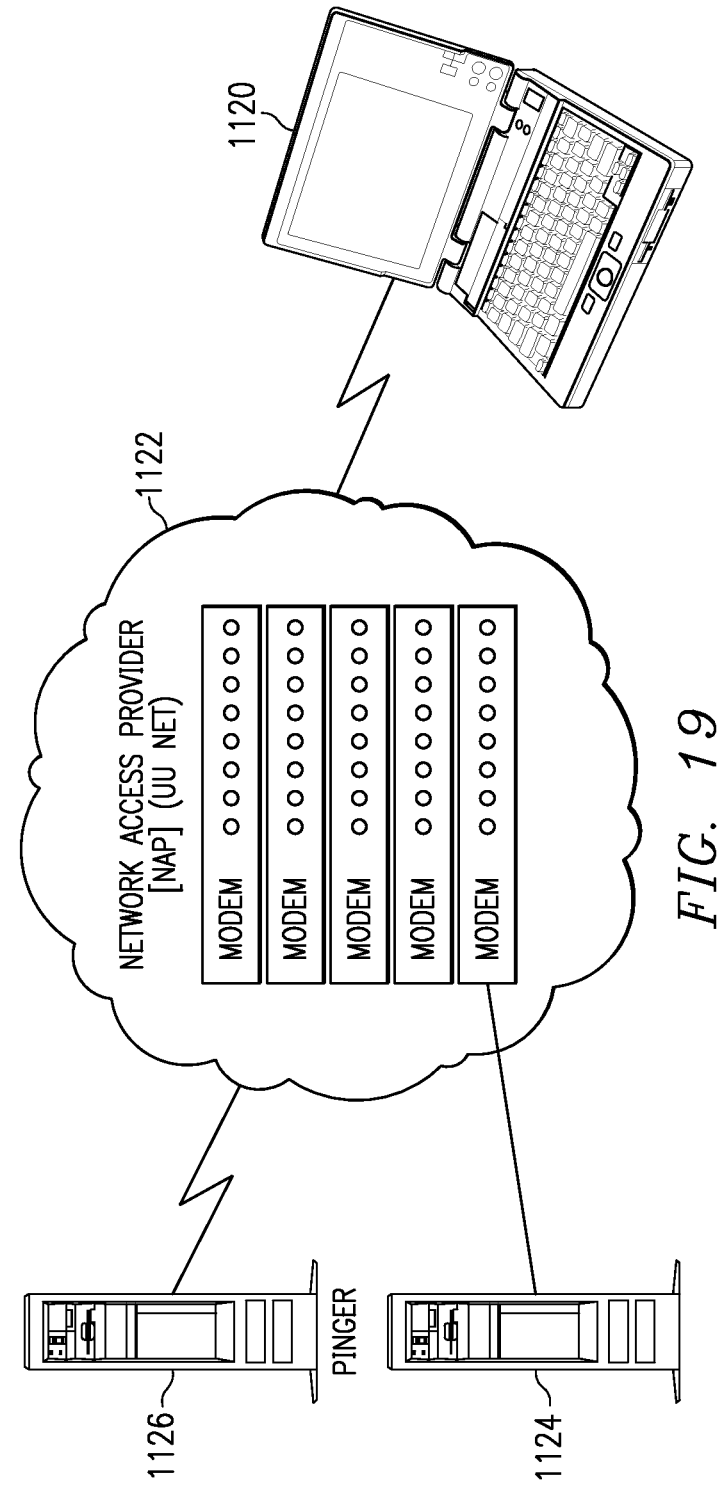
FIG. 19 further illustrates the network test and client system update procedure.

In FIG. 19 the client's computer is designated as 1120, the network as 1122, the network access provider as 1124 and the pinger entity as 1126. The test and update procedure is illustrated. The first action is for 1120 to connect through the NAP shown within network cloud 1122 to 1124 using the PAPID and PAP password in the NS database for the selected NAP. As set forth in FIG. 18, these values would be "nsTEST" and "zzzwww123". The NAP 1124 validates or authenticates the ID and password. For security reasons, the test ID and registration ID network connection, in a preferred embodiment of the invention, is limited to 90 seconds. The to system 1120 initiates a full network protocol test to the pinger 1126 by sending information about the client's system (1120) and the software revision installed therein. As will be realized, the installed database includes the address of an appropriate pinger 1126. The pinger 1126, after receiving the information, performs minimal processing on the received data and sends back any update information such as DNS changes, phone number updates and the like. The pinger may then send back some static information as well as any further update information that the system 1120 may require. The client software in 1120 checks the static information received, validates a reliable connection and then processes any update information for storage in an appropriate location(s).

Figure 20:
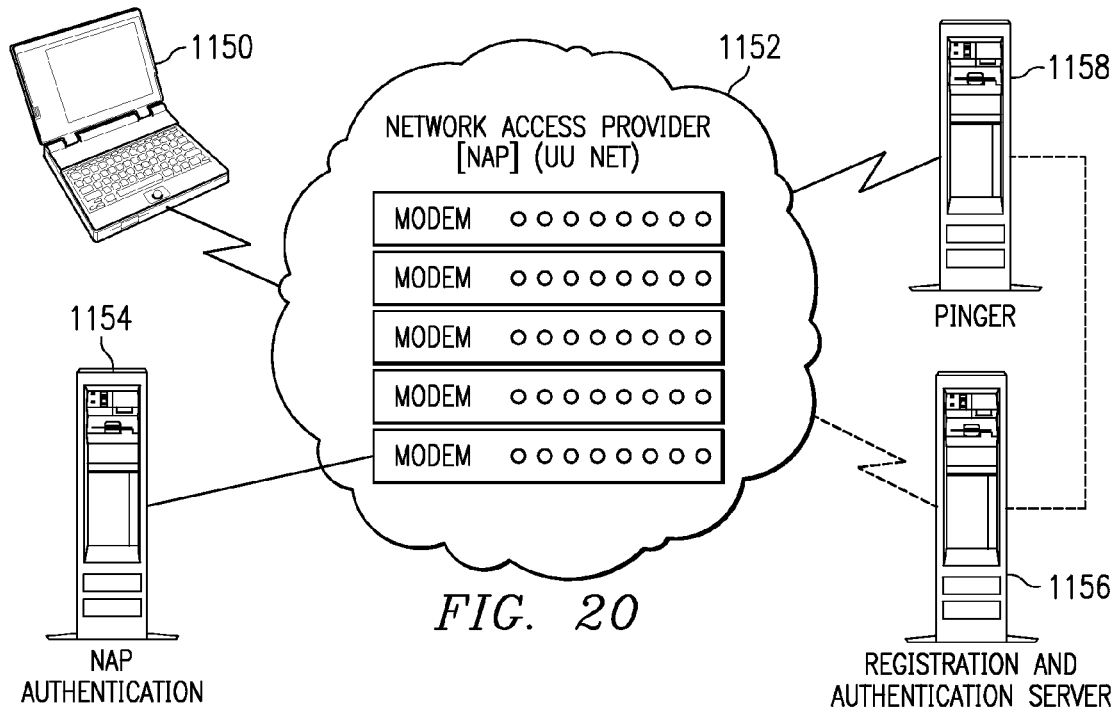
FIG. 20 illustrates the system interaction for providing client registration with the inventive system.

FIG. 20 is presented to help in the description of client registration. The client's system 1150, connects to an NAP in the network 1152 using the registration PAPID and PAP password stored in the NS database for a selected NAP as provided in the originally installed software. Such data may be found in the appendix A NS database in the appropriate lines RAM/ACCT/REG. The authentication portion of the NAP (1154) validates the PAPID and PAP password so that the client 1150 may communicate with a pinger entity such as 1158. (Although the preferred embodiment of the invention has the client 1150 send a registration request to pinger 1158 to provide further "security by obscurity", the registration request can be made directly to a registration and authentication server such as 1156 if so desired and thus proceed directly to a later portion of this paragraph description.) When pinger 1158 receives the registration request, it returns addressing, ID and password information to client 1150. This information will normally have a single life (that is it may only be used once) since the inventive system is designed to continually change passwords and other data such as addresses. With this information, the client 1150 may now initiate a registration request to the server 1156 as referenced above. The server 1156 processes the user's supplied information and issues a unique authentication token, a temporary PAPID and PAP password and/or a permanent PAPID and PAP password in accordance with system design. In an alternate embodiment, only a unique authentication token may be issued wherein the software in client 1150 is required to obtain the PAPID and PAP password from a pinger such as 1158. This supplied user registration information is stored in an appropriate database in 1156 for later authentication purposes. It may be noted that blocks 1156 and 1158 may share the same physical hardware but may also be remotely located and be interconnected via the network.

Figure 21:
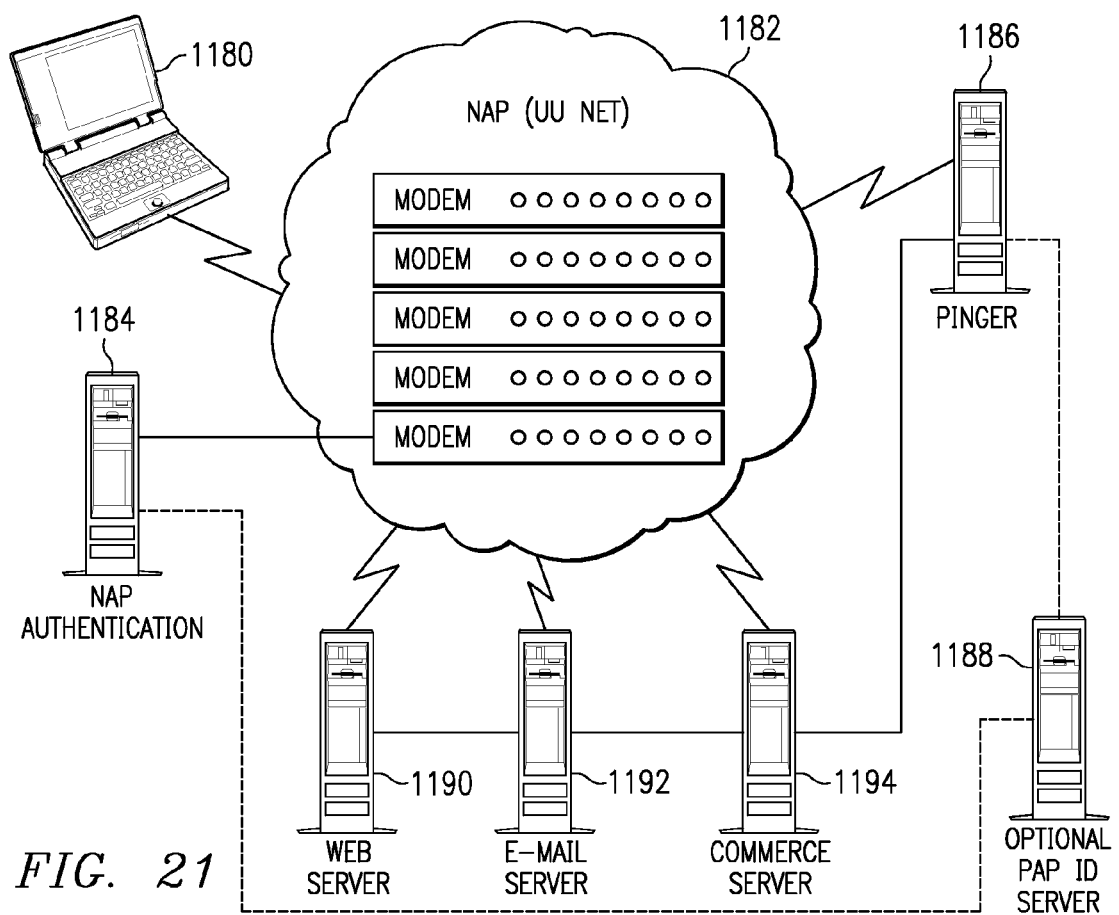
FIG. 21 provides additional illustrative material for the interaction of the client systems software and the components of the inventive system in obtaining general and anonymous access to the system.

FIG. 21 is similar to FIG. 20 in having a client system 1180, a network 1182, a NAP authentication entity 1184, and a pinger entity 1186. In addition an optional PAP ID server 1188 is illustrated connected to the blocks 1184 and 1186. This connection may be through the network or direct as illustrated in the drawing. A further plurality of blocks representing at least a web server 1190, an email server 1192 and a commerce server 1194 are shown connected to the network and directly to pinger 1186. When operating in a general or anonymous access mode, the client 1180 connects to a NAP within network 1182 using a PAPID and PAP password assigned and stored in the NS database for a selected NAP. The NAP validates the ID and password via block 1184. Once connected, client 1180 initiates a "Network Presence Notification" to the appropriate pinger such as 1186. If the client 1180 is set in a selectable "Anonymous Mode" the "Network Presence Notification" will include a request for a new alias along with revised PAPID and PAP password data for use in the next network login attempt.

When the pinger 1186 receives the notification, the date and time of receipt is logged along with the client's authentication token and the network address assigned to the client 1180 by the selected NAP. The pinger 1186 returns a response which may, from time to time, include a new authentication token in addition to data requested when the client 1180 is in the "Anonymous Mode". It should be noted that the pinger entities such as 1188 may be used to facilitate "Client side Authentication" when used in conjunction with servers such as 1190, 1192 and 1194 as examples. The client 1180, or others attempting to access the system, does not have access to the information contained in any of the client databases and the client 1180 and others cannot spoof a commerce server into believing that a transaction is originating somewhere else or by someone else.

From the above discourse, it may be appreciated that the various databases residing at the access provider and each of the client's systems, along with a script language such as MOT and the two way communication between clients and an access provider, permits dynamic or constantly changeable network access and encryption parameters to minimize the possibility of unauthorized access to the network access provider or its client's communications. This is accomplished by:

1 Dynamic network login ID and password;
2 Dynamically assigned network address;
3 Dynamically assigned resource user Ids, passwords and so forth;
4 Dynamic encryption algorithm use; and
5 Dynamic encryption key generation and use.

With respect to item 1 above, since a user's network login and password change periodically transparent to the user client and they are hidden from the user so as to be not accessible by the user, network fraud and abuse may be significantly reduced. Further the dynamic assignment process allows the login access to be different from system to system. Since the physical address of a server can be changed on any random or periodic basis, Item 2 causes a significant reduction in the risk of service attacks, network lockouts and unauthorized access to data. The dynamic assigning and reassigning of email alias as occurs in accordance with Item 3 significantly reduces the risk of unauthorized viewing of a given client's email messages. The changing domain aliases minimizes the risk of denial of access service while the dynamically generated and authenticated session IDs for network commerce reduces the risk of fraud.

In addition to the above discussion and description, one or more aspects of the present invention are also described and disclosed in Appendices A, B and C which are hereby incorporated by reference.

Although the invention has been described with reference to a specific embodiment, these descriptions are not meant to be construed in a limiting sense. Various modifications of the disclosed embodiments, as well as alternative embodiments of the invention will become apparent to persons skilled in the art upon reference to the description of the invention. It should also be noted that while terms such as "network device user" may be used to describe a single client, it may also be used to describe a network of users having a common factor such as an to employer. It is therefore, contemplated that the claims will cover any such modifications or embodiments that fall within the true scope of the invention.

What is claimed is:

1. A method for dynamically modifying a toolbar, the method comprising:
    displaying the toolbar, at a user Internet device, that includes one or more toolbar buttons, the toolbar defined by toolbar data stored in one or more toolbar-defining databases, the toolbar data comprising a plurality of toolbar button attributes associated with the one or more toolbar buttons of the toolbar, wherein at least one of the plurality of toolbar button attributes identifies a function to be performed by a specific toolbar button upon actuation of the specific toolbar button;
    invoking, from the user Internet device without user intervention, communication of information associated with the one or more toolbar-defining databases to a server associated with a network address;
    receiving, at the server, the information associated with the one or more toolbar-defining databases;
    determining, based on the information associated with the one or more toolbar-defining databases, that the user Internet device should receive updated toolbar data;
    receiving, at the user Internet device, the updated toolbar data in response to determining that the user Internet device should receive the updated toolbar data;
    initiating, at the user Internet device and without user interaction, an operation to update the toolbar data in accordance with the received updated toolbar data;
    updating the toolbar data at the user Internet device based on the operation and in accordance with the updated toolbar data, thereby updating the toolbar data, the updating comprising at least one member of a group comprising (a) and (b):
        (a) updating the toolbar data to include at least one new attribute of the toolbar data to change the toolbar by adding a toolbar button to the toolbar; and
        (b) updating the toolbar data to modify an attribute of at least one of the one or more toolbar buttons of the toolbar; and
    displaying at the user Internet device the toolbar as defined by the updated toolbar data,
    wherein the information associated with the toolbar data includes at least one member of a group comprising a revision level, version, time, date, user ID, account owner ID, PAP ID, IP address, session keys, billing data, name, address, account information, connection history, procedures performed by a user, group ID, e-mail address, e-mail ID, e-mail password, residential address, and phone number.

2. The method of claim 1, wherein displaying at the user Internet device the toolbar as defined by the updated toolbar data further comprises:
    displaying the toolbar with the updated toolbar data while one or more first web pages of a first web site are being displayed on the user Internet device; and
    persistently displaying the toolbar with the updated toolbar data while one or more second web pages of a second web site are being displayed on the user Internet device.

3. The method of claim 1, wherein the determination that the user Internet device should receive the updated toolbar data is performed by the server, and the server is located at the network address.

4. The method of claim 1, wherein the determination that the user Internet device should receive the updated toolbar data is at least partially separate from the server.

5. One or more computer-readable memory embodied with computer-executable instructions that, when executed by one or more processors, perform a method for dynamically modifying a toolbar, the method comprising:
    displaying a toolbar, at a user Internet device, that includes one or more toolbar buttons, the toolbar defined by toolbar data stored in one or more toolbar-defining databases, the toolbar data comprising a plurality of toolbar button attributes associated with the one or more toolbar buttons of the toolbar, wherein at least one of the plurality of toolbar button attributes identifies a function to be performed by a specific toolbar button upon actuation of the specific toolbar button;
    invoking, at the user Internet device and without user interaction, communication of information associated with the one or more toolbar-defining database to a server associated with a network address;
    receiving the information associated with the one or more toolbar-defining databases at the server;
    determining at the user Internet device, based on the information associated with the one or more toolbar-defining databases, that the user Internet device should receive updated toolbar data;
    receiving, at the user Internet device, the updated toolbar data;
    initiating, at the user Internet device and without user interaction, an operation to update the toolbar data in accordance with the received updated toolbar data;
    updating the toolbar data at the user Internet device based on the operation and in accordance with the updated toolbar data, thereby updating the toolbar data, the updating comprising at least one member of a group comprising (a) and (b):
(a) updating the toolbar data to include at least one new attribute of the toolbar data to change the toolbar by adding a toolbar button to the toolbar; and
(b) updating the toolbar data to modify an attribute of at least one of
the one or more toolbar buttons of the toolbar; and displaying at the user Internet device the toolbar as defined by the updated toolbar data;
wherein the information associated with the toolbar data includes at least one member of a group comprising a revision level, version, time, date, user ID, account owner ID, PAP ID, IP address, session keys, billing data, name, address, account information, data about a user, connection history, procedures performed by a user, group ID, e-mail address, e-mail ID, e-mail password, residential address, and phone number.

6. The one or more computer-readable memory of claim 5, wherein the one or more toolbar buttons include at least one member of a group comprising:
a news button;
a web page button that, when actuated, initiates a request to retrieve a web page associated with the web page button;
a weather button that displays an indication of weather at a geographic location; and
a text window for submitting web search terms.

7. The one or more computer-readable memory of claim 5, wherein displaying at the user Internet device the toolbar as defined by the updated toolbar data further comprises:
displaying the updated toolbar data in the toolbar while a first web page from a first web site is displayed in a web browser window, and
maintaining display of the updated toolbar data in the toolbar after the first web page from the first web site is no longer displayed and while a second web page from a second web site is displayed in the web browser window.

8. The one or more computer-readable memory of claim 5, wherein the determination that the user Internet device should receive the updated toolbar data is performed by the server, and the server is located at the network address.

9. A method for dynamically modifying a toolbar using a remote source accessible through a network, wherein the toolbar is displayable on a user Internet device and includes one or more toolbar buttons that are defined by toolbar data stored in one or more toolbar-defining databases of the user Internet device, the toolbar data includes a plurality of toolbar button attributes associated with the one or more toolbar buttons of the toolbar, wherein at least one of the plurality of toolbar button attributes identifies a function to be performed by a specific toolbar button, the method comprising:
establishing a connection with a user Internet device, the connection invoked by the user Internet device;
receiving, at the remote source, information associated with the toolbar data stored in the one or more toolbar-defining databases of the user Internet device;
determining, based on the information associated with the toolbar data stored in the one or more toolbar-defining databases of the user Internet device, that the user Internet device should receive updated toolbar data; and
sending, from the remote source via the network to the user Internet device, the updated toolbar data to be stored in the one or more toolbar-defining databases of the user Internet device, wherein the toolbar of the user Internet device is configured to receive the updated toolbar data, and to perform an operation that includes at least one member of a group comprising (a) and (b):
(a) updating the toolbar data to include at least one new attribute of the toolbar data to change the toolbar by adding a toolbar button to the toolbar; and
(b) updating the toolbar data to modify an attribute of at least one of the one or more toolbar buttons of the toolbar,
wherein the information associated with the toolbar data includes at least one member of a group comprising a revision level, version, time, date, user ID, account owner ID, PAP ID, IP address, session keys, billing data, name, address, account information, connection history, procedures performed by a user, group ID, e-mail address, e-mail ID, e-mail password, residential address, and phone number.

10. The method of claim 9, wherein the updating the toolbar data to modify an attribute comprises changing the one or more buttons of the toolbar by removing a button.

11. The method of claim 9, wherein the updating the toolbar data to modify an attribute comprises inserting at least a portion of the toolbar update data into the one or more toolbar-defining databases.

12. The method of claim 9, wherein the determination that the user Internet device should receive the updated toolbar data is performed by one or more servers of the remote source.

13. The method of claim 9, further comprising persistently displaying the updated toolbar data as a web browser window loads web pages from different web sites.

14. The method of claim 9, wherein the updating the toolbar data to modify an attribute comprises updating an attribute defining a URL to be opened when a button of the toolbar is clicked, the attribute updating from a first URL to a second URL.

15. The method of claim 9, further comprising maintaining a display of the toolbar as defined by the updated toolbar data until a subsequent updating of the updated toolbar data.

16. The method of claim 9, further comprising communicating, from the remote source, the information associated with the toolbar data stored in the one or more toolbar-defining databases of the user Internet device to a second remote source, wherein the determination that the user Internet device should receive the updated toolbar data is performed by a server located at the second remote source.

17. A method for dynamically modifying a toolbar of a user Internet device, the method comprising:
displaying a toolbar, at the user Internet device, that includes one or more toolbar buttons, the toolbar defined by toolbar data stored in one or more toolbar-defining databases, the toolbar data comprising a plurality of toolbar button attributes associated with the one or more toolbar buttons of the toolbar, wherein at least one of the plurality of toolbar button attributes identifies a function to be performed by a specific toolbar button upon actuation of the specific toolbar button;
invoking, from the user Internet device and without user interaction, communication of information associated with the toolbar data to a server associated with a network address, wherein the information is used to determine that the user Internet device should receive updated toolbar data;
communicating the information associated with the toolbar data to the server;
receiving, at the user Internet device, the updated toolbar data in response to determining that the user Internet device should receive the updated toolbar data;
initiating, at the user Internet device and without user interaction, an operation to update the toolbar data in accordance with the updated toolbar data;

updating the toolbar data at the user Internet device based on the operation and in accordance with the updated toolbar data, thereby updating the toolbar data, the updating comprising at least one member of a group comprising (a) and (b):
  (a) updating the toolbar data to include at least one new attribute of the toolbar data to change the toolbar by adding a toolbar button to the toolbar; and
  (b) updating the toolbar data to modify an attribute of at least one of the one or more toolbar buttons of the toolbar; and
displaying at the user Internet device the toolbar as defined by the updated toolbar data,
wherein the information associated with the toolbar data includes at least one member of a group comprising a revision level, version, time, date, user ID, account owner ID, PAP ID, data about a user, and one or more IP addresses.

18. The method of claim 17, wherein the one or more toolbar buttons comprise at least one member of a group comprising:
  a news button;
  a web page button that, when actuated, initiates a request to retrieve a web page associated with the web page button;
  a weather button that displays an indication of weather at a geographic location; and
  a text window for submitting web search terms.

19. The method of claim 17, wherein a second server at a second network address and in communication with the server determines that the user Internet device should receive the updated toolbar data.

20. The method of claim 17, wherein the server determines that the user Internet device should receive the updated toolbar data, and the server is located at the network address.

21. The method of claim 17, wherein displaying at the user Internet device the toolbar as defined by the updated toolbar data further comprises persistently displaying the updated toolbar data while multiple web pages from different web sites are consecutively displayed in a web browser window.

22. The method of claim 17, wherein initiating the operation to update the toolbar data is initiated according to at least one member of a group that includes:
  without user interaction at a current time;
  without user interaction at a later time;
  with user interaction at a current time; and
  with user interaction at a later time.

23. The method of claim 9, wherein the information associated with the toolbar data includes data about a user.

24. The method of claim 23, wherein the data about the user is transparently collected by the remote source from the user Internet device.

25. The method of claim 24, further comprising storing the data about the user in one or more network-accessible databases separate from the user Internet device.

26. The method of claim 24, further comprising providing the transparently collected data about the user to a server at a second remote source.

27. The method of claim 23, further comprising selecting one or more advertisements based on the data about the user.

28. The method of claim 27, further comprising transmitting the one or more advertisements to the user Internet device

29. The method of claim 27, wherein the data about the user comprises historical user interactions with web pages.

\* \* \* \* \*